(12) United States Patent
Jones et al.

(10) Patent No.: US 7,980,378 B2
(45) Date of Patent: Jul. 19, 2011

(54) SYSTEMS, APPARATUS, AND METHODS FOR CURRENCY PROCESSING CONTROL AND REDEMPTION

(75) Inventors: William J. Jones, Barrington, IL (US); Douglas U. Mennie, Barrington, IL (US); John R. Blake, St. Charles, IL (US); Curtis W. Hallowell, Palatine, IL (US)

(73) Assignee: Cummins-Allison Corporation, Mt. Prospect, IL (US)

( * ) Notice: Subject to any disclaimer, the term of this patent is extended or adjusted under 35 U.S.C. 154(b) by 23 days.

(21) Appl. No.: 12/436,897

(22) Filed: May 7, 2009

(65) Prior Publication Data
US 2009/0320106 A1   Dec. 24, 2009

Related U.S. Application Data

(62) Division of application No. 11/726,828, filed on Mar. 23, 2007.

(60) Provisional application No. 60/793,573, filed on Apr. 20, 2006, provisional application No. 60/785,251, filed on Mar. 23, 2006.

(51) Int. Cl.
*G06F 7/00* (2006.01)
*G06F 9/00* (2006.01)
*G06F 19/00* (2011.01)

(52) U.S. Cl. ........ 194/217; 382/115; 382/116; 382/117; 382/118; 382/119; 382/124; 340/5.52; 340/5.53; 340/5.82; 340/5.83; 340/5.84; 713/186

(58) Field of Classification Search .......... 194/215–217; 340/5.52, 5.53, 5.82, 5.83, 5.84, 5.85; 713/186; 382/115–127
See application file for complete search history.

(56) References Cited

U.S. PATENT DOCUMENTS

| | | | |
|---|---|---|---|
| 446,303 | A | 2/1891 | Thompson |
| 2,669,998 | A | 2/1954 | Buchholz |
| 2,750,949 | A | 6/1956 | Kulo et al. |
| 2,835,260 | A | 5/1958 | Buchholz |
| 2,865,561 | A | 12/1958 | Rosapepe |
| 2,936,684 | A | 5/1960 | Simjian |
| 3,104,314 | A | 9/1963 | Simjian |
| 3,132,654 | A | 5/1964 | Adams |
| 3,148,932 | A | 9/1964 | Simjian |
| 3,150,912 | A | 9/1964 | Simjian |

(Continued)

FOREIGN PATENT DOCUMENTS
DE   660 354   5/1938

(Continued)

OTHER PUBLICATIONS

"AFB Currency Recognition System,", 1 page (1982).

(Continued)

*Primary Examiner* — Jeffrey A Shapiro
(74) *Attorney, Agent, or Firm* — Nixon Peabody LLP

(57) ABSTRACT

A coin processing and redemption system includes a coin processing machine configured to receive a batch of coins in an input region and process the batch of coins to determine a value thereof. A dispensing device is provided and is configured to output a redemption ticket bearing a code. The coin processing machine is configured to associate the redemption ticket code with a coin processing transaction prior to the determination of a value of a batch of coins.

7 Claims, 21 Drawing Sheets

U.S. PATENT DOCUMENTS

| | | |
|---|---|---|
| 3,173,742 A | 3/1965 | Simjian |
| 3,246,295 A | 4/1966 | DeClaris et al. |
| 3,280,974 A | 10/1966 | Riddle et al. |
| 3,443,107 A | 5/1969 | Modglin |
| 3,480,785 A | 11/1969 | Aufderheide |
| 3,496,370 A | 2/1970 | Haville et al. |
| 3,509,535 A | 4/1970 | Berube |
| 3,612,835 A | 10/1971 | Andrews et al. |
| 3,618,765 A | 11/1971 | Cooper et al. |
| 3,656,615 A | 4/1972 | Ptacek |
| 3,679,314 A | 7/1972 | Mustert |
| 3,705,384 A | 12/1972 | Wahlberg |
| 3,715,031 A | 2/1973 | Okkonen |
| 3,725,667 A | 4/1973 | Schwartz |
| 3,764,899 A | 10/1973 | Peterson |
| 3,778,595 A | 12/1973 | Hatanaka et al. |
| 3,778,628 A | 12/1973 | Novak et al. |
| 3,782,543 A | 1/1974 | Martelli et al. |
| 3,798,603 A | 3/1974 | Wahlberg |
| 3,800,078 A | 3/1974 | Cochran et al. |
| 3,806,710 A | 4/1974 | Shigemori et al. |
| 3,815,021 A | 6/1974 | Kerr |
| 3,842,281 A | 10/1974 | Goodrich |
| 3,870,629 A | 3/1975 | Carter et al. |
| 3,906,449 A | 9/1975 | Marchak |
| 3,916,922 A | 11/1975 | Prumm |
| 3,930,582 A | 1/1976 | Gartner et al. |
| 3,966,047 A | 6/1976 | Steiner |
| 3,976,198 A | 8/1976 | Carnes, Jr. et al. |
| 3,998,237 A | 12/1976 | Kressin et al. |
| 4,023,011 A | 5/1977 | Nakajima et al. |
| 4,041,456 A | 8/1977 | Ott et al. |
| 4,059,122 A | 11/1977 | Kinoshita |
| 4,075,460 A | 2/1978 | Gorgens |
| 4,096,991 A | 6/1978 | Iguchi |
| 4,109,238 A | 8/1978 | Creekmore |
| 4,114,804 A | 9/1978 | Jones et al. |
| 4,147,430 A | 4/1979 | Gorgone et al. |
| 4,150,740 A | 4/1979 | Douno |
| 4,166,945 A | 9/1979 | Inoyama et al. |
| 4,172,462 A | 10/1979 | Uchida et al. |
| 4,179,685 A | 12/1979 | O'Maley |
| 4,187,463 A | 2/1980 | Kivenson |
| 4,197,986 A | 4/1980 | Nagata |
| 4,205,780 A | 6/1980 | Burns et al. |
| 4,208,549 A | 6/1980 | Polillo et al. |
| 4,231,014 A | 10/1980 | Ponzio |
| 4,232,295 A | 11/1980 | McConnell |
| 4,237,378 A | 12/1980 | Jones |
| 4,249,552 A | 2/1981 | Margolin et al. |
| 4,250,806 A | 2/1981 | Boyson et al. |
| 4,251,867 A | 2/1981 | Uchida et al. |
| 4,255,651 A | 3/1981 | Phillips |
| 4,264,808 A | 4/1981 | Owens et al. |
| 4,266,121 A | 5/1981 | Hirose |
| 4,275,874 A | 6/1981 | DiBlasio |
| 4,277,774 A | 7/1981 | Fujii et al. |
| 4,283,708 A | 8/1981 | Lee |
| 4,286,703 A | 9/1981 | Schuller et al. |
| 4,288,781 A | 9/1981 | Sellner et al. |
| 4,302,781 A | 11/1981 | Ikeda et al. |
| 4,310,885 A | 1/1982 | Azcua et al. |
| 4,311,914 A | 1/1982 | Huber |
| 4,313,598 A | 2/1982 | DiBlasio |
| 4,317,957 A | 3/1982 | Sendrow |
| 4,321,672 A | 3/1982 | Braun et al. |
| 4,334,619 A | 6/1982 | Horino et al. |
| 4,337,864 A | 7/1982 | McLean |
| 4,341,951 A | 7/1982 | Benton |
| 4,348,656 A | 9/1982 | Gorgone et al. |
| 4,349,111 A | 9/1982 | Shah et al. |
| 4,352,988 A | 10/1982 | Ishida |
| 4,355,300 A | 10/1982 | Weber |
| 4,355,369 A | 10/1982 | Garvin |
| 4,356,473 A | 10/1982 | Freudenthal |
| 4,360,034 A | 11/1982 | Davila et al. |
| 4,380,316 A | 4/1983 | Glinka et al. |
| 4,381,447 A | 4/1983 | Horvath et al. |
| 4,383,540 A | 5/1983 | De Meyer et al. |
| 4,386,432 A | 5/1983 | Nakamura et al. |
| 4,396,902 A | 8/1983 | Warthan et al. |
| 4,412,292 A | 10/1983 | Sedam et al. |
| 4,416,299 A | 11/1983 | Bergman |
| 4,420,153 A | 12/1983 | Winkler et al. |
| 4,434,359 A | 2/1984 | Watanabe |
| 4,441,205 A | 4/1984 | Berkin et al. |
| 4,442,541 A | 4/1984 | Finkel et al. |
| 4,449,240 A | 5/1984 | Yoshida |
| 4,454,414 A | 6/1984 | Benton |
| 4,461,028 A | 7/1984 | Okubo |
| 4,464,786 A | 8/1984 | Nishito et al. |
| 4,464,787 A | 8/1984 | Fish et al. |
| RE31,692 E | 10/1984 | Tyburski et al. |
| 4,480,177 A | 10/1984 | Allen |
| 4,487,306 A | 12/1984 | Nao et al. |
| 4,490,846 A | 12/1984 | Ishida et al. |
| 4,513,439 A | 4/1985 | Gorgone et al. |
| 4,521,008 A | 6/1985 | Granzow et al. |
| 4,523,087 A | 6/1985 | Benton |
| 4,530,067 A | 7/1985 | Dorr |
| 4,538,719 A | 9/1985 | Gray et al. |
| 4,539,702 A | 9/1985 | Oka |
| 4,542,829 A | 9/1985 | Emery et al. |
| 4,543,969 A | 10/1985 | Rasmussen |
| 4,544,266 A | 10/1985 | Antes |
| 4,547,896 A | 10/1985 | Ohtombe et al. |
| 4,553,222 A | 11/1985 | Kurland et al. |
| 4,553,846 A | 11/1985 | Hilton et al. |
| 4,556,140 A | 12/1985 | Okada |
| 4,558,224 A | 12/1985 | Gober |
| 4,558,711 A | 12/1985 | Yoshiaki et al. |
| 4,559,451 A | 12/1985 | Curl |
| 4,563,771 A | 1/1986 | Gorgone et al. |
| 4,567,370 A | 1/1986 | Falls |
| 4,569,421 A | 2/1986 | Sandstedt |
| 4,582,172 A | 4/1986 | Takeuchi et al. |
| 4,584,529 A | 4/1986 | Aoyama |
| 4,587,412 A | 5/1986 | Apisdorf |
| 4,587,434 A | 5/1986 | Roes et al. |
| 4,590,606 A | 5/1986 | Rohrer |
| 4,592,090 A | 5/1986 | Curl et al. |
| 4,593,184 A | 6/1986 | Bryce |
| 4,594,664 A | 6/1986 | Hashimoto |
| 4,602,332 A | 7/1986 | Hirose et al. |
| D285,095 S | 8/1986 | Lundgren et al. |
| 4,605,926 A | 8/1986 | Onishi et al. |
| 4,611,205 A | 9/1986 | Eglise |
| 4,611,345 A | 9/1986 | Ohnishi et al. |
| 4,617,458 A | 10/1986 | Bryce |
| 4,620,559 A | 11/1986 | Childers et al. |
| 4,622,456 A | 11/1986 | Naruto et al. |
| 4,628,194 A | 12/1986 | Dobbins et al. |
| 4,641,239 A | 2/1987 | Takesako |
| 4,645,936 A | 2/1987 | Gorgone |
| 4,653,647 A | 3/1987 | Hashimoto |
| 4,658,289 A | 4/1987 | Nagano et al. |
| 4,676,343 A | 6/1987 | Humble et al. |
| 4,677,682 A | 6/1987 | Miyagawa et al. |
| 4,678,072 A | 7/1987 | Kobayashi et al. |
| 4,685,141 A | 8/1987 | Hoque et al. |
| 4,686,357 A | 8/1987 | Douno et al. |
| 4,694,963 A | 9/1987 | Takesako |
| 4,697,071 A | 9/1987 | Hiraoka et al. |
| 4,700,368 A | 10/1987 | Munn et al. |
| 4,706,577 A | 11/1987 | Jones |
| 4,716,456 A | 12/1987 | Hosaka |
| 4,733,308 A | 3/1988 | Nakamura et al. |
| 4,733,765 A | 3/1988 | Watanabe |
| 4,735,289 A | 4/1988 | Kenyon |
| 4,743,974 A | 5/1988 | Lockwood |
| 4,748,679 A | 5/1988 | Gold et al. |
| 4,749,087 A | 6/1988 | Buttifant |
| 4,753,625 A | 6/1988 | Okada |
| 4,764,725 A | 8/1988 | Bryce |
| 4,764,976 A | 8/1988 | Kallin et al. |
| 4,766,548 A | 8/1988 | Cedrone et al. |
| 4,775,353 A | 10/1988 | Childers et al. |

| | | | | | |
|---|---|---|---|---|---|
| 4,778,983 A | 10/1988 | Ushikubo | 5,184,115 A | 2/1993 | Black et al. |
| 4,782,328 A | 11/1988 | Denlinger | 5,184,709 A | 2/1993 | Nishiumi et al. |
| 4,784,274 A | 11/1988 | Mori et al. | 5,186,334 A | 2/1993 | Fukudome et al. |
| 4,803,347 A | 2/1989 | Sugahara et al. | 5,187,750 A | 2/1993 | Behera |
| 4,804,830 A | 2/1989 | Miyagisima et al. | 5,193,121 A | 3/1993 | Elischer et al. |
| 4,806,709 A | 2/1989 | Evans | 5,198,976 A | 3/1993 | Form et al. |
| 4,811,004 A | 3/1989 | Person et al. | 5,199,543 A | 4/1993 | Kamagami et al. |
| 4,817,176 A | 3/1989 | Marshall et al. | 5,201,395 A | 4/1993 | Takizawa et al. |
| 4,821,332 A | 4/1989 | Durham | 5,207,788 A | 5/1993 | Geib et al. |
| 4,823,393 A | 4/1989 | Kawakami | 5,231,381 A | 7/1993 | Duwaer |
| 4,825,246 A | 4/1989 | Fukuchi et al. | 5,237,158 A | 8/1993 | Kern et al. |
| 4,827,531 A | 5/1989 | Milford | 5,239,593 A | 8/1993 | Wittner et al. |
| 4,833,307 A | 5/1989 | Gonzalez-Justiz | 5,243,174 A | 9/1993 | Veeneman et al. |
| 4,833,312 A | 5/1989 | Minematsu et al. | 5,251,738 A | 10/1993 | Dabrowski |
| 4,837,842 A | 6/1989 | Holt | 5,252,167 A | 10/1993 | Hoppe et al. |
| 4,841,358 A | 6/1989 | Kammoto et al. | 5,252,811 A | 10/1993 | Henochowicz et al. |
| 4,844,369 A | 7/1989 | Kanayachi | 5,253,167 A | 10/1993 | Yoshida et al. |
| 4,851,616 A | 7/1989 | Wales et al. | 5,261,518 A | 11/1993 | Bryce |
| 4,877,230 A | 10/1989 | Winkler et al. | 5,265,008 A | 11/1993 | Benton et al. |
| 4,880,096 A | 11/1989 | Kobayashi et al. | 5,279,403 A | 1/1994 | Harbaugh et al. |
| 4,881,268 A | 11/1989 | Uchida et al. | 5,282,127 A | 1/1994 | Mii |
| 4,883,158 A | 11/1989 | Kobayashi et al. | 5,286,954 A | 2/1994 | Sato et al. |
| 4,883,181 A | 11/1989 | Yoshikawa | 5,291,003 A | 3/1994 | Avnet et al. |
| 4,888,812 A | 12/1989 | Dinan et al. | 5,293,981 A | 3/1994 | Abe et al. |
| 4,903,953 A | 2/1990 | Winkler et al. | 5,295,196 A | 3/1994 | Raterman et al. |
| 4,905,839 A | 3/1990 | Yuge et al. | 5,297,030 A | 3/1994 | Vassigh et al. |
| 4,905,840 A | 3/1990 | Yuge et al. | 5,299,977 A | 4/1994 | Mazur et al. |
| 4,908,516 A | 3/1990 | West | 5,302,811 A | 4/1994 | Fukatsu |
| 4,921,463 A | 5/1990 | Primdahl et al. | 5,304,813 A | 4/1994 | DeMan |
| 4,922,109 A | 5/1990 | Bercovitz et al. | 5,308,992 A | 5/1994 | Crane et al. |
| 4,928,094 A | 5/1990 | Smith | 5,309,515 A | 5/1994 | Troung et al. |
| 4,931,782 A | 6/1990 | Jackson | 5,317,140 A | 5/1994 | Dunthorn |
| 4,947,441 A | 8/1990 | Hara et al. | 5,321,238 A | 6/1994 | Kamata et al. |
| 4,953,086 A | 8/1990 | Fukatsu | 5,335,292 A | 8/1994 | Lovelady et al. |
| 4,954,697 A | 9/1990 | Kokubun et al. | 5,341,408 A | 8/1994 | Melcher et al. |
| 4,970,655 A | 11/1990 | Winn et al. | 5,342,165 A | 8/1994 | Graef et al. |
| 4,973,851 A | 11/1990 | Lee | 5,363,949 A | 11/1994 | Matsubayashi |
| 4,980,543 A | 12/1990 | Hara et al. | 5,367,577 A | 11/1994 | Gotaas |
| 4,988,849 A | 1/1991 | Sasaki et al. | 5,368,147 A | 11/1994 | Menke et al. |
| 4,992,860 A | 2/1991 | Hamaguchi et al. | 5,371,345 A | 12/1994 | LeStrange et al. |
| 4,995,848 A | 2/1991 | Goh | 5,371,798 A | 12/1994 | McWhorter |
| 4,996,604 A | 2/1991 | Ogawa et al. | 5,373,550 A | 12/1994 | Campbell et al. |
| 5,010,238 A | 4/1991 | Kadono et al. | 5,374,814 A | 12/1994 | Kako et al. |
| 5,010,782 A | 4/1991 | Asano et al. | 5,379,344 A | 1/1995 | Larsson et al. |
| 5,023,782 A | 6/1991 | Lutz et al. | 5,381,019 A | 1/1995 | Sato |
| 5,025,139 A | 6/1991 | Halliburton, Jr. | 5,390,776 A | 2/1995 | Thompson |
| 5,027,415 A | 6/1991 | Hara et al. | 5,394,969 A | 3/1995 | Harbaugh |
| 5,039,848 A | 8/1991 | Stoken | 5,399,874 A | 3/1995 | Gonsalves et al. |
| 5,040,226 A | 8/1991 | Elischer et al. | 5,402,895 A | 4/1995 | Mikkelsen et al. |
| 5,047,871 A | 9/1991 | Meyer et al. | 5,417,316 A | 5/1995 | Harbaugh |
| 5,054,621 A | 10/1991 | Murphy et al. | 5,418,458 A | 5/1995 | Jeffers |
| 5,055,657 A | 10/1991 | Miller et al. | 5,419,424 A | 5/1995 | Harbaugh |
| 5,055,834 A | 10/1991 | Chiba | 5,421,443 A | 6/1995 | Hatamachie et al. |
| 5,063,599 A | 11/1991 | Concannon et al. | 5,430,664 A | 7/1995 | Cargill et al. |
| 5,068,519 A | 11/1991 | Bryce | 5,434,427 A | 7/1995 | Crane et al. |
| 5,076,441 A | 12/1991 | Gerlier | 5,437,357 A | 8/1995 | Ota et al. |
| 5,080,633 A | 1/1992 | Ristvedt et al. | 5,438,184 A | 8/1995 | Roberts et al. |
| 5,091,713 A | 2/1992 | Horne et al. | 5,440,108 A | 8/1995 | Tran et al. |
| 5,091,961 A | 2/1992 | Baus, Jr. | 5,444,793 A | 8/1995 | Kelland |
| 5,105,601 A | 4/1992 | Horiguchi et al. | 5,444,794 A | 8/1995 | Uhland, Sr. |
| 5,114,381 A | 5/1992 | Ueda et al. | 5,450,938 A | 9/1995 | Rademacher |
| 5,120,944 A | 6/1992 | Kern et al. | 5,453,601 A | 9/1995 | Rosen |
| 5,120,945 A | 6/1992 | Nishibe et al. | 5,459,304 A | 10/1995 | Eisenmann |
| 5,122,754 A | 6/1992 | Gotaas | 5,465,301 A | 11/1995 | Jotcham et al. |
| 5,134,663 A | 7/1992 | Kozlowski | 5,465,821 A | 11/1995 | Akioka |
| 5,135,115 A | 8/1992 | Miller et al. | 5,467,405 A | 11/1995 | Raterman et al. |
| 5,140,517 A | 8/1992 | Nagata et al. | 5,467,406 A | 11/1995 | Graves et al. |
| 5,144,115 A | 9/1992 | Yoshida | 5,468,971 A | 11/1995 | Ebstein et al. |
| 5,146,067 A | 9/1992 | Sloan et al. | 5,470,079 A | 11/1995 | LeStrange et al. |
| 5,146,512 A | 9/1992 | Weideman et al. | 5,476,169 A | 12/1995 | Takarada et al. |
| 5,151,607 A | 9/1992 | Crane | 5,481,377 A | 1/1996 | Udagawa et al. |
| 5,154,272 A | 10/1992 | Nishiumi et al. | 5,486,067 A | 1/1996 | Huynh et al. |
| 5,159,548 A | 10/1992 | Caslavka | 5,488,671 A | 1/1996 | Kern |
| 5,163,672 A | 11/1992 | Mennie | 5,500,514 A | 3/1996 | Veeneman et al. |
| 5,163,868 A | 11/1992 | Adams et al. | 5,504,822 A | 4/1996 | Holt |
| 5,167,313 A | 12/1992 | Dobbins et al. | 5,506,691 A | 4/1996 | Bednar et al. |
| 5,175,416 A | 12/1992 | Mansvelt et al. | 5,507,379 A | 4/1996 | Mazur et al. |
| 5,179,517 A | 1/1993 | Sarbin et al. | D369,984 S | 5/1996 | Larsen |
| 5,183,142 A | 2/1993 | Latchinian et al. | 5,523,575 A | 6/1996 | Machida et al. |

| Patent | Date | Inventor |
|---|---|---|
| 5,530,772 A | 6/1996 | Storey |
| 5,537,486 A | 7/1996 | Stratigos et al. |
| 5,544,043 A | 8/1996 | Miki et al. |
| 5,544,086 A | 8/1996 | Davis et al. |
| 5,545,885 A | 8/1996 | Jagielinski |
| 5,553,320 A | 9/1996 | Matsuura et al. |
| 5,559,887 A | 9/1996 | Davis et al. |
| 5,564,546 A | 10/1996 | Molbak et al. |
| 5,586,036 A | 12/1996 | Pintsov |
| 5,592,377 A | 1/1997 | Lipkin |
| 5,600,732 A | 2/1997 | Ott et al. |
| 5,602,933 A | 2/1997 | Blackwell et al. |
| 5,602,936 A | 2/1997 | Green et al. |
| 5,607,040 A | 3/1997 | Mathurin, Sr. |
| 5,615,280 A | 3/1997 | Izawa et al. |
| 5,620,079 A | 4/1997 | Molbak |
| 5,623,547 A | 4/1997 | Jones et al. |
| 5,625,562 A | 4/1997 | Veeneman et al. |
| 5,633,949 A | 5/1997 | Graves et al. |
| 5,637,845 A | 6/1997 | Kolls |
| 5,640,463 A | 6/1997 | Csulits |
| 5,641,050 A | 6/1997 | Smith et al. |
| 5,650,605 A | 7/1997 | Morioka et al. |
| 5,652,421 A | 7/1997 | Veeneman et al. |
| 5,652,802 A | 7/1997 | Graves et al. |
| 5,657,846 A | 8/1997 | Schwartz |
| 5,665,952 A | 9/1997 | Ziarno |
| 5,678,046 A | 10/1997 | Cahill et al. |
| 5,680,472 A | 10/1997 | Conant |
| 5,687,963 A | 11/1997 | Mennie |
| 5,692,067 A | 11/1997 | Raterman et al. |
| 5,704,491 A | 1/1998 | Graves |
| 5,719,948 A | 2/1998 | Liang |
| 5,724,438 A | 3/1998 | Graves |
| 5,727,667 A | 3/1998 | Nye |
| 5,729,623 A | 3/1998 | Omatu et al. |
| 5,746,299 A | 5/1998 | Molbak et al. |
| 5,751,840 A | 5/1998 | Raterman et al. |
| 5,751,842 A | 5/1998 | Riach et al. |
| 5,754,673 A | 5/1998 | Brooks et al. |
| 5,761,089 A | 6/1998 | McInerny |
| 5,774,874 A | 6/1998 | Veeneman et al. |
| 5,781,654 A | 7/1998 | Carney |
| 5,790,693 A | 8/1998 | Graves et al. |
| 5,790,697 A | 8/1998 | Munro et al. |
| 5,799,767 A | 9/1998 | Molbak |
| 5,806,650 A | 9/1998 | Mennie et al. |
| 5,813,510 A | 9/1998 | Rademacher |
| 5,815,592 A | 9/1998 | Mennie et al. |
| 5,822,448 A | 10/1998 | Graves et al. |
| 5,830,054 A | 11/1998 | Petri |
| 5,832,104 A | 11/1998 | Graves et al. |
| 5,832,463 A | 11/1998 | Funk |
| 5,842,188 A | 11/1998 | Ramsey et al. |
| 5,842,916 A | 12/1998 | Gerrity et al. |
| 5,850,076 A | 12/1998 | Morioka et al. |
| 5,852,811 A | 12/1998 | Atkins |
| 5,854,581 A | 12/1998 | Mori et al. |
| 5,867,589 A | 2/1999 | Graves et al. |
| 5,870,487 A | 2/1999 | Graves et al. |
| 5,875,259 A | 2/1999 | Mennie et al. |
| 5,880,444 A | 3/1999 | Shibata et al. |
| 5,892,211 A | 4/1999 | Davis et al. |
| 5,905,810 A | 5/1999 | Jones et al. |
| 5,909,502 A | 6/1999 | Mazur |
| 5,909,503 A | 6/1999 | Graves et al. |
| 5,909,793 A | 6/1999 | Beach et al. |
| 5,909,794 A | 6/1999 | Molbak et al. |
| 5,912,982 A | 6/1999 | Munro et al. |
| 5,918,748 A | 7/1999 | Clark et al. |
| 5,926,550 A | 7/1999 | Davis |
| 5,938,044 A | 8/1999 | Weggesser |
| 5,940,623 A | 8/1999 | Watts et al. |
| 5,940,844 A | 8/1999 | Cahill et al. |
| 5,943,655 A | 8/1999 | Jacobson |
| 5,944,600 A | 8/1999 | Zimmermann |
| 5,947,255 A | 9/1999 | Shimada et al. |
| 5,957,262 A | 9/1999 | Molbak et al. |
| 5,960,103 A | 9/1999 | Graves et al. |
| 5,966,456 A | 10/1999 | Jones et al. |
| 5,982,918 A | 11/1999 | Mennie et al. |
| 5,988,348 A | 11/1999 | Martin et al. |
| 5,992,601 A | 11/1999 | Mennie et al. |
| 5,995,949 A | 11/1999 | Morioka et al. |
| 6,012,565 A | 1/2000 | Mazur |
| 6,017,270 A | 1/2000 | Ristvedt et al. |
| 6,021,883 A | 2/2000 | Casanova et al. |
| 6,023,684 A | 2/2000 | Pearson |
| 6,026,175 A | 2/2000 | Munro et al. |
| 6,028,951 A | 2/2000 | Raterman et al. |
| D422,016 S | 3/2000 | Forslund |
| 6,032,859 A | 3/2000 | Muehlberger et al. |
| 6,038,553 A | 3/2000 | Hyde, Jr. |
| 6,039,645 A | 3/2000 | Mazur |
| 6,047,807 A | 4/2000 | Molbak |
| 6,047,808 A | 4/2000 | Neubarth et al. |
| 6,056,104 A | 5/2000 | Neubarth et al. |
| 6,068,194 A | 5/2000 | Mazur |
| 6,072,896 A | 6/2000 | Graves et al. |
| 6,073,744 A | 6/2000 | Raterman et al. |
| 6,074,334 A | 6/2000 | Mennie et al. |
| 6,080,056 A | 6/2000 | Karlsson |
| D427,623 S | 7/2000 | Kuwada et al. |
| 6,082,519 A | 7/2000 | Martin et al. |
| 6,086,471 A | 7/2000 | Zimmermann |
| 6,095,313 A | 8/2000 | Molbak et al. |
| 6,116,402 A | 9/2000 | Beach et al. |
| 6,128,402 A | 10/2000 | Jones et al. |
| 6,145,738 A | 11/2000 | Stinson et al. |
| 6,220,419 B1 | 4/2001 | Mennie |
| 6,237,565 B1 | 5/2001 | Engelgau |
| 6,237,739 B1 | 5/2001 | Mazur et al. |
| 6,241,069 B1 | 6/2001 | Mazur et al. |
| 6,256,407 B1 | 7/2001 | Mennie et al. |
| 6,278,795 B1 | 8/2001 | Anderson et al. |
| 6,283,366 B1 | 9/2001 | Hills et al. |
| 6,308,887 B1 | 10/2001 | Korman et al. |
| 6,311,819 B1 | 11/2001 | Stromme et al. |
| 6,318,536 B1 | 11/2001 | Korman et al. |
| 6,318,537 B1 | 11/2001 | Jones et al. |
| 6,351,551 B1 | 2/2002 | Munro et al. |
| 6,354,491 B2 | 3/2002 | Nichols et al. |
| 6,363,164 B1 | 3/2002 | Jones et al. |
| 6,371,303 B1 | 4/2002 | Klein et al. |
| 6,378,683 B2 | 4/2002 | Mennie |
| 6,381,354 B1 | 4/2002 | Mennie et al. |
| 6,398,000 B1 | 6/2002 | Jenrick et al. |
| 6,438,230 B1 | 8/2002 | Moore |
| 6,459,806 B1 | 10/2002 | Raterman et al. |
| 6,460,705 B1 | 10/2002 | Hallowell |
| 6,473,519 B1 | 10/2002 | Pidhirny et al. |
| 6,474,548 B1 | 11/2002 | Montross et al. |
| 6,493,461 B1 | 12/2002 | Mennie et al. |
| 6,539,104 B1 | 3/2003 | Raterman et al. |
| 6,554,185 B1 | 4/2003 | Montross et al. |
| 6,560,355 B2 | 5/2003 | Graves et al. |
| 6,603,872 B2 | 8/2003 | Jones et al. |
| 6,628,816 B2 | 9/2003 | Mennie et al. |
| 6,636,624 B2 | 10/2003 | Raterman et al. |
| 6,647,136 B2 | 11/2003 | Jones et al. |
| 6,650,767 B2 | 11/2003 | Jones et al. |
| 6,654,486 B2 | 11/2003 | Jones et al. |
| 6,661,910 B2 | 12/2003 | Jones et al. |
| 6,665,431 B2 | 12/2003 | Jones et al. |
| 6,678,401 B2 | 1/2004 | Jones et al. |
| 6,678,402 B2 | 1/2004 | Jones et al. |
| 6,705,470 B2 | 3/2004 | Klein et al. |
| 6,724,926 B2 | 4/2004 | Jones et al. |
| 6,724,927 B2 | 4/2004 | Jones et al. |
| 6,731,786 B2 | 5/2004 | Jones et al. |
| 6,758,316 B2 | 7/2004 | Molbak |
| 6,778,693 B2 | 8/2004 | Jones et al. |
| 6,783,452 B2 | 8/2004 | Hino et al. |
| 6,786,398 B1 | 9/2004 | Stinson et al. |
| 6,798,899 B2 | 9/2004 | Mennie et al. |
| 6,810,137 B2 | 10/2004 | Jones et al. |
| 6,860,375 B2 | 3/2005 | Hallowell et al. |
| 6,915,893 B2 | 7/2005 | Mennie |

| | | | |
|---|---|---|---|
| 6,957,733 B2 | 10/2005 | Mazur et al. | |
| 6,991,530 B2 | 1/2006 | Hino et al. | |
| 6,996,263 B2 | 2/2006 | Jones et al. | |
| 7,000,828 B2 | 2/2006 | Jones | |
| 7,004,831 B2 | 2/2006 | Hino et al. | |
| 7,028,827 B1 | 4/2006 | Molbak et al. | |
| 7,103,206 B2 | 9/2006 | Graves et al. | |
| 7,187,795 B2 | 3/2007 | Jones et al. | |
| 7,349,566 B2 | 3/2008 | Jones et al. | |
| 2001/0027116 A1* | 10/2001 | Baird | 455/550 |
| 2002/0020603 A1 | 2/2002 | Jones et al. | |
| 2002/0126885 A1 | 9/2002 | Mennie et al. | |
| 2002/0128916 A1* | 9/2002 | Beinecke, III | 705/26 |
| 2002/0154806 A1 | 10/2002 | Jones et al. | |
| 2003/0009420 A1 | 1/2003 | Jones | |
| 2003/0062242 A1 | 4/2003 | Hallowell et al. | |
| 2003/0081824 A1 | 5/2003 | Mennie et al. | |
| 2003/0108233 A1 | 6/2003 | Raterman et al. | |
| 2006/0069642 A1* | 3/2006 | Doran et al. | 705/39 |
| 2007/0071302 A1 | 3/2007 | Jones et al. | |
| 2007/0221470 A1 | 9/2007 | Mennie et al. | |
| 2007/0237381 A1 | 10/2007 | Mennie et al. | |

FOREIGN PATENT DOCUMENTS

| | | |
|---|---|---|
| DE | 30 21 327 | 12/1981 |
| EP | 0 071 421 | 2/1983 |
| EP | 0 077 464 | 4/1983 |
| EP | 0 083 062 | 7/1983 |
| EP | 0 101 115 | 2/1984 |
| EP | 0 109 743 | 5/1984 |
| EP | 0 185 200 | 6/1986 |
| EP | 0 253 935 | 1/1988 |
| EP | 0 325 364 | 7/1989 |
| EP | 0 338 123 | 10/1989 |
| EP | 0 342 647 | 11/1989 |
| EP | 0 351 217 | 1/1990 |
| EP | 0 402 627 | 12/1990 |
| EP | 0 578 875 | 1/1994 |
| EP | 0 583 526 | 2/1994 |
| EP | 0 583 723 | 2/1994 |
| EP | 0 612 042 | 8/1994 |
| EP | 0 613 107 | 8/1994 |
| EP | 0 633 552 | 1/1995 |
| EP | 0 633 553 | 2/1995 |
| EP | 0 671 696 | 9/1995 |
| EP | 0 718 809 | 6/1996 |
| EP | 0 667 973 | 1/1997 |
| EP | 0 926 634 | 6/1999 |
| EP | 0 548 142 | 9/1999 |
| EP | 0 708 419 | 1/2000 |
| EP | 0 824 736 | 3/2000 |
| EP | 0 686 292 | 7/2000 |
| EP | 0 760 987 | 9/2000 |
| FR | 70 11438 | 2/1971 |
| GB | 2 035 642 | 6/1980 |
| GB | 2 038 063 | 7/1980 |
| GB | 2 175 427 | 11/1986 |
| GB | 2 190 996 | 12/1987 |
| GB | 2 198 274 | 6/1988 |
| GB | 2 204 166 | 11/1988 |
| GB | 2 223 872 | 4/1990 |
| GB | 2 272 762 | 5/1994 |
| JP | 49-58899 | 6/1974 |
| JP | 50-158343 | 12/1975 |
| JP | 52-014495 | 2/1977 |
| JP | 52-71300 | 6/1977 |
| JP | 56-40992 | 4/1981 |
| JP | 57-117080 | 7/1982 |
| JP | 59-79392 | 5/1984 |
| JP | 60-16271 | 2/1985 |
| JP | 62-82493 | 4/1987 |
| JP | 62-134168 | 8/1987 |
| JP | 62-182995 | 8/1987 |
| JP | 62-220843 | 9/1987 |
| JP | 62-166562 | 10/1987 |
| JP | 64-042789 | 2/1989 |
| JP | 64-067698 | 3/1989 |
| JP | 01-118995 | 5/1989 |
| JP | 64-035683 | 6/1989 |
| JP | 01-307891 | 12/1989 |
| JP | 02-12492 | 1/1990 |
| JP | 02-252096 | 10/1990 |
| JP | 03-012776 | 1/1991 |
| JP | 02-050793 | 2/1991 |
| JP | 03-63795 | 3/1991 |
| JP | 03-92994 | 4/1991 |
| JP | 03-156673 | 7/1991 |
| JP | 04-085695 | 3/1992 |
| JP | 41-75993 | 6/1992 |
| JP | 05-274527 | 10/1993 |
| JP | 61-03285 | 4/1994 |
| JP | 06-035946 | 10/1994 |
| JP | 62-221773 | 9/1997 |
| JP | 02-117439 | 4/2002 |
| JP | 04-213188 | 7/2004 |
| SE | 44 244 | 9/1988 |
| WO | WO 85/00909 | 2/1985 |
| WO | WO 90/07165 | 6/1990 |
| WO | WO 91/11778 | 8/1991 |
| WO | WO 92/14221 | 8/1992 |
| WO | WO 92/17394 | 10/1992 |
| WO | WO 93/23824 | 11/1993 |
| WO | WO 94/06101 | 3/1994 |
| WO | WO 94/16412 | 7/1994 |
| WO | WO 94/19773 | 9/1994 |
| WO | WO 95/24691 | 3/1995 |
| WO | WO 95/19019 | 7/1995 |
| WO | WO 96/10800 | 9/1995 |
| WO | WO 96/36933 | 11/1996 |
| WO | WO 97/29459 | 8/1997 |
| WO | WO 97/30422 | 8/1997 |
| WO | WO/9743734 | 11/1997 |
| WO | WO 98/24041 | 6/1998 |
| WO | WO 98/40839 | 9/1998 |
| WO | WO 98/47100 | 10/1998 |
| WO | WO 98/48383 | 10/1998 |
| WO | WO 98/48384 | 10/1998 |
| WO | WO 98/48385 | 10/1998 |
| WO | WO 98/51082 | 11/1998 |
| WO | WO 99/00776 | 1/1999 |
| WO | WO 99/33030 | 7/1999 |

OTHER PUBLICATIONS

Amiel Industries, brochure for "AI-1500 'Pulsar," 14 pages (no date).

Ascom, brochure for "Cashflow Emerald," 2 pages (no date).

ATS Money Systems, Inc., brochure entitled "The Cash Room Is History," 4 pages (no date).

Barton, Louis L., "Check Processing Operations," Chapter 8 and Appendix 2, pp. 119-140 and 225-231 (1994).

Brandt, Inc., advertisement entitled "Solving Problems, Pleasing Customers, Building Deposits" for System 930 Electric Counter/Sorter, 1 page (no date).

Brandt, Inc., brochure for "95 Series Coin Sorter/Counter," 2 pages (no date).

Brandt, Inc., brochure for "Model 1205 Coin Sorter/Counter," 2 pages (no date).

Brandt, Inc., brochure for "Model 1400 Coin Sorter/Counter," 2 pages (no date).

Brandt, Inc., brochure for "Model 817 Automated Coin and Currency Ordering System," 2 pages (no date).

Brandt, Inc., brochure for "Model 920/925," 2 pages (no date).

Brandt, Inc., brochure for "Model 940-6 High Speed Sorter/Counter," 2 pages (no date).

Brandt, Inc., brochure for "Model 952 Coin Sorter/Counter," 2 pages (no date).

Brandt, Inc., brochure for "Model 954 Coin Sorter/Counter," 2 pages (no date).

Brandt, Inc., brochure for "Model 957 Coin Sorter/Counter," 2 pages (no date).

Brandt, Inc., brochure for "Model 958 Coin Sorter/Counter," 5 pages (1982).

Brandt, Inc., brochure for "Model 960 High-Speed Coin Sorter & Counter," 2 pages (no date).

Brandt, Inc., brochure for "Model 966 Microsort™ Coin Sorter and Counter," 4 pages, 1979.

Brandt, Inc., brochure for "Model 970 Coin Sorter & Counter," 2 pages (no date).
Brandt, Inc., brochure for "System 945," 2 pages (no date).
Brandt, "Mach 7 High-Speed Coin Sorter/Counter," 2 pages (Apr. 1, 1993).
Brandt, Model 8904 Upfeed, "High Speed 4-Denomination Currency Dispenser," 2 pages (date prior to May 1996).
Case-ICC Limited, brochure for "CDS Automated Receipt Giving Cash Deposit System," 3 pages (no date).
"Cash Depositing System CDS 5700 and CDS 5800," 7 pages (Jan. 3, 1995).
"Cash Receipt System CRS/6501/CRS6510," IREIS, 3 pages (Feb. 1995).
Cash, Martin, "Bank Blends New Technology With Service," Winnipeg Free Press, 1 page (Sep. 4, 1992).
Cassius Elston, "No More Lines . . . Self Serve Cash-Out," Drop Stream Developments, 1 page (date prior to May 13, 1996).
Childers Corporation, brochure and letter for "Computerized Sorter/Counter," 3 pages (Nov. 1981).
"Coin Settlement Machine For Customer Self Service," Contomat. 2 pages (date prior to May 13, 1996).
CTCoin, brochure for "CDS602 Cash Deposit System," 1 page (no date).
Cummins-Allison Corp., brochure entitled "Cash Information & Settlement Systems," 4 pages (no date).
Cummins-Allison Corp., brochure entitled "State-Of-The-Art Coin Processing Comes Of Age," 3 pages (no date).
Cummins-Allison Corp., brochure for "CA-750 JetSort Coin Processor," 1 page (no date).
Cummins-Allison Corp., brochure for "High Speed Coin Sorter/Counter 2000 Series," 2 pages (no date).
Cummins-Allison Corp., brochure for "High Speed Coin Sorters 3000 Series," 2 pages (no date).
Cummins-Allison Corp., Operating Instructions for JetScan Currency Scanner/Counter, Model 4061, 47 pages (Apr. 20, 1993).
Cummins-Allison Corp., Operating Instructions for JetScan Currency Scanner/Counter, Model 4062, 54 pages (Nov. 28, 1994).
Cummins-Allison Corp., Operating Instructions for JetSort® High Speed Sorter/Counter (Kits I & J), 12 pages (1993).
Cummins-Allison Corp., Operator's Manual for JetScan Currency Scanner/Counter, Model 4060, 43 pages (Aug. 1991).
Cummins-Allison Corp., Sale of JetScan Currency Scanner/Counter, Model 4060, 1 page (Aug. 1991).
Cummins-Allison Corp., Sale of JetScan Currency Scanner/Counter, Model 4061, 1 page (Apr. 20, 1993).
Cummins-Allison Corp., Sale of JetScan Currency Scanner/Counter, Model 4062, 1 page (Nov. 28, 1994).
Currency Systems International, CPS 600 and CPS 900, 1 page (estimated 1994).
Currency Systems International, "Medium Speed Currency Sorting Family CPS 600 and CPS 900," 4 pages (1994).
Currency Systems International, Mr. W. Kranister in Conversation With Richard Haycock, 5 pages (estimated 1994).
Currency Systems International, "Currency Processing Systems CPS 300," 4 pages (1992).
De La Rue Garny GmbH, brochure and translation for "Cash Depositing Systems CDS 5700 and CDS 5800," 7 pages (no date).
De La Rue Garny GmbH, brochure for "Cash Deponier System CDS 500," 6 pages (no date).
Diebold, article entitled "Merchant MicroBranch Combines ATM, After-Hour Depository, Rolled-Coin Dispenser," 1 page (Nov. 1997).
Fa.GBS-Geldbearbeitungssysteme, "Technical Specifications GBS9401 SB," 24 pages (no date).
Frisco Bay, brochure for "Commercial Kiosk," 4 pages (no date).
Glory (U.S.A.) Inc., brochure for "AMT Automated Merchant Teller," 4 pages (no date).
Glory (U.S.A.) Inc., brochure for "SR-700 Cash Settlement System," 4 pages (no date).
Glory, GFB-200/210/220/230, "Desk-Top Bank Note Counter," 2 pages (estimated date prior to Aug. 9, 1994).
Glory, "GSA-500 Sortmaster," 2 pages (Jan. 14, 1994).
Glory, "The New CRS-8000 Cash Redemption System," 2 pages (date prior to May 13, 1996).
Glory, "UF-1D," 2 pages (estimated date prior to Aug. 9, 1994).
Hamilton, brochure for "Hamilton's Express Banking Center," 4 pages (no date).
ISH Electronic, brochure and translation for "ISH 12005/501 Self-Service Unit," 4 pages (no date).
ISH 12005/500 SB-Münzähler, 4 pages (date prior to May 13, 1996, with translation).
NamSys Inc., brochure for "NamSys Express™," 2 pages (no date).
NGZ 2100, 4 pages (date prior to May 13, 1996).
PREMA 405(RE) Self Service Coin Deposit Facility, 2 pages (date prior to May 13, 1996).
Reis Eurosystems, brochure for "CS 3510-Disc-Sorter," 1 page (no date).
Reis Eurosystems, brochure for "The New Standard-Class Coin Deposit Systems," 1 page (no date).
Royal Bank, article by Carolyn Leitch entitled "High-Tech Bank Counts Coins," 1 page (Sep. 18, 1991).
Royal Bank, article by Jade Hemeon entitled "Royal's Burlington Drive-In Bank Provides Customers 24-Hour Tellers," The Toronto Star, 1 page (Aug. 21, 1991).
Royal Bank, article by Murray Oxby entitled "Royal Bank Opens 'Super Branch,'" The Gazette Montreal, 1 page (Sep. 14, 1991).
Royal Bank, brochure for "SuperBranch," 2 pages (Feb. 1992).
Scan Coin AB, "International Report," 24 pages (Apr. 1987).
Scan Coin AB, brochure for "CDS Cash Deposit System," 7 pages (no date).
Scan Coin AB, brochure for "Money Processing Systems," 8 pages (no date).
Scan Coin AB, brochure for "Scan Coin World," 2 pages (Feb. 1988).
Scan Coin AB, Technical Manual for "Cash Deposit System Model CDS 600 & CDS 640," 48 pages (no date).
Scan Coin AB, Technical Manual for "CDS MK1 Coin Deposit System," 32 pages (1991).
Scan Coin AB, Technical Manual for "SC 102 Value Counter," 28 pages (no date).
Scan Coin AB, Technical Referens Manual for "CDS Coin Deposit System," 48 pages (1989).
Scan Coin AB, User's Manual for "CDS 600," 24 pages (no date).
Scan Coin CDS 600 Cash Deposit System, 2 pages (Jun. 15, 1994).
Scan Coin CDS 640 Cash Deposit System, 2 pages (Jun. 15, 1994).
Siemens Nixdorf lnformationssysteme AG, brochure for "ProCash CRS," 4 pages (1997).
Toshiba Corporation, brochure for "CF-400 Series," 6 pages (no date).
Toshiba-Mosler, CF-420, 4 pages (estimated 1989).
Toshiba-Mosler, Operator's Manual for CF-420 Cash Settlement System, 180 pages (1989).
Toshiba-Mosler, revised drawings of portions of CF-420 Cash Management System (FIGS. A-C) and description of same, 4 pages (1989).
Cummins-Allison Corp. Jetsort 1750/60/70 Sorter/Counter, 132 pages (undated).
Cummins JetSort® High Speed Coin Sorter/Counter Model 1701—Product Information Manual, 6 pages (1987).
Cummins JetSort® Communication Package for Models 1770 and 3000 Series JetSort, 10 pages (undated).
Cummins JetSort® Coin Sorter/Counter Model 1760—Product Information Manual, 2 pages (undated).
Cummins Automated Money Processing Systems "No Wonder You Love It . . . It Was Designed for You!" —Advertising Sheet, 1 page (undated).
Cummins Operating Instructions for JetSort Model 1765, 32 pages (Apr. 14, 1989).
Cummins-Allison Corp. Operator's Manual for JetSort® High Speed Coin Sorter/Counter 3000 Series, 60 pages (undated).
Cummins-Allison Corp. JetSort® Parts & Service Manual for Model CA-1701, 188 pages (© 1987).
Cummins JetSort® Operating Instructions for JetSort® Model CA-700-01 Coin Sorter/Counter, 14 pages (© 1982).
Cummins-Allison Corp. Operating Instruction for JetSort, 54 pages (© 1980).
Cummins JetSort® Model 1701 With Jetstops Coinsorter Operating Instructions Manual, 17 pages (© 1984).

Cummins-Allison Corp.—Product Information Sheet for JetSort® High Speed Coin Sorters 3000 Series, 2 pages (undated).

Cummins-Allison Corp.—AMS Cummins Automated Money Systems—Case Study "Cummins Money Processing System Boosts Teller Service at University State Bank," 2 pages ($1^{st}$ print Nov. 1981).

Cummins-Allison Corp.—AMS Cummins Automated Money Systems—Case Study "6,000 Coin Per Minute Counter/Sorter Keeps Pace With Fifth-Third Bank's Money Processing Needs," 2 pages ($1^{st}$ print Mar. 1982).

Cummins-Allison Corp.—AMS Cummins Automated Money Systems—Case Study "JetSort® Gives Bank Coin Service Edge," 2 pages ($1^{st}$ print Apr. 1982).

Cummins-Allison Corp.—"What do all these Banks have in Common . . . ? They all rely on Cummins Quality Products," 3 pages ($1^{st}$ print Aug. 1982).

Cummins-Allison Corp.—"The Universal Solution To All Coin And Currency Processing Needs," 1 page (final print Mar. 1983).

Cummins-Allison Corp.—"Money Processing Made Easy. The cost-effective counting pair for increased . . . Speed, Accuracy and Ease-of-Operation in all coin and currency processing installations," 2 pages ($1^{st}$ print Jun. 1983).

Cummins-Allison Corp.—AMS Cummins Automated Money Systems—Case Study "High Speed Coin Processing Power at Covenco Vending," 2 pages ($1^{st}$ print Jul. 1983).

Cummins-Allison Corp. Product Information Sheet for Model CA-701, 2 pages ($1^{st}$ print Jul. 1983).

Cummins-Allison Corp. Product Information Sheet for Model 1701, 2 pages ($1^{st}$ print Jul. 1985).

Cummins-Allison Corp. Product Information Sheet for The JetSort® , 1 page (dated Mar. 1990).

Cummins-Allison Corp. "Count on Cummins" —Product Information JetSort—With Adjustable Bag Stops! Perfect for Dollar Bill Validators, 1 page (dated Apr. 1987).

Cummins-Allison Corp. "Count on Cummins" —Product Information JetSort—With Adjustable Bag Stops! Perfect for Dollar Bill Validators, 3 pages (dated Apr. 1987).

Cummins-Allison Corp.—Product Information for JetSort® Coin Sorter/Counter Model CA-750, 2 pages (dated Feb. 1984).

Cummins-Allison Corp.—Product Information for JetSort® Coin Sorter/Counter Model 1750, 2 pages (dated Jul. 1985).

Cummins-Allison Corp.—Product Information for JetSort® Coin Sorter/Counter Model 1760, 2 pages (dated Jul. 1985).

Cummins-Allison Corp.—Product Information for JetSort® High Speed Coin Sorter/Counter—the JetSort Model 1770, 1 page (dated Oct. 1986).

Cummins-Allison Corp.—Product Information for JetSort® Coin Sorter/Counter Model 1765, 1 page (dated Apr. 1989).

Cummins-Allison Corp.—Product Information for JetSort® 3000, 3,000 Coin per Minute Sorter/Counter "Special Preview," 1 page (dated Nov. 1987).

Cummins-Allison Corp.—Product Information for JetSort® 3000, "Breakthrough Technology 3,000 Coin per Minute" 99.95% Accurate, 2 pages (dated Mar. 1988).

Cummins-Allison Corp.—"Time For A Change—JetSort® vs. Brandt X," 1 page (dated Jun. 1988).

Cummins-Allison Corp.—"Time For A Change—No Coins Sorted After 3:00 or on Saturday," 1 page (dated Jun. 1988).

Cummins-Allison Corp.—Time For A Change—Be A Smashing Success!, 1 page (dated Jun. 1988).

Cummins-Allison Corp.—"Talking JetSort 3000—Listen to what JetSort has to say!," 1 page (date unknown).

Cummins-Allison Corp.—Enhanced Electronics For the JetSort® 3200, 1 page (dated Apr. 1989).

Cummins-Allison Corp.—High Speed Coin Sorter & Counter for Payphone Applications, 2 pages (dated Mar. 1990).

Cummins-Allison Corp.—JetSort® Series V, High Speed Coin Sorter/Counter, 2 pages (dated Sep. 1990).

Cummins-Allison Corp.—General Services Administration—Office of Federal Supply Services—Authorized Federal Supply Schedule Price List—Catalog, 32 pages ($1^{st}$ print Jun. 1986—obsolete Jul. 1987).

SDS-100 Self Service Coin Deposit Station (1 page).

Cummins-Allison Corp.—JetSort® Series 750, 1750, 1760 & 1770 Service Manual (168 pages).

* cited by examiner

SYSTEMS, APPARATUS, AND METHODS FOR CURRENCY PROCESSING CONTROL AND REDEMPTION

CROSS-REFERENCE TO RELATED APPLICATIONS

This application claims the benefit of the U.S. Provisional Application 60/793,573 filed on Apr. 20, 2006, entitled "Systems, Apparatus, And Methods For Currency Processing Control And Redemption" and U.S. Provisional Application 60/785,251 filed on Mar. 23, 2006, entitled "Systems, Apparatus, And Methods For Currency Processing Control And Redemption" and both of these provisional applications are hereby incorporated by reference in their entirety.

FIELD OF THE INVENTION

The present invention relates generally to the field of currency handling systems and, more particularly, to systems, apparatus, and methods for currency processing, redemption, and control systems therefor.

BACKGROUND OF THE INVENTION

Currency processing machines generally have the ability to receive bulk currency (e.g., currency bills and/or coins) from a user of the machine. Coin processing machines, for example, are commonly used as coin redemption machines wherein, after the deposited coins are counted and totaled, a receipt is issued indicating the value of the deposited coins. The user may redeem this receipt for the amount of deposited coins in the form of currency bills or, optionally, for an amount of the deposited coins less a commission charged for use of the coin redemption machine.

Coin redemption machines, in particular, are commonly used in both banking environments, business environments (e.g., armored transport services, telephone companies, etc.) and retail environments, such as grocery stores. In operation, a user inputs a batch of coins of mixed denominations into a hopper of the coin redemption machine. The machine discriminates items that are not valid coins, determines the value of the valid deposited coins and outputs a receipt indicative of the determined amount. In some embodiments, the receipt also indicates a second, lesser amount, which reflects a commission charged for use of the machine. The user redeems the receipt for paper currency for the value of the deposited coins less the commission. In a banking environment, a user may redeem the receipt at a teller's window, whereas, in a retail environment, the user can redeem the receipt at a cashier's station or a customer-service station.

One disadvantage associated with prior art coin redemption machines is the potential for fraud which exists with current receipt-type systems. For example, a receipt can be duplicated (i.e., counterfeited) and then redeemed more than once resulting in a loss for that particular store. Furthermore, if the receipt is lost by the user or is stolen from the user, the prior art machines fail to provide any manner for the user to recover their funds. Someone who has stolen or found the receipt can simply redeem the receipt from the retailer's cashier and receive the cash payment. Additionally, receipts may be altered, so as to fraudulently increase an apparent value of the receipt in an attempt to obtain more money from the receipt that its true value. Accordingly, as one example, U.S. Pat. No. 6,349,972, discloses a coin redemption machine printed voucher comprising various devices to deter, reduce, or eliminate unauthorized duplication or counterfeiting of such voucher, including various special inks, papers, indicia, and/or perforations. These devices and many others (e.g., holograms, optically variable devices, watermarks, fluorescent fibers, taggants, threads, barcodes, batch and date codes, micro-perforations, etc.), have been long-known in the negotiable instrument field and have been applied in a long-standing struggle to stem losses attributable to counterfeiting.

Access to portions of currency processing machines other than the currency input region is another area involving security concerns. Currency processing machines typically employ mechanically-based, electronically-based, and/or software-based systems to control access to associated portions of the currency processing machine. For example, key-based, combination-based, or alphanumeric-based locking devices and/or electronically-based access systems are typically used to physically control access to various portions of the currency processing machine. Identification-related access devices (e.g., magnetic cards, entry of identification codes via a keypad, etc.) are also typically used to control access to the software and/or functions of the currency processing machine. Persons having a need to access the device and/or to execute supervisory functions relating to the device are typically provided a key, combination, or password to bypass security features utilized to control access to such device and/or functions. However, keys, access cards, ID cards, passwords and/or combinations may be variously copied, stolen, compromised, lost, or forgotten. Mechanically-based systems also lack auditing features to affirmatively track the actual identity of those accessing the device and/or device functions.

Biometric systems are now being implemented in automated teller machines ("ATMs") and common personal electronic devices (e.g., laptop computers) as a security feature to identify a user as an authorized user of the machine or device. As underlying assumption behind any biometric system is that the measured biometric characteristic or characteristic are sufficiently distinctive so as to permit effective differentiation between individuals and sufficiently repeatable so as to serve its intended purpose of provided substantially unimpeded access to an associated machine, device, or area if the data corresponding to the user's individual characteristic(s), such as a fingerprint, is determined to match stored data corresponding to such user's individual characteristic(s). Examples of ATMs utilizing a biometric input device are shown in U.S. Pat. Nos. 6,023,688, 6,793,134, and 7,000,832, the disclosure of each of which is fully incorporated herein by reference.

A need exists for currency processing systems, such as coin redemption systems, to provide a secure and reliable system and method for exchanging value for services or products and/or to provide security measures to guard against the unauthorized access and/or use, and to protect against counterfeiting or forging of redeemable instruments issued therefrom.

SUMMARY OF THE DISCLOSURE

The aspects of the present concepts disclosed herein are generally directed to currency processing machines configured to provide security measures to guard against the unauthorized access and/or use, and to protect against counterfeiting or forging of redeemable receipts or negotiable instruments issued therefrom.

In accord with one aspect, the present concepts include a coin processing and redemption system, comprising a coin processing machine configured to receive a batch of coins in an input region and process the batch of coins to determine a value thereof, a first biometric device configured to receive a user's biometric input, and a first communication device configured to output a signal bearing first data relating to the biometric input and second data relating to the value to a local computer, remote computer, computer network, and/or computer-readable storage medium. This aspect of the coin processing and redemption system also includes a second biometric device configured to receive another biometric input of the user and to output a signal bearing third data related to such biometric input to a controller configured to access the first data from the local computer, remote computer, computer network, and/or computer-readable storage medium. The controller is further configured to compare the first data with the third data to determine a degree of correspondence therebetween, and to output a signal associating the third data to the first data and/or the second data when the degree of correspondence satisfies at least one predetermined criterion.

In accord with another aspect, the present concepts include a coin processing system, comprising a coin processing machine configured to receive a batch of coins in an input region and process the batch of coins to determine a value thereof, a display device, and a first biometric device configured to receive a user's biometric input. The coin processing system also comprises a controller configured to extract at least one feature from the biometric input, to compare the feature(s) with an acceptable range for the feature(s), and to output a signal to the display device relating an acceptance of or a failure to accept the biometric input.

In accord with yet another aspect, the present concepts include a method for implementing a loyalty program comprising the acts of opening a loyalty account for a user, receiving a user's biometric input and storing data relating to the user's biometric input on a computer-readable storage medium in association with the user's loyalty account, receiving a subsequent biometric input from the user in association with a transaction, and associating information relating to the transaction to the user's loyalty account.

In accord with still another aspect, the present concepts include a currency processing system comprising a currency processing machine configured to receive a batch of currency in an input region and process the batch of currency to determine a value thereof, a biometric device configured to receive a user's biometric input, and a controller configured to extract at least one feature from the biometric input and to compare the feature(s) with at least one stored value of the feature(s) for the user. The controller is also configured to, responsive to a match between the feature(s) and the stored value of the feature(s), output a control signal to the currency processing machine and/or a remote computer via a communication device.

In accord with still another aspect, the present concepts include a currency processing system, comprises a currency processing machine configured to receive a batch of currency in an input region and process the batch of currency to determine a value thereof, a first biometric device configured to receive a user's first biometric input, a second biometric device configured to receive a user's second biometric input, and a controller. The controller is configured to extract at least one feature from each of the first and the second biometric inputs. The controller is also configured to compare the feature(s) from the first biometric input to a stored value(s) of the first feature for the user and to compare the feature(s) from the second biometric input to a stored value(s) of the second feature for the user. The controller is further configured to, responsive to a match between at least one of the first feature and the stored value(s) of the first feature and the second feature and the stored value(s) of the second feature, output a control signal to the currency processing machine and/or a remote computer via a communication device.

In accord with another aspect, a currency processing system in accord with at least some aspects of the present concepts comprises a currency processing machine configured to receive a batch of currency in an input region and process the batch of currency to determine a value thereof and a biometric device configured to receive a user's first biometric input, comprising a fingerprint for a first finger of the user, and to receive a user's second biometric input, comprising a fingerprint for a second finger of the user. This currency processing system also includes a controller configured to extract at least one feature from each of the first biometric input and the second biometric input. The controller is further configured to compare the feature(s) from the first biometric input to a stored value(s) of the first feature for the user and to compare the feature(s) from the second biometric input to a stored value(s) of the second feature for the user. The controller is also configured to output, responsive to a match between at least one of the first feature(s) and the stored value(s) of the first feature and the second feature(s) and the stored value(s) of the second feature(s), a control signal to the currency processing machine and/or a remote computer via a communication device.

In another aspect of the present concepts, a method for regulating a currency processing system, comprising the acts of receiving a user's first biometric input, extracting at least one feature from the first biometric input, comparing the at least one feature from the first biometric input to a stored value of the first feature for the user. This method also includes the acts of receiving a user's second biometric input, extracting at least one feature from the second biometric input, and comparing the at least one feature from the second biometric input to a stored value of the second feature for the user. The method also includes the act of outputting a control signal to a currency processing machine and/or a remote computer via a communication device in response to a match between the first feature and the stored value of the first feature and/or the second feature and the stored value of the second feature.

In another aspect of the present concepts, a currency processing and redemption system comprises a coin processing machine configured to receive a batch of coins in an input region and process the batch of coins to determine a value thereof, a first biometric device configured to receive a user's first biometric input, a second biometric device configured to receive a user's second biometric input, and a controller configured to extract at least one feature from each of the first biometric input and the second biometric input.

In still another aspect of the present concepts, a redemption system is provided comprising a coin processing machine configured to receive a batch of coins in an input region and process the batch of coins to determine a value thereof, the coin processing machine comprising a first biometric device configured to receive a user's biometric input and a communication device configured to output at least a first signal relating to the biometric input and a second signal relating to the value. A second biometric device is provided and is configured to receive another biometric input of the user. The second biometric device is associated with a point of sale terminal. The redemption system also includes a controller configured to compare the first signal to the another biometric input to determine a degree of correspondence therebetween. The controller is also configured to output an output signal when the degree of correspondence satisfies at least one predetermined criterion, the output signal associating data related to the first signal and/or the second signal to the user providing the another biometric input.

In yet an additional aspect of the present concepts, a redemption system comprises a coin processing machine configured to receive a batch of coins in an input region and to process the batch of coins to determine a value thereof. The coin processing machine further comprises a first biometric device configured to receive a user's biometric input and a communication device configured to output at least a first signal relating the biometric input and the value. The redemption system also includes a second biometric device, associated with a point of sale terminal, configured to receive another biometric input of the user. The redemption system further includes a controller configured to compare a portion of the first signal relating to the biometric input to the another biometric input to determine a degree of correspondence therebetween. The controller is also configured to output an output signal when the degree of correspondence between the portion of the first signal relating to the biometric input the another biometric input satisfies at least one predetermined criterion. The output signal associates a portion of the first signal relating to the value to the user providing the another biometric input.

In still another aspect, the present concepts include a redemption system, comprising a coin processing machine, disposed in a first store, configured to receive a batch of coins in an input region and to process the batch of coins to determine a value thereof. The coin processing machine comprises a first biometric device configured to receive a user's biometric input and a communication device configured to output at least a first signal relating to the biometric input and a second signal relating to the value. The redemption system also includes a second biometric device, disposed in a second store, configured to receive another biometric input of the user in connection with a transaction, the second biometric device being associated with a point of sale terminal at the second store. The redemption system additionally includes a controller configured to compare the first signal to the another biometric input to determine a degree of correspondence therebetween and to output an output signal when the degree of correspondence satisfies at least one predetermined criterion. The output signal associates data related to the first signal and/or the second signal to the user providing the another biometric input.

In another aspect of the present concepts, a redemption system is provided comprising a coin processing machine, disposed in a first store, configured to receive a batch of coins in an input region and to process the batch of coins to determine a value thereof. The coin processing machine comprises a first biometric device configured to receive a user's biometric input and a communication device configured to output at least a first signal relating the biometric input and the value. A second biometric device, disposed in a second store, is configured to receive another biometric input of the user in connection with a transaction, the second biometric device being associated with a point of sale terminal. The redemption system also includes a controller configured to compare a portion of the first signal relating to the biometric input to the another biometric input to determine a degree of correspondence therebetween. The controller is also configured to output an output signal when the degree of correspondence satisfies at least one predetermined criterion, the output signal associating a portion of the first signal relating to the value to the user providing the another biometric input.

Also provided is a currency processing data management system, comprising a currency processing machine including a currency discrimination device, a user input device, a currency storage device, a controller, and a first computer-readable storage medium. The controller is configured to store processing information in the first computer-readable storage medium, and the first computer-readable storage medium bears an instruction set configured to transfer the processing information from the first computer-readable storage medium to a communication port configured to receive a second portable computer-readable storage medium. In this currency processing data management system, the processing information comprises a sub-batch total, batch total, day total, transaction total, denomination totals, beginning day balance, end of day balance, beginning shift balance, end of shift balance, number of bags full, and/or a number of bags changed.

In still another aspect of the present concepts, a method of managing data from a currency processing system comprises the acts of processing currency in a currency processing machine, storing currency processing information in a first computer-readable storage medium, transferring the processing information from the first computer-readable storage medium to a second portable computer-readable storage medium using a communication port, and transferring the processing information from the secondary computer-readable storage medium to a computer. The method of managing data includes tracking the processing information using the computer. The processing information comprises a sub-batch total, batch total, day total, transaction total, denomination totals, beginning day balance, end of day balance, beginning shift balance, end of shift balance, number of bags full, and/or a number of bags changed.

In another aspect, a redemption system is provided comprising a coin processing machine configured to receive a plurality of coins in an input region and to process said plurality of coins to determine a value thereof, a user input device configured to receive an input of a code selected by a user, a controller configured to associate the code to the value, and a communication device configured to output the code and the value to a coin processing machine computer-readable storage medium, a local computer and/or a remote computer.

In another aspect, a currency redemption method in accord with at least some embodiments of the present concepts comprises the acts of processing a plurality of coins to determine a value thereof and receiving, through a user input device, a code selected by a user. The method also includes associating the code to the value and outputting the code and the value to a coin processing machine computer-readable storage medium, a local computer and/or a remote computer.

In other aspects, a redemption system may comprise a coin processing machine configured to receive a plurality of coins in an input region and to process the plurality of coins to determine a value thereof. The coin processing machine comprises a receipt printer and a controller, the controller being configured to cause the receipt printer to output a receipt bearing a code randomly generated by the controller and to associate the code to the value. The redemption system also comprises a communication device configured to output the code and the value to a computer-readable storage medium, a local computer and/or a remote computer.

A redemption system in accord with still another aspect of the present concepts comprises a coin processing machine configured to receive a plurality of coins in an input region and to process the plurality of coins to determine a value thereof, the coin processing machine comprising a card dispenser and a controller. The controller is configured to cause the card dispenser to output a first card bearing a first code randomly generated by the controller and written to the card by a writing device or a second card bearing a second predetermined code embedded in the card. The controller is also configured to activate a respective one of the first code and the second predetermined code and associate the activated code to the value. A communication device is provided and is configured to output the value and the activated code to a coin processing machine computer-readable storage medium, a local computer and/or a remote computer.

In yet other aspects, a currency redemption method comprising the acts of processing a plurality of coins in a coin processing machine to determine a value thereof and dispensing a first card bearing a first code randomly generated by the controller and written to the first card by a writing device and a second card bearing a second predetermined code embedded in the card. The method also includes the acts of activating a respective one of the first code and the second predetermined code contemporaneously with or subsequent to the act of processing and prior to the act of dispensing, associating the activated code to the value, and outputting the activated code and the value to a coin processing machine computer-readable storage medium, a local computer and/or a remote computer.

Another redemption system in accord with at least one aspect of the present concepts comprises a coin processing machine configured to receive a plurality of coins in an input region and to process the plurality of coins to determine a value thereof, the coin processing machine comprising a reading device configured to read a code comprising an identification code, an account code, and/or a transaction code from a code bearing medium. A communication device is provided and is configured to output data relating to the value and data relating to the code to at least one of a computer-readable storage medium, a local computer, a remote computer, a server, and a computer network.

In another aspect of the present concepts, a method for redeeming currency is provided comprising the act of providing a coin processing machine configured to receive a plurality of coins in an input region and to process the plurality of coins to determine a value thereof, the coin processing machine comprising a first reading device configured to read a code comprising an identification code, an account code, and/or a transaction code from a code bearing medium. The method also includes the acts of reading a code from a code bearing medium using the first reading device and, following the reading of the code, processing a plurality of coins to determine a value thereof. The method further includes outputting data relating to the value and data relating to the code to a redemption interface associated with at least a second reading device configured to read a code of the same type as the first reading device. The method also includes the acts of reading a code from a code bearing medium using the second reading device, outputting data relating to the code read by the second reading interface to a controller, and comparing the data relating to the code from the first reading device to the data relating to the code from the second reading device to determine if the codes match. Responsive to a match of the codes in the act of comparing, at least one of currency, product, and service in an amount up to the value is provided.

Still another aspect of the present concepts includes a method for redeeming currency, comprising the acts of providing a coin processing machine configured to receive a plurality of coins in an input region and process the plurality of coins to determine a value thereof, the coin processing machine comprising a first reading device configured to read information from an information bearing medium, reading information the information code bearing medium using the first reading device, and processing a plurality of coins to determine a value thereof. The method also includes outputting data relating to the value and data relating to the information to a redemption interface associated with at least a second reading device configured to read information of the same type as the first reading device. The method further includes the acts of reading information from an information bearing medium using the second reading device, outputting data relating to the information read by the second reading interface to a controller, and comparing the data relating to the information from the first reading device to the data relating to the information from the second reading device to determine if the information matches. Responsive to a match of the information in the act of comparing, at least one of currency, product, and service in an amount up to the value is provided.

In another aspect of the present concepts, a method for utilizing a coin processing machine is provided which includes the acts of receiving a user's biometric input, storing data relating to the biometric input on a computer-readable storage medium, and associating a use of the coin processing machine, access to the coin processing machine, and/or access to information relating to transactions performed by the coin processing machine with the biometric input received in the act of receiving.

In still another aspect of the present concepts, a method for redeeming coins includes the acts of receiving a plurality of coins in a coin processing machine, processing the plurality of coins to determine a value thereof, associating said value with a code, and redeeming the value to a person presenting said code.

In yet another aspect of the present concepts, a method for redeeming coins includes the acts of receiving a plurality of coins in a coin processing machine, processing the plurality of coins to determine a value thereof, associating the value with a code, and redeeming at a kiosk, ATM, POS, and/or a vending machine at least a portion of the value to a person presenting the code.

In one aspect, a coin processing and redemption system includes a coin processing machine configured to receive a batch of coins in an input region and process the batch of coins to determine a value thereof. A dispensing device is provided and is configured to output a redemption ticket bearing a code. The coin processing machine is configured to associate the redemption ticket code with a coin processing transaction prior to the determination of a value of a batch of coins.

In another aspect, a coin processing and redemption system includes a coin processing machine configured to receive a batch of coins in an input region and process a batch of coins to determine a value thereof. The coin processing machine also includes a controller and a communication device. The controller is configured to associate a code to a transaction to be performed on the coin processing machine and to output the code to an external receiving device via the communication device prior to prior to a determination of a value of the batch of coins.

In still another aspect, a coin processing and redemption system includes a coin processing machine configured to receive a batch of coins in an input region and process the batch of coins to produce coin processing information, the coin processing information comprising at least a value of the processed batch of coins. A controller is configured to associate a code with a coin processing transaction and a communication device associated with the coin processing machine is configured to output the coin processing information. A redemption location includes a communication device configured to output to an external receiving device a total amount relating to the value upon receipt of the code and to close out the coin processing transaction.

In yet another aspect, a method for processing coins includes the act of providing a coin processing machine comprising a controller and a first input device, the coin processing machine being configured to receive a batch of coins in an input region and process the batch of coins to determine a value thereof. The method for processing coins further includes the acts of inputting via the first input device a code prior to initiation of coin counting and relating the code to a subsequent coin counting. The method for processing coins also includes the acts of inputting the code into a second input device at a redemption location and disbursing funds related to the value responsive to the input of the code into the second input device.

In still another aspect, a method for redeeming coins is providing and includes the acts of receiving a plurality of coins in a coin processing machine, processing the plurality of coins to determine a value thereof, associating the value with a code, and outputting a ticket bearing the code, but not bearing any indication of value. The method for redeeming coins also includes the acts of communicating at least the value and the code to a redemption location via a communication device and presenting the ticket at the redemption location.

In yet another aspect, a method for redeeming coins includes the acts of receiving a plurality of coins in a coin processing machine, processing the plurality of coins to determine a value thereof, and outputting a receipt bearing at least one of a code, a total amount related to the value, a time, and a date. The method for redeeming coins also includes the acts of communicating information related to the receipt to a redemption location and presenting the receipt at the redemption location.

In accord with another aspect of the present concepts, a coin processing and redemption system is provided comprising a coin processing machine configured to receive from a user a randomly oriented batch of coins in an input region and process the batch of coins to determine a value thereof. A first display is configured to display the value to the user and a controller is configured to output a signal relating to the value. A product dispenser is operatively associated with the coin processing machine and is configured to receive the signal output by the controller, the product dispenser including at least one actuatable switch responsive to the signal or a control signal output responsive to the signal.

In accord with still another aspect of the present concepts, a coin processing and redemption system comprises a fuel dispenser configured to output fuel, the fuel dispenser comprising a user input device configured to receive a user input, a switch configured to regulate dispensing of fuel, a metering device configured to measure an amount of dispensed fuel, and a first controller configured to control operation of the switch and to determine a value of the dispensed fuel. A coin processing machine is configured to receive from a user a randomly oriented batch of coins in a coin input region and process the batch of coins to determine a value of valid coins in the batch of coins. A first display is configured to display the value of valid coins to the user and a second controller is configured to output to the first controller a signal bearing a total value related to the value of valid coins via a communication device, the first controller being configured to control operation of the switch, responsive to the signal, to enable dispensing of fuel of a value corresponding to the total value. In various aspects thereof, the coin processing and redemption system may optionally and further comprise a bill processing module configured to receive input bills and/or a card processing module configured to read a card bearing a data storage medium, and/or a data reading device configured to read data from a device comprising a magnetic storage medium, optical storage medium, or signal emitting device. A value corresponding to a determined value of any input valid bills, input value from a card, or input value from such medium or device is added to the value of valid coins.

In yet additional aspects of the present concepts, a coin processing and redemption system includes a coin processing machine configured to receive from a user a randomly oriented batch of coins in an input region and process the batch of coins to determine a value thereof and a controller configured to associate a code with a total amount relating to the value and to output the code and the total amount to a product dispenser. An output device (e.g., a display, a printer, a magnetic writing device, etc.) is also provided and is configured to output to a user the code and one or both of the value or the total value. The coin processing and redemption system also includes a product dispenser. The product dispenser comprises a user input device, a controller, a communication interface, and at least one switch configured to regulate an output of a product from the product dispenser. The product dispenser user input device is configured to receive a code input by a user and the product dispenser controller is configured to compare the input code to a code output by the coin processing machine controller to determine if there is a match, and the product dispenser controller is further configured to control the switch to enable dispensing of the product responsive to a match between the input code and the code output by the coin processing machine.

Also included in the present concepts is a method for processing and redeeming a batch of coins, comprising the act of providing a coin processing machine comprising a controller, a display, a communication device, and a coin input region, the coin input region being configured to receive a batch of randomly oriented coins, and the controller being configured to determine a value of valid coins in the batch of coins. The method further comprises the acts of determining a value of valid coins in an input batch of coins, outputting from the communication device a signal bearing a total value related to the value of valid coins in the batch of coins to a product dispenser, and of dispensing a product from the product dispenser responsive to the signal, the product having a value relating to the total value. The method optionally, but preferably also includes the acts of comparing the code input into the user interface with the code output to the product dispenser and dispensing a product from the product dispenser responsive to a matching of codes in the act of comparing. Further acts in accord with this method may optionally, but advantageously, include the acts of outputting a code to a user, outputting the code to said product dispenser, and, correspondingly, inputting the code into a user interface associated with the product dispenser.

The above summary of the present invention is not intended to represent each embodiment, or every aspect, of the present invention. Additional features and benefits of the present invention will become apparent from the detailed description, figures, and claims set forth below.

BRIEF DESCRIPTION OF THE DRAWINGS

Other objects and advantages of the invention will become apparent upon reading the following detailed description in conjunction with the drawings.

Figure 1:
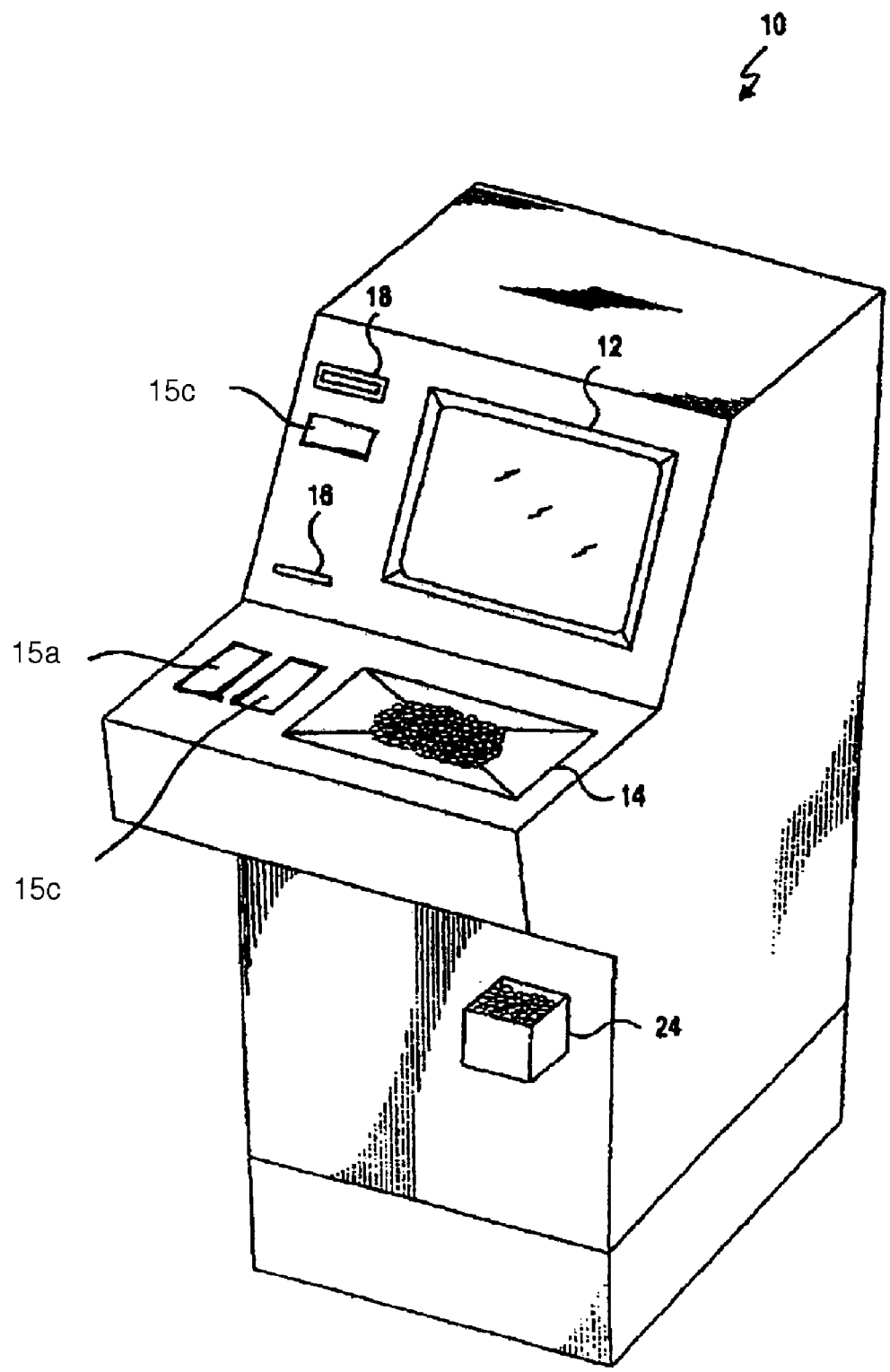
FIG. 1 is a perspective view of a currency processing machine in accord with at least some aspects of the present concepts.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION OF THE ILLUSTRATED EMBODIMENTS

FIG. 1 shows one example of a currency processing machine 10, more particularly a coin redemption machine, which may be used in accord with aspects of the present concepts. The term currency, as used herein, applies generally to any media having value, such as but not limited to, any combination of government-issued or privately-issued coins, bills, tokens, scrip, negotiable instrument, checks, papers, ticket, voucher, cards, tags, markers, or electronic devices. Examples of currency processing machines 10 which may be advantageously implemented in combination with the present concepts are shown, for example, in U.S. Pat. Nos. 6,996,263 B2, 6,896,118 B2, 6,810,137 B2, 6,748,101 B1, 6,731,786 B2, 6,724,926 B2, 6,678,401 B2, 6,603,872 B2, 6,579,165 B2, 6,318,537 B1, 6,171,182, 6,068,194, 6,039,645, 6,021,883, 5,997,395, 5,982,918, 5,943,655, 5,905,810, and 5,564,974, each of which is incorporated herein by reference in its entirety.

The currency processing machine 10 may, in accord with at least some aspects of the present concepts, include a currency dispensing module for dispensing currency in the amount of the deposited coins, or in the amount of the deposited coins less a fee. For example, a currency processing machine 10 in accord with aspects of the present concepts could include a bill dispensing module to dispense currency bills, from one or more currency bill storage units, in the amount of the deposited coins, or in the amount of the deposited coins less a fee. For example, a deposit of $67.43 in coins into such currency processing machine 10 could result in currency bills and/or coins dispensed to the customer in such amount, minus any transaction fees (e.g., $62.00, $63.00, $64.00, $65.00, $66.00, or $67.00 in bills or other combination of bills and change). The divisions of value for such currency media is not limited in accord with the present concepts and is dictated only by the selected currency media (e.g., $1, $2, $5, $10, $20, etc. for U.S. currency bills, whereas a check or money order could be issued for any amount). Such currency processing machine 10 may also be configured to output change, such that, for example, $67.00 in bills are dispensed and $0.43 in change is dispensed.

Generally, the currency processing machine 10 in accord with the present concepts is configured to accept any item(s) having value and to dispense and/or enable the dispensing of (e.g., through a kiosk or ATM) or providing of any other item(s) or service(s) having value generally and/or having value to the customer. In this regard, items or services may be offered which may have different values to different customers and it is be left to a customer to select such items, if desired, based on their own personal circumstances and needs. Still further, in at least some aspects, the currency processing machine 10 is configured to provide non-currency processing transactions (e.g., an information booth).

Currency processing machines 10 in accord with the present concepts, unless otherwise indicated, may comprise stand-alone machines (e.g., a machine not connected to an external network, computer, controller, system, service, or communication device) or a communicatively linked or linkable machine (e.g., a machine connected to or configured to be connectable with an external network, computer, controller, system, service, terminal, node, communication device, such as a cellular telephone or paging device, or other electronic device, such as a PDA or data storage device).

Whatever the currency or currencies which may be processed by the currency processing machine 10, such currency processing machine may be advantageously configured to perform a discrimination or authentication function. Currency bill discrimination is disclosed for example, in U.S. Pat. No. 3,280,974 (magnetic flux), U.S. Pat. No. 3,870,629 (patterns of grid lines), U.S. Pat. No. 5,151,607 (security thread), U.S. Pat. No. 4,617,458 (magnetizable material), U.S. Pat. No. 4,593,184 (magnetic fields), U.S. Pat. No. 4,356,473 (denomination scans); U.S. Pat. No. 4,381,447 (density), U.S. Pat. Nos. 4,490,846 or 4,992,860 (color), U.S. Pat. No. 4,255,651 (length and thickness), U.S. Pat. No. 4,179,685 (reflectance and transmission); U.S. Pat. No. 5,122,754 (watermark, security thread); U.S. Pat. No. 3,764,899 (thickness), U.S. Pat. No. 3,815,021 (dielectric properties), U.S. Pat. Nos. 5,704,491, 5,790,693, 5,960,103, 6,351,551, 6,724,927, 6,778,693, and 7,016,767, each of which is hereby incorporated by reference in its entirety. Other features and characteristics of the currency media may also be used, without limitation, to perform a discrimination function appropriate to such media. Coin discrimination is disclosed, for example, in references including, but not limited to, U.S. Pat. Nos. 6,892,871, 6,755,730, 6,609,604, 6,171,182, 6,042,470, 5,865,673, and 4,543,969, each of which is hereby incorporated by reference in its entirety.

In the embodiment of the currency processing machine 10 shown in FIG. 1, the currency processing machine 10 includes a touch screen 12 to receive inputs from a user and to display information and prompts or queries to the user. While the touch screen 12 is a preferred mode to enter data from the user of the currency processing machine 10, the currency processing machine 10 may additionally comprise a keypad, a keyboard, a microphone, or one or more buttons to receive user inputs. The user may be permitted to make inputs at any time to select various options before or after processing of the currency. For example, following processing of a batch of coins, the user may be prompted to confirm that the transaction is complete or to confirm that additional coins are to be included with the previously input batch.

The currency processing machine 10 includes, in this example, a coin input area 14 which receives a batch of coins from a user. The quaintly of coins in a batch to be processed is generally unknown to the user at the beginning of the transaction. In some capacities, such as when used as a redemption device, the currency processing machine 10 can be expected to receive batches of coins comprising mixes of various denominations. In some other capacities, the batches of coins may comprise only a single denomination. The coin input area 14 allows the user of the currency processing machine 10 to deposit the user's coins for processing including, but not limited to, sorting, discriminating, and/or counting. Once processed, the value of the batch of coins may be determined and the value converted to another medium (i.e., an electronic account, currency bills, stored value card, credit for purchases in the store in which the currency processing machine 10 is disposed, credit for purchases in a store other than the one in which the currency processing machine 10 is disposed, etc.) available to the user.

In the example of FIG. 1, the currency processing machine 10 coin input area 14 is of a "gravity-feed" type that is generally funnel-shaped to direct coins to a coin processing area within the currency processing machine 10. Alternatively, the coin input area 14 could utilize a pivoting coin tray such as, but not limited to, that shown in U.S. Pat. No. 4,964,495, which is incorporated herein by reference in its entirety. Such pivoting coin trays permit movement of the tray from a first position, where the coin tray is substantially horizontal, to a second position, wherein the coin tray is inclined so as to cause the coins to slide downwardly under the force of gravity into the currency processing machine 10. Alternatively, any other input device employing any alternative means of conveyance may be utilized in accord with the present concepts including, but not limited to a conveyance system (e.g., conveyor belt(s), a rotating disc, or a plurality of counter-rotating discs, etc.).

The currency processing machine 10 may optionally include a paper dispensing slot 16 and/or other dispensing slots or ports for providing a user with a receipt of a transaction performed at the currency processing machine, a ticket, a document, a device, and/or other item, as noted further herein. The currency processing machine 10 may give the user the option of receiving a printed receipt or may automatically provide a printed receipt. A receipt may advantageously be provided in accord with each of the aspects of the present concepts and embodiments described herein.

As used herein, it is to be understood that all of the disclosed concepts apply to any currency processing system, whether such currency processing system is configured to handle coins and bills, only coins, only bills, and/or other currency media. Although specific examples might be provided with respect to a given subset of a currency processing machine 10 (e.g., a coin processing machine), all disclosed concepts apply without limitation to other types of currency processing machines (e.g., coin and bill processing device, bill processing device, self-service coin redemption machine, etc.). Accordingly, for simplicity, all such devices and machines will share herein a common reference numeral and such universal applicability of the concepts disclosed herein is to be understood to apply to all such devices and machines.

In operation, the basic currency processing machine 10 depicted in FIG. 1 receives coins through the coin input receptacle 14, authenticates the coins, counts the valid coins, and outputs a receipt to the user indicating the value of the deposited coins. For example, a user of the currency processing machine 10 may input a batch of coins of different denominations, the batch having a value of $20.50. The currency processing machine 10 would then print a receipt indicating that $20.50 worth of coins has been processed.

In accord with various aspects of the present concepts, discussed further below, a remote terminal at the store service desk (or other areas) may be configured to receive data transmissions from self-service coin redemption machines 10. Since at least one remote terminal is typically provided at store service desks, or other areas, it is not necessary to provide a unique remote terminal for this purpose. Therefore, a self-service coin redemption machine 10 is configured with at least such aspects to transmit the relevant transaction data (e.g., transaction number ID, the amount of the transaction, etc.) to the terminal that already exists at the service desk (or other locations).

An instruction set or program is loaded onto or installed on such remote terminal to receive this transaction data transmitted by the self-service coin redemption machine 10. In accord with various other aspects of the present concepts, discussed further below, the self-service coin redemption machine 10 is configured to directly transmit the transaction data to the point of sale ("POS") terminals at a retail store (e.g., the cash register station at a food store or a checkout counter at other types of stores). Again an instruction set or program is loaded onto or installed on such POS terminal 53 to receive this transaction data transmitted by the self-service coin redemption machine 10 to enhance the seamless communication of the information from the self-service coin redemption machine to the POS terminal(s).

Still further, the self-service coin redemption machine 10 is configured to send transaction data to an kiosk or ATM terminal located outside of the store, business, or financial institution, an ATM network, and/or a kiosk or ATM terminal disposed in the store, business, or financial institution. In accord with these aspects, unique hardware or terminals are not required (e.g., at a self-service desk of a grocery store or other locations) to complete the transaction and provide payment to the customer.

Below are presented various examples and embodiments of currency processing machines 10, inclusive of both coin processing machines and/or bill processing machines, in various configurations in accord with aspects of the present concepts. A currency processing machine 10 in accord with the present concepts may comprise one, several, a combination of more than one, or all the various examples, components, systems, and embodiments presented below, without limitation.

Biometric Identification

In accord with the exemplary embodiments described below, a currency processing machine in accord with the present concepts includes a biometric device. At the beginning of a transaction, the user is asked to identify themselves using a biometric device. Typically, but not necessarily, the biometric device is incorporated in the currency processing machine. Alternatively, the biometric device may optionally comprise a biometric device carried by the user which the user then activates to transmit data to the target currency processing machine 10. For example, some users may carry a fingerprint-based fob (e.g., an electronic key) that may be adapted to input identifying information on the user's biometric characteristic to the currency processing machine 10. This includes, but is not limited to, the scanning of a fingerprint, scanning of one's iris, or other known techniques for biometric identification.

During the transaction or after completion of the transaction, the currency processing machine 10 may optionally direct the customer to a redemption location, communication interface or other location(s) such as, but not limited to, a network, node, service, server, customer service desk, point of sale (POS) area or register, POS terminal, kiosk, ATM, redemption machine, terminal, computer, personal computer, or vending machine, made available to the customer to provide payment or other compensation to the customer or to facilitate a customer's allocation or transfer of funds due to a desired location, account, or medium. Such other location comprises, in at least some aspects, a kiosk, ATM, redemption machine, POS terminal, terminal, computer, or vending machine, integrated with, connected to, or disposed adjacent the currency processing machine 10. The network may include, but is not limited to, any financial institution network, banking network, third party provider (e.g., clearinghouse), internal store network, or the like, or even a personal network between the coin processing machine 10 and a customer's portable electronic device.

At the service desk or other location, as noted above, a biometric device is provided for a customer to provide a biometric input. Therefore, if a fingerprint biometric device were provided, the customer would place his or her finger or designated plurality of fingers on a specified portion of the biometric device at the service desk. In at least some aspects of the present concepts, a service desk employee then matches the customer's biometric input to the appropriate transaction using the remote terminal display found at the service desk. The store employee is then authorized to make the appropriate payment against this transaction and close out the transaction and update any records to close out the transaction. In at least some other aspects of the present concepts, a biometric device is disposed at a point of sale (POS), kiosk, ATM, redemption machine, terminal, computer, or vending machine, for example. To associate the customer's biometric input to a transaction, the customer, for example, places his or her finger or designated plurality of fingers upon the biometric fingerprint device. Alternatively, for any other type of biometric device, the customer provides an appropriate portion of the body proximate to or in contact with a biometric device configured to extract characteristic biometric information from such portion of the body. Such machine then matches the customer's biometric input to the appropriate transaction and, for example, authorizes payment to the customer of the net amount due (e.g., an instruction to an employee at a POS) or accepts in exchange merchandise of an amount less than or equal to the net amount due (i.e., reducing the available funds in association with such biometric input by an amount corresponding to the redemption).

In accord with the present concepts, the currency processing machine 10 comprises one or more biometric devices 15 (e.g., 15a-c, as shown in FIG. 1). These devices may comprise any type or types of biometric devices currently available or later developed, including without limitation, those that obtain biometric readings or measurements from a finger print, facial dimension(s), teeth, retinal structure, iris structure, body part dimension(s), vein pattern, vein dimension(s), thermographic pattern, nailbed dimension(s), and skin spectral response. These devices, such as fingerprint scanners, are well known and will not be described in detail herein, and may include, by way of example, devices comprising signature analysis capabilities, scale (i.e., to measure weight), scent and/or breath recognition, or voice recognition.

Vein scan biometric technology uses near-infrared light to detect vein vessel patterns. These commercially available devices are not intrusive and do not suffer the same negative connotations attached to fingerprint detection devices. Facial thermography detects heat patterns (i.e., thermograms) created by the branching of blood vessels and emitted from the skin by using an infrared camera to capture the images. Facial thermography is not intrusive and requires no physical contact, and works accurately even in dim light or total darkness. Nailbed identification technology is based on the distinct longitudinal, tongue-in-groove spatial arrangement of the epidermal structure directly beneath the fingernail. This structure is mimicked in the ridges on the outer surface of the nail. In a nailbed identification biometric device, an interferometer is used to detect phase changes in back-scattered light incident on the fingernail, the distinct dimensions of the nailbed can be reconstructed and a one-dimensional map generated therefrom.

Face recognition systems can be employed in combination with a currency processing machine 10. Face recognition systems focus on one or more specific features on the face and make a two-dimensional or a three-dimensional map of the face. These systems capture facial images from one or more video cameras and generate templates that are stored and used for comparisons. Suitable face recognition systems may utilize local feature analysis (i.e., looking at specific parts of the face, such as upper sections of eye sockets, area surrounding cheek bones, sides of mouth, distance between eyes, the distance between the eyes, the length of the nose, or the angle of the chin, etc.) or a "whole face" analysis.

Iris recognition provides a fast, highly accurate recognition of a person's identity based on a digitally represented image of the scanned eye. Iris recognition biometric devices look at the unique characteristics of the iris, the colored area surrounding the pupil, which is said to have approximately 266 unique characteristics, compared to the 13 to 60 distinct characteristics associated with many other biometric inputs. Iris recognition systems use small, high-quality cameras to capture a black and white high-resolution photograph of the iris, analyze the iris' structure, process the data into an optical "fingerprint," and translate this optical fingerprint into a digital form. Iris recognition is considered to be safe, fast, and accurate.

All of the aforementioned biometric devices or other biometric devices, produce results based on probabilities. A subsequent scan, measurement, or reading is performed and compared with the template database, or prior reading, and a positive identification is produced according to the level of accuracy set in the system. The margin of error in the electronics, error in user input of the biometric characteristic, the algorithms employed for feature extraction, the desired security level of the application, and other variables are all taken into account. Facial recognition, for example, is generally considered to be subject to larger margins of error than, for example, fingerprint recognition. In at least some alternative aspects, the customer is required to input an additional data field, such as a telephone number, a random number (e.g., 1 digit, 2 digits, 3 digits, etc.), a zip code, a PIN, or the like for additional association with the biometric input. In this way, the database comprising the biometric input and/or characteristic features derived therefrom may be indexed by such additional data field to facilitate searching.

The currency processing machine 10 also preferably includes a media port 18 into which a user may insert a card bearing information such as, but not limited to, an ATM card, a smart card, a credit card, a debit card, a store-issued card, RFID card, a driver's license, a government-issued identification card, an identification card, or the like. The media port 18 is coupled to a media reading/writing device 34 (see FIG. 2) capable of reading from or writing to one or more media types typically associated with information-bearing media, such as those examples noted above. The media may include various types of memory storage technology such as magnetic storage, solid state memory devices and optical devices.

The display 12 is preferably a touch screen display, which provides the user with a variety of inputs, configured in combination with an appropriate instruction set to prompt the user to carry out one or more actions by displaying certain commands and requesting that the user depress touch keys on the touch screen 12 (e.g., entering a PIN, selecting an option, etc.). In one aspect, the display 12 comprises a haptic touchscreen display configured to provide a sensory, tactile feedback (e.g., a vibratory or impulse response) to the customer's input.

Figure 2:
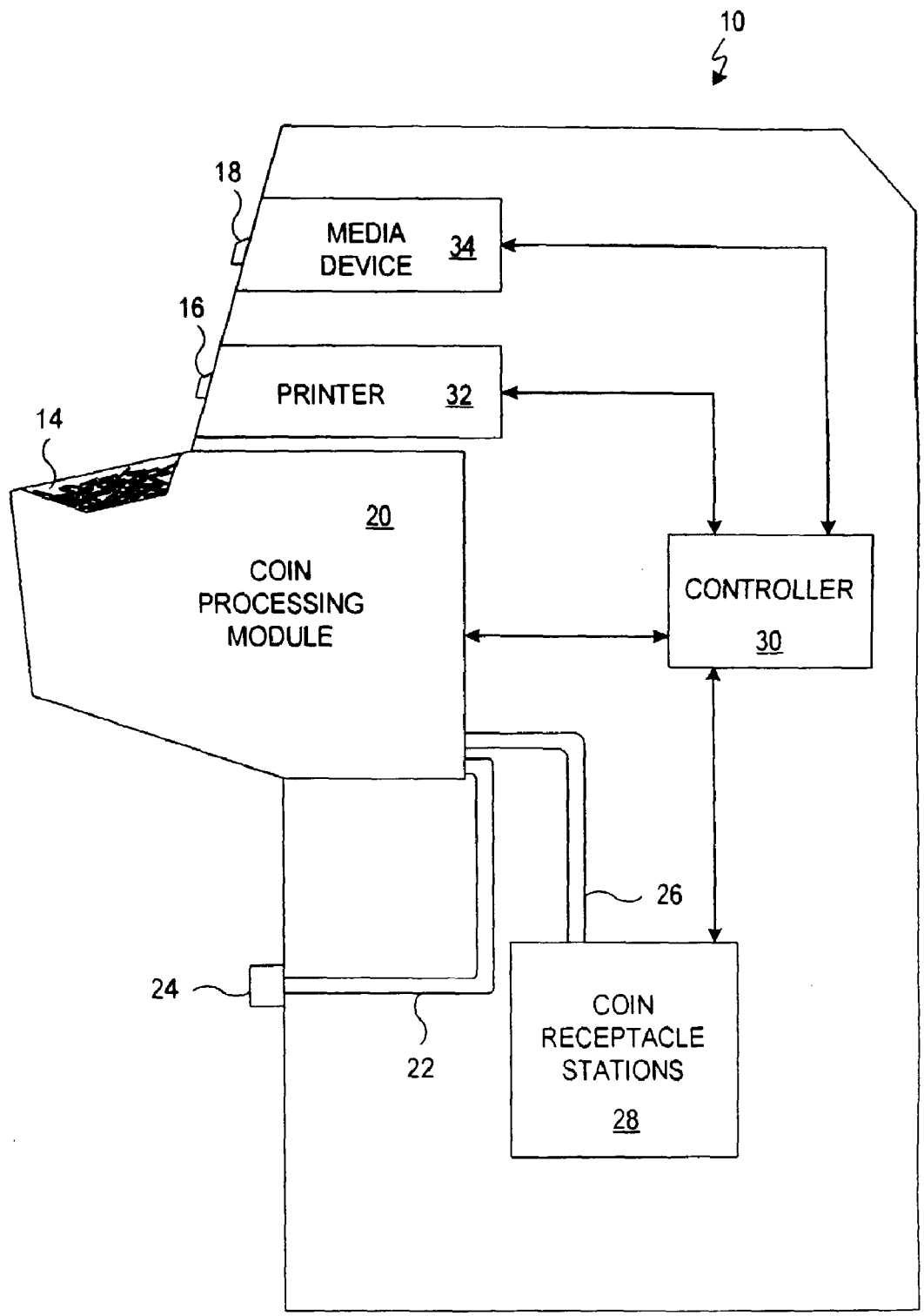
FIG. 2 is a side view of the currency processing machine shown in FIG. 1, which schematically illustrates some of the components present therein.

FIG. 2 illustrates a side view of the currency processing machine 10 shown in the example of FIG. 1. The currency processing machine 10 includes a coin processing module 20. Coins input into coin input receptacle 14 are directed into the coin processing module 20, which counts and authenticates the coins. The coins may be sorted in the coin processing module 20 in a variety of ways, such as, but not limited to, sorting based on the diameter of the coins. When a coin can not be authenticated by the coin processing module 20, that coin may be output, through a coin reject path 22, to a rejected coin receptacle 24 to which the user is provided access. Non-authenticated coins may alternatively be routed to a reject coin bin (not shown) disposed within the currency processing machine 10 and are not returned to the user. Disk-type coin sorters and authenticating devices which can perform the function of the coin processing module 20 of the currency processing machine 10 are disclosed, for example, in U.S. Pat. Nos. 5,299,977, 5,453,047, 5,507,379, 5,542,880, 5,865, 673 and 5,997,395, 6,039,645, 6,131,625, 6,609,604, 6,775, 730, each of which is incorporated herein by reference in its entirety.

Alternatively, other coin sorters such as gravity-driven or belt-driven rail sorters can be used to perform the function of the coin processing module 20. One example of a rail sorter that can perform the function of the coin processing module 20 of the currency processing machine 10 according to an alternative embodiment of the present invention includes, but is not limited to, that described in U.S. Pat. No. 5,382,191, which is incorporated herein by reference in its entirety.

The coin processing module 20 outputs the authenticated coins via one or more exit channels (not shown). Coin discrimination to distinguish authentic coins from counterfeit coins, bad coins, or non-coin objects is an optional, but generally desirable, feature. According to one embodiment, each coin exit channel is coupled via coin path 26, to a coin receptacle station 28. The coin path 26 leads to coin receptacle station 28 for each of the coin denominations that are to be sorted, if sorting is to be performed, and authenticated by the coin processing module 20. In one aspect, the coin receptacle station 28 includes one or more coin bags and/or one or more coin bins for holding each sorted coin denomination. In another aspect, the coin receptacle station 28 includes one or more coin bags and/or one or more coin bins for holding mixed, unsorted coins. In this latter aspect, each coin bag or coin bin is sequentially filled without regard to denomination (i.e., a "mixed bag") and without untoward machine downtime caused by disproportionate mixes of denominations. Sequentially, as used herein, does not require the coin bags to be adjacent, merely that one coin bag, wherever disposed, is filled after another coin bag has reached a predetermined fill criterion. Other coin distribution schemes are implemented in alternative embodiments of the present invention. Alternative coin distribution schemes are described in U.S. Pat. No. 6,318,537 B1, which is incorporated herein by reference in its entirety.

Figure 3:
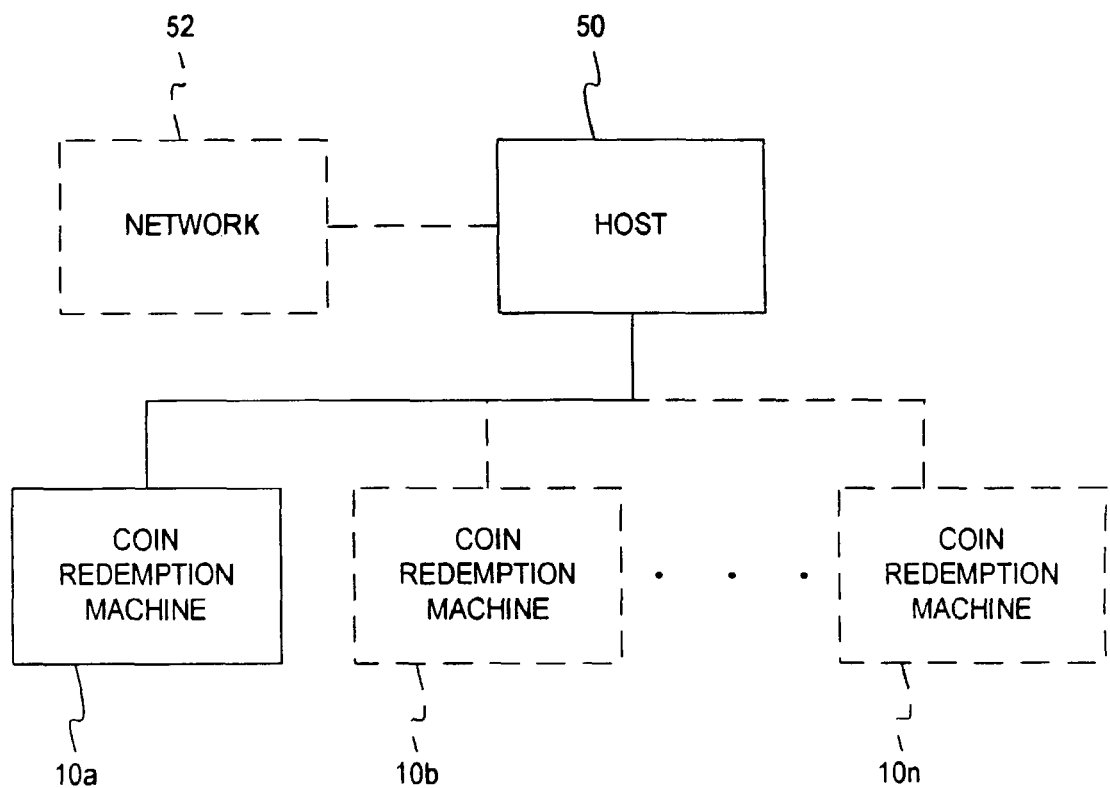
FIG. 3 schematically illustrates a plurality of coin redemption machines in communication with a network in accord with at least some aspects of the present concepts.
Figure 4:
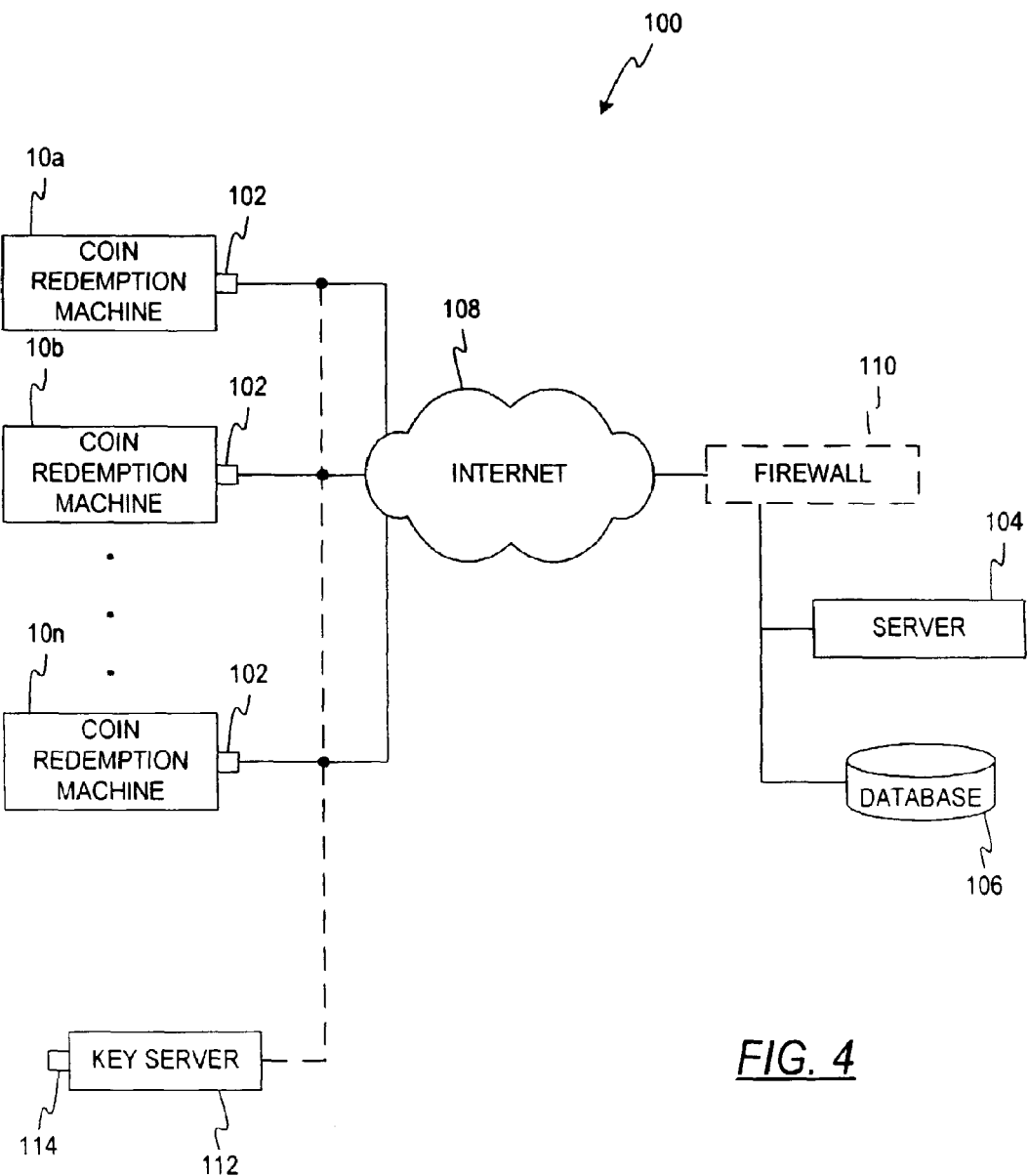
FIG. 4 is a block diagram illustrating an example of one potential connection scheme in a currency redemption system in accord with at least some aspects of the present concepts.

The currency processing machine 10 includes a controller 30 which is coupled to and controls the coin processing module 20, an optional printer 32 for outputting a receipt via the paper dispensing slot 16, and a media read/write device 34 disposed to receive and/or dispense media via the media port 18. The controller 30 controls and receives inputs from the various components of the currency processing system 10 and connected components through internal buses, connections, and input/output circuits (not shown). The controller 30 is configured to communicate with external systems, such as a network 52 (LAN, WAN, etc.), another currency processing machine 10, a server 104, communications hardware, or a variety of other interfaced systems or components, via the I/O circuits and a communication link or path (e.g., serial, parallel, IR, RC, 10bT, wireless, broadband, etc.), as generally shown in FIGS. 3-5($a$), for example. Controller 30, as used herein, comprises any combination of hardware, software, and/or firmware that may be disposed or resident inside and/or outside of the currency processing machine 10 that may communicate with and/or control the transfer of data within, from, and to the currency processing machine, whether such transfer of data is internal (e.g., to a device, bus, processor, etc.) or external (e.g., to a service, network, communication link, etc.). The controller 30 may comprise one or more controllers or processors. As one example, controller 30 may review the input totals from the coin processing module 20 and direct the printer 32 to output a receipt indicative of the total amount or direct the media reader/writer device 34 to credit a smartcard for the values of the processed coins.

In one aspect of the currency processing machine 10, the coin processing module 20 only counts the coins and/or tabulates the value of the coins, but does not store the coins in a sorted fashion. In other words, the coins may be co-mingled in one or more bags or bins in the coin receptacle station 28.

Referring now to FIG. 3, a host system (e.g., a local computer) 50 is coupled to one or more currency processing machines 10$a$, 10$b$, . . . 10$n$ configured as coin redemption machines. The host system 50 communicates with each coin redemption machine 10 for tracking the various transactions (e.g., deposits) occurring therein. Additionally, the coin redemption machines 10$a$-$n$ send signals to the host system 50 when the coin receptacles of the coin receptacles station 28 are full or when a fault condition (e.g., a coin jam, coin bag is full, etc.) is encountered. The host system 50 may be connected to a network 52 or other system, as shown in FIG. 3. In one aspect, one coin redemption machine (e.g., 10$a$) is configured to be the host 50 for other coin redemption machines 10$b$-$n$. Alternatively, a remote computer 107 serves as the host system. FIG. 4 shows another system configuration wherein a coin redemption system 100 comprises a plurality of currency processing machines 10a, 10b, . . . 10n configured as coin redemption machines. Each coin redemption machines 10 comprises a communication device 120 such as, for example, a modem, Ethernet card, or wireless device (e.g., IR, RF, broadband, etc.) permitting wireless communication between the coin processing machines 10a, 10b, . . . 10n and external systems, such as the internet 108, server 104, database 106, or remote computer 107, such as shown in FIG. 3.

The coin redemption system 100 may comprise one or more coin redemption machines 10a-n equipped to communicate with one or more servers 104 and/or databases 106. For example, coin redemption system 100 may comprise coin redemption machines 10a-n connected to one another and/or separately connected to one or more servers 104 (e.g., web servers, etc.) and/or databases 106 and/or the Internet 108 via a hardwired connection or a wireless connection. The servers 104 may be adapted to execute servlets, which may initiate and complete tasks involved in running the coin redemption system 100. Alternatively, each of the coin redemption machines 10a-n may be configured to periodically "dial-in" directly to the server(s) 104. To maintain the integrity of information sent between the components of the coin redemption system 100, conventional security schemes may be employed including, but not limited to, installation of a firewall 110 between the coin redemption machines 10a-n and the server(s) 104 and database(s) 106, or the Internet 108. A key server 112 with a key server communications device 114 may also be employed. In at least some aspects, the coin redemption machines 10a-n are configured to be polled by a remote computer connected, for example, to the Internet 108 or server 104.

In accord with the above configurations, currency processing machines 10a-n, such as self-serve coin processing or redemption machines are able to communicate with a variety of devices and nodes. The coin redemption machines 10a-n, for example, transmit data relating to a transaction (e.g., a transaction number ID, a customer ID number, and the amount of the transaction) to a computer (e.g., redemption interface 125) or data storage device at a service desk or other location(s). The computer or data storage device may be associated with a network, node, service, server, point of sale (POS), kiosk, ATM, redemption machine, terminal, or vending machine. Such computer or data storage device alternatively comprise a handheld, portable, or personal electronic device (e.g., a data storage device, such as may be a stand-alone device or integrated with a key, cellular phone, PDA, or other electronic device) carried by or associated with a customer. In this latter aspect, the value of the processed coins are, for example, directly transferred, minus any optional transaction fees, to an electronic device carried by the customer. In the former aspects, the customer may be permitted, for example, to redeem the funds input into the currency processing machine 10 at another terminal, such as an ATM or kiosk, inside the store or outside of the side (e.g., locally or in a location remote to the store).

The computer (e.g., 125), in turn, has installed thereon or loaded thereon a program to receive and manage this data transmitted by the coin redemption machines 10a-n. Similarly, the same concept may be extended to the point of sale ("POS") terminals (e.g., a cash register station at a food store, a checkout counter at other types of stores, etc.). For example, the coin redemption machines 10a-n are configured to directly transmit data relating to a transaction to the POS terminals 53 at a retail store. Again, these POS terminals 53 have installed thereon or loaded thereon a program to receive this data transmitted by the coin redemption machines 10a-n. In still other aspects, the coin redemption machines 10a-n are configured to directly transmit data relating to a transaction to an ATM terminal or kiosk located at the store or to a larger ATM network, kiosk network, or service beyond the particular store location, such ATM, network, or service also having software to receive and utilize the data transmitted by the coin redemption machines. Therefore, in these latter aspects, additional hardware or terminals are not required at the self service desk or other locations to complete the transaction and provide payment to the customer. In many instances, users in fact prefer to interface with machines, such as currency processing machines 10a-n, ATMs, and kiosks, rather than interface with store employees.

An escrow area is optionally incorporated into the currency processing machines 10a-n. In an embodiment of a currency processing machines 10a-n comprising an escrow, processed currency (e.g., coins), is counted and delivered to the escrow area. The customer has to view the total amount of the processed coins and/or any associated commissions or fees, such as by display 12, and accept the transaction count before delivering the currency to a final storage area (e.g., coin receptacle stations 28).

In at least some aspects, the currency processing machine 10 may be configured to automatically send data relating to the transaction (e.g., a transaction ID number and amount) to a store service desk or other locations when the counting of coins is completed (e.g., after no further coins are counted over a predetermined period of time). Alternately, in at least some other aspects, the currency processing machine 10 may be configured to ask the user, such as via display 12 and/or speaker, if they are done with the transaction or would like the currency processing machine to take an action other than automatically sending the data relating to the transaction to the store service desk or other location. For example, as to the transmission of the data relating to the transaction to the store service desk, the user is prompted to input "yes" or "no" via associated touch screen display 12 buttons. If the user answer yes, then the data is sent forward. If the user answered no, however, then the machine asks the user if more coins are to be deposited, or other data to input, or other options to execute.

Once the transaction is completed, a number of methods to identify the customer with the appropriate transaction are utilizable in accord with the present concepts. Provided below are several non-limiting approaches. A currency processing machine 10 may, in accord with the present concepts, utilize only one, several, a combination of more than one, or all the approaches described below.

The currency processing machine 10 may advantageously comprise one or more biometric devices (e.g., 15a-c) to facilitate a coin redemption transaction. The user's biometric data is not stored in a database in perpetuity, but is rather retained solely for the purpose of redemption of an amount owed to a user. The user's biometric data is simply used to verify that the person redeeming a transaction at a service desk, cash register, or other redemption interface or site is the same person who processed and deposited coins using a coin redemption machine 10. Implementation of one or more biometric devices (e.g., 15a-c) in accord with the present concepts is a secure way of ensuring that only people who have actually made a deposit are receiving payment and eliminates the need for security paper and other security devices conventionally employed to thwart counterfeiting. Further, the use of biometric devices in accord with at least some aspects of the present concepts avoids the machine downtime associated with the maintenance of a mechanical printer (e.g., equipment breakdown, printer out of paper, printer out of ink, paper jam, paper misalignment, etc.).

In accord with aspects of the present concepts using one or more biometric devices (e.g., 15a), at the beginning of a transaction the user is asked to identify themselves by a biometric input to a biometric device, or by a biometric input to each of several biometric devices (e.g., 15a-b). As noted above, this biometric input includes, but is not limited to, the scanning of a fingerprint, scanning of one's iris, or other known techniques for biometric identification. At the completion of the transaction, the customer is directed to a service desk (or other locations) where the electronic method of identification given at the currency processing machine 10 is matched through the use of a remote terminal at the service desk (or elsewhere) that enables such an electronic matching. The currency processing machine 10 transmits, via a wireless or hardwired communication link, information relating to the user's biometric input and the amount of the transaction to the remote terminal at the conclusion of each transaction. An identification of some form may optionally be given to the customer at the completion of the transaction.

At the service desk (or other location) a biometric identification device similar to that provided at the currency processing machine 10, and preferably identical to that provided at the currency processing machine, would be present. For example, if the biometric device presented at the currency processing machine 10 is a particular make and model of a fingerprint-reading biometric device approach, the user encounters a fingerprint-reading biometric device of the same make and model at the service desk. However, in accord with other aspects, different models of biometric identification device may certainly be used at a point of redemption. For example, a first make/model of fingerprint device at the currency processing machine 10 and a second make/model of fingerprint device may be used at the service desk, point of sale (POS), kiosk, ATM, redemption machine, terminal, computer, vending machine, or the like, wherever situated. Although use of dissimilar biometric device may potentially (or may not) slightly increase noise or error-rates, it is expected that such effects should have minimal to no impact in the applications disclosed herein.

The user then places the same finger(s) presented to the corresponding fingerprint-reading biometric device at the currency processing machine 10. The service desk fingerprint-reading biometric device then outputs a signal corresponding to the imaged and/or sensed data and output the data to a computer (e.g., 125) and display (e.g., 140) available to the service desk employee. Displayed to the employee is an indication of a match between the user and a prior entry of the same characteristic input, or a failure to match the same. At least in the instance wherein a match is found, the employee then makes the appropriate payment against this transaction or other alternative indicated by the user (e.g., to receive cash, coupons, product, give credit to a charity, etc.), close out the transaction, and update the records.

Depending on the biometric device(s) employed in combination with the currency processing machine 10, the transmitted data may require compression before transmission and/or storage to conserve bandwidth and storage space. In at least some aspects, the feature extraction may be performed locally in a controller 30 associated with the currency processing machine 10 and/or remotely in association with another controller (e.g., 130). The feature extraction is, itself, a form of data compression, but is essentially a one-way compression (i.e., the original biometric image cannot be reconstructed from the extracted features). In aspects of the present concepts utilizing conventional compression techniques, the transmitted or stored compressed data must be expanded prior to use. The compression and subsequent expansion of the biometric data may introduce some losses in the restored signal and an appropriate compression scheme should be developed in consideration of the particular application and biometric devices used. Compression and transmission protocols currently exist for the compression of fingerprint (WSQ), facial images (JPEG), and voice data (CELP).

At some point following the acquisition and storage of the user's biometric characteristic(s), it is to be matched to another presentation of the user's same biometric characteristic(s). To ensure adequacy of the biometric input, and to forgo any attendant difficulties that might arise owing to poor data capture, transmission, retention and/or processing, it is highly desirable to confirm the adequacy of the user's biometric input before, during, and/or after feature extraction to ensure that the signal and data received from the biometric device is of good quality. Thus, if the controller 30 is unable to appropriate extract a requisite set of features from a biometric input, the controller can immediately notify the user, such as by display 12, that the biometric input was insufficient and can request that the user repeat the biometric input.

The initial biometric input by a user may be considered an "enrollment" of the user's biometric characteristic(s) data, conventionally referred to as a "template," into a database for a limited or restricted use (e.g., a "one-time" use). In accord with at least some of the present concepts, the user's actual identity is not associated with the user's biometric characteristic(s). In some aspects, however, the user may be permitted to associate his or her biometric input with a transaction code or some other information selected by the user. When the user presents his or her biometric input, such as noted above, a pattern matching process is initiated to compare the user's presented biometric input to a stored template and to provide a quantitative measure of the comparison. In accord with at least some aspects of the present concepts, the user's biometric characteristic(s) data may be stored in combination with some arbitrary data (i.e., a PIN number, entry of a favorite color, entry of a favorite sports team, etc.) to minimize the number or field of templates that must be compared to the instant biometric input. In other words, it is generally preferable to bypass the pattern matching process, wherein the user's biometric input is compared to multiple templates from the database one-at-a-time.

The controller 30 associated with the local computer or host system 50 (FIG. 3) or other controller 130 associated with a redemption interface 125, remote computer 107, server 104, or other device, determines "matches" or "non-matches" based on the distance measures received from the pattern matcher, and ultimately make an "accept/reject" decision based on predetermined acceptance criterion. For example, for a fingerprint biometric input having ten extracted characteristic features, the predetermined acceptance criterion declares a match for any single characteristic distance having a deviation less than or equal to a fixed threshold and "accept" a user on the basis of this single match. More likely, a fingerprint biometric input having ten extracted characteristic features is declared a match to a template when plural (e.g., 8, 9, or 10) of the characteristic features have a distance deviating less than or equal to a fixed threshold. The present concepts may include any conventional techniques for biometric data analysis and are not considered to be limited to the illustrative examples provided herein.

In accord with at least some aspects of the present concepts, the predetermined acceptance criterion, once set, are universally applied and all users provided a predetermined number of attempts (e.g., 3 attempts, 4 attempts, etc.) to provide a biometric input that returns an indication of a match to a template biometric input.

Figure 5A:
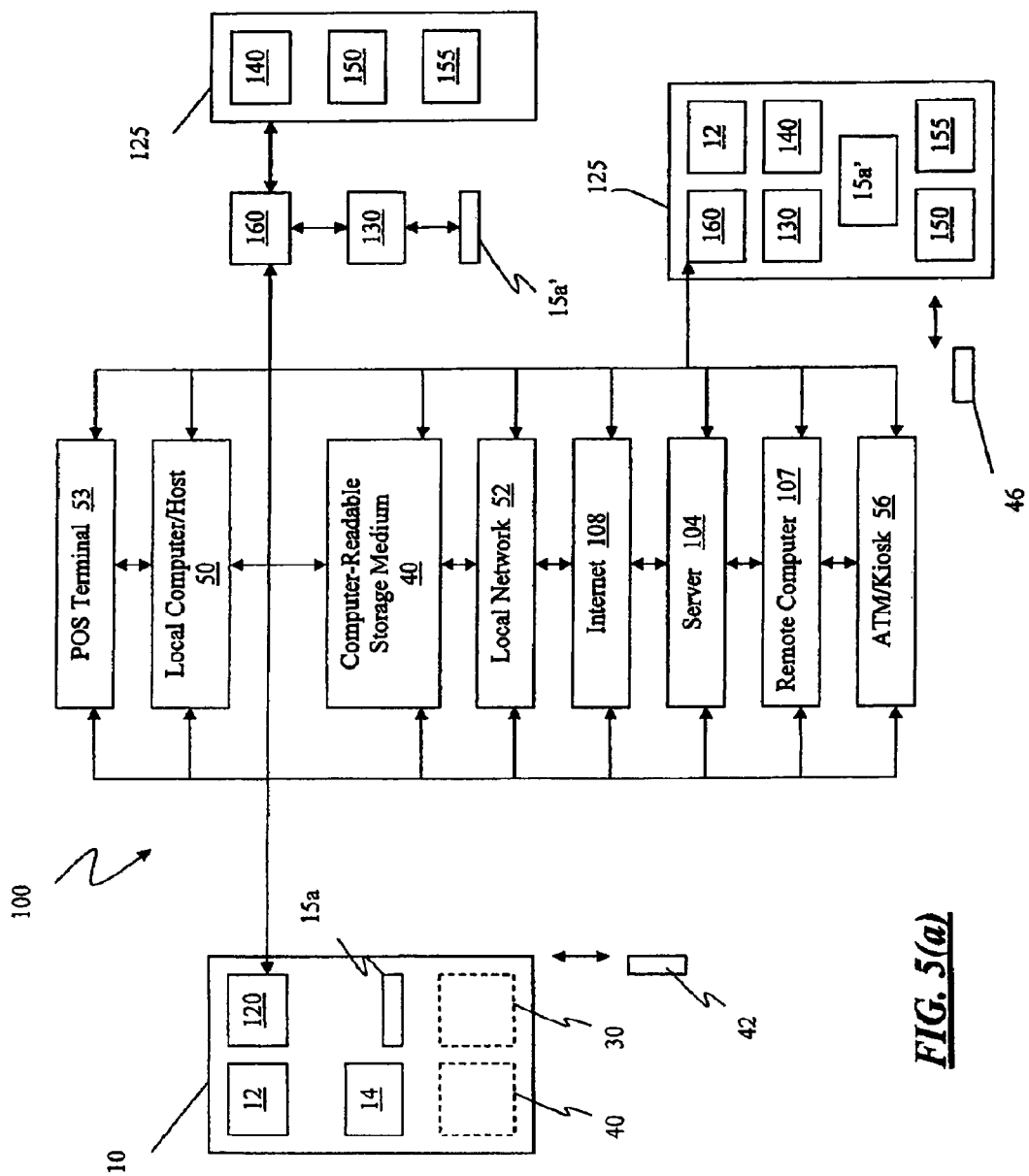
FIGS. 5(a)-5(b) show various aspects of redemption systems in accord with at least some aspects of the present concepts.

In accord with one aspect, shown in FIG. 5(a), the present concepts include a coin processing and redemption system 100, comprising a coin processing machine 10 configured to receive a batch of coins in an input region 14 and process the batch of coins to determine a value thereof. A first biometric device 15a is configured to receive a user's biometric input and a first communication device 120 is configured to output a signal bearing first data relating to the biometric input and second data relating to the value of the processed coins to a local computer or host 50, remote computer 107, server 104, network 52, Internet 108, computer-readable storage medium 40, database 106 (shown in FIG. 3), and/or redemption interface 125. As noted above, the communication device 120 may comprise a serial port, parallel port, USB port, ECP port, IEEE 1394 port, broadband device, Ethernet port, wireless device, modem, RF device, IR device and/or any other conventional communication device now available or later developed. A receipt may also be printed by the receipt printer.

The coin processing and redemption system 100 shown in FIG. 5(a) also includes a redemption interface 125 comprising a second biometric device 15a' configured to receive another biometric input of the user and to output a signal bearing third data (i.e., the second biometric input to the second biometric device 15a') related to such biometric input to a controller 130 configured to access the first data (i.e., the first biometric input to the first biometric device 15a), wherever stored. The controller 130 may be associated, for example, with the second biometric device 15a' itself, as shown, or with the host computer 50 or other connected computer or device. The controller 130 is also configured to compare the first data with the third data to determine a degree of correspondence therebetween, and to output a signal associating the third data to the first data and/or the second data (i.e., the data relating to the value of the processed coins) when the degree of correspondence satisfies at least one predetermined criterion.

As noted above, the first biometric device 15a is configured to measure at least one physical characteristic of a user or, in another aspect, a characteristic such as a user's voice or vocalization. In this aspect, the first biometric device, provided in conjunction with the coin redemption machine 10, is remote from the second biometric device, which is provided at a redemption location that is typically, but not necessarily, remote from the coin redemption machine 10. In various aspects, the first and/or second biometric devices 15a, 15a' are configured to read or sample the user's biometric input a plurality of times to help ensure that a good reading will be obtained and are configured to output a signal bearing data relating to each of the readings of the biometric input.

In such aspect, the controller 130 associated with the second biometric device 15a' does not necessarily need to compare each possible combination of these readings or samples (9 potential combinations where three readings are taken of each of two separate inputs) to declare with sufficient confidence that a match has been found. For example, if a plurality of readings were taken when a user placed his or her finger on a first fingerprint pad 15a before or after processing of a batch of coins, and a plurality of readings were taken when a user placed his or her finger on a second fingerprint pad 15a' when the user attempted to redeem the indicated amount, the controller 130 may find a match between the first compared template and subsequently input "redeeming" biometric input and output a "match" signal at that point without any further comparison.

Alternatively, the controller 130 may be configured to require a minimum subset of the templates (e.g., 2 out of 3) match a predetermined number of the readings taken at the second fingerprint pad 15a' (e.g., 1, 2, or 3 out of 3). The "match" signal output by the controller 130, in general, may associate the value data with the user presenting his or her biometric input at the second fingerprint pad 15a' (i.e., the value is associated with the bearer of the characteristic feature(s) matching that of the template associated with the value) or may associate the biometric input presented at the second fingerprint pad 15a' as a match to that of a template in the system, at which point, the employee or system handling the redemption can associate the value to the user. The controller 130 is configured to process the signal and/or data relating to the biometric input, such as by decryption, decompression, and/or deconvolving the data, and/or comparing the original biometric input data, to the later presented biometric input (e.g., at the second biometric device 15a') to determine a degree of correspondence therebetween. For example, where the controller 130 compares a decrypted signal related to a first biometric input at the first biometric device 15a to an original, reduced (i.e., feature extracted), or decrypted signal related to a second biometric input at the second biometric device 15a', the controller will output a signal confirming a match between data sets when a degree of correspondence therebetween satisfies at least one predetermined criterion appropriate to the application and level of security desired.

The signal output by the controller 130 is output, in at least some aspects of the present concepts, to a redemption interface 125, which may comprise a display 140, a printer 150, and/or a speaker 155. It one aspect of the present concepts, the second biometric input device 15a' is disposed adjacent a redemption interface 125. It another aspect of the present concepts, the redemption interface is separated into a user portion having the second biometric input device 15a' and an employee portion having a computer 125 bearing the controller 130 and a display 140. Whatever the configuration of the redemption interface 125, it preferably, but not necessarily, provides at least one display 140 and/or at least one speaker (not shown) permitting both the user and the employee handling the disbursement of money to view and facilitate, as needed, the progress of the redemption process. Alternatively, the redemption interface 125 may be provided solely for the employee handling the disbursement of money. In other words, in accord with at least some aspects, the user simply provides a biometric input at the second biometric input device 15a' and waits for confirmation from the employee handling the disbursement of money.

In accord with at least some other aspects, the redemption interface 125 may comprise a self-service terminal or transaction interface such as a kiosk or an automatic teller machine ("ATM"). In this regard, the redemption interface 125 may comprise a controller 130 configured to, responsive to the signal output by the controller associating the value data with the user presenting his or her biometric input at the second fingerprint pad 15a' (i.e., the value is associated with the bearer of the characteristic feature(s) matching that of the template associated with the value) or associating the biometric input presented at the second fingerprint pad 15a' as a match to that of a template in the system, at which point, the employee or system handling the redemption can associate the value to the user, output a signal to a writing device to output a substrate bearing an amount relating to the value. This substrate comprises, for example, but is not limited to any one or more of a stored value card, cash, a smart card, or other type of value-bearing substrate or device (e.g., an RFID device) bearing an amount relating to said value (e.g., the entire value or a lesser value taking into account any transaction fees).

In accord with any of the above aspect, the redemption system 100 or controller 130 is preferably configured to delete biometric data following a successful match. For example, after a user successfully matches his or her biometric data and is paid in full for the value of the processed coins, whether by currency, product, or service, the individual biometric characteristic(s) used to associate the user to the value are deleted from the system, wherever such data is stored. Other data, such as the value of the transaction, time and/or location of the transaction, etc., may be retained for record keeping purposes.

In accord with another aspect, the present concepts include a coin processing system 100, comprising a coin processing machine 10 configured to receive a batch of coins in an input region 14 and process the batch of coins to determine a value thereof, a display device 12, and a first biometric device 15a configured to receive a user's biometric input. In this aspect, the coin processing system 100 comprises a controller 30 configured to extract at least one feature from the biometric input, to compare the feature(s) with an acceptable range for the feature(s), and to output a signal to the display device 12 relating an acceptance of or a failure to accept the biometric input. In accord with this embodiment, the user is immediately informed if the biometric input was successfully read. The display device 12 may comprise, in this example, an indicator light or an LED (e.g., a red light or a green light), a touch screen display, a video display, an LCD display, a plasma display, or a haptic display. The first and/or second biometric devices 15a, 15a' may also be integrated with haptic devices so as to provide a tactile response differentiating a successful biometric input (e.g., no response or a gentle click) from an unsuccessful biometric input (e.g., a vibration).

In accord with this aspect of the present concepts, the controller 30 may be advantageously configured to enable the coin processing machine 10 to perform an associated coin processing function (e.g., counting coins, transferring data, etc.) following or concurrent with an output of a signal to the display device 12 relating to an acceptance of the biometric input. In one aspect thereof, the operation of the machine may be made contingent only upon the output of a signal to the display device 12 relating to an acceptance of the biometric input. Thus, until the user successfully inputs a biometric input (e.g., a fingerprint, vein structure, etc.), the machine may be electronically disabled. The enablement of the coin processing function may further be time-dependent. For example, when a user has successfully input a biometric input, but then does nothing for one minute or any other predetermined time, the coin processing machine 10 may return to an electronically disabled state and the previous biometric input deleted.

The coin processing machine 10 may also comprise a first communication device 120 configured to output a signal relating to the biometric input and a signal relating to the value of the processed coins. In lieu of separate signals, the controller may output a single signal comprising the data of the biometric input, the value, and/or any other transaction related data (e.g., time, location, machine ID, etc.).

The coin processing machine 10 may further comprise a printer 32 for printing a transaction ticket bearing information relating to the transaction, such as information relating to the biometric input, the value, the time, the location, and/or the machine ID. For a biometric device 15a comprising a camera (i.e., a facial recognition device), the receipt optionally bears a picture (color or black and white) of the user's face or, the particular characteristic involved in the biometric input, or another characteristic unrelated to the actual biometric input. The coin processing machine 10 may alternatively comprise a dispensing device (not shown) for dispensing a substrate bearing information relating to the biometric input and/or a substrate bearing information relating to said value. Such substrate comprises, but is not limited to, any one of a standard printer paper (e.g., thermal paper), security paper (e.g., paper bearing a thermochromic or pressure sensitive ink), ticket paper, or plastic, or any other medium upon which an ink, thermal, laser, or impact printing device may effectively operate.

The coin processing machine 10 may still further comprise a second biometric device 15a' configured to receive a subsequent biometric input of the user. The second biometric device may be hardwired to a controller 130 or may be wirelessly associated therewith through a second communication device 160 so as to provide an output signal related to the biometric input received thereby. As with the prior example, a controller 130 is configured to associate the value data with the user presenting his or her biometric input at the second fingerprint pad 15a' (i.e., the value is associated with the bearer of the characteristic feature(s) matching that of the template associated with the value) or to associate the biometric input presented at the second fingerprint pad 15a' as a match to that of a template in the system, at which point, the employee or system handling the redemption can then associate the value to the user.

Figure 6:
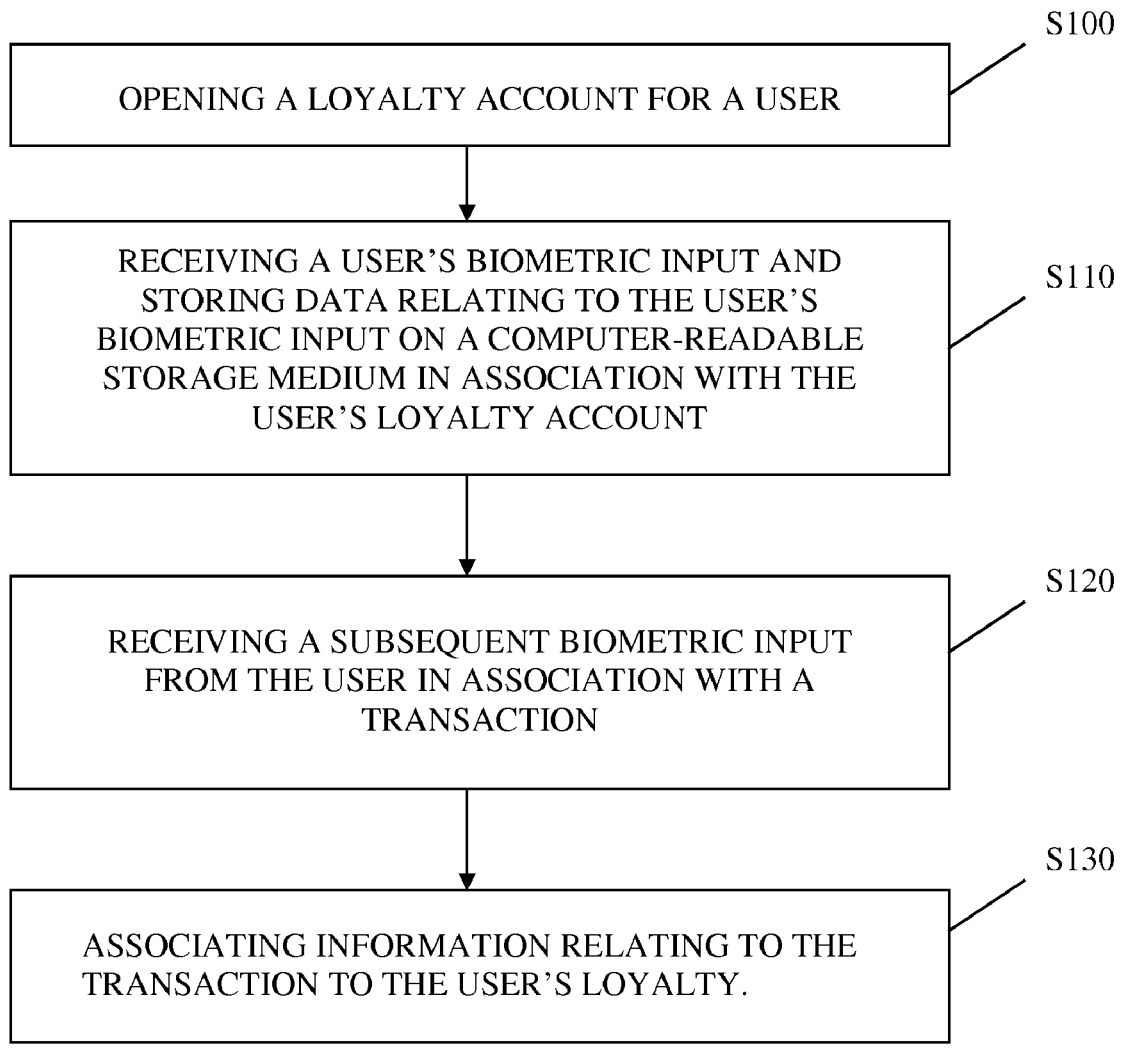
FIG. 6 shows aspects of one method in accord with at least some aspects of the present concepts.

In accord with yet another aspect, shown in FIG. 6, the present concepts include a method for implementing a loyalty program comprising the acts of opening a loyalty account for a user (S100), receiving a user's biometric input and storing data relating to the user's biometric input on a computer-readable storage medium (e.g., 40, 106) in association with the user's loyalty account (S110), receiving a subsequent biometric input from the user in association with a coin processing transaction (S120), and associating information relating to the coin processing transaction to the user's loyalty account (S130). The method may further comprise the act of providing a benefit to the user in relation to the transaction (S140) (not shown).

The act of providing the benefit is not limited to any particular benefit and may comprise, for example, a discount on a product involved in the transaction, a discount on a total value of the transaction, a discount on a product not involved in the transaction, or a discount on a total value of a subsequent transaction. The benefit may also or alternatively comprise a reduction of or elimination of a fee associated with the coin-processing transaction.

The act of receiving a user's biometric input and storing data relating to the user's biometric input comprises, in at least some aspects, transmitting the user's biometric input to a local computer or host 50 and/or a remote computer-readable storage medium (e.g., 40, 106). The user's biometric input, such as those biometric inputs noted above, may be optionally be compressed, encrypted, and/or feature extracted prior to transmission.

Figure 5B:
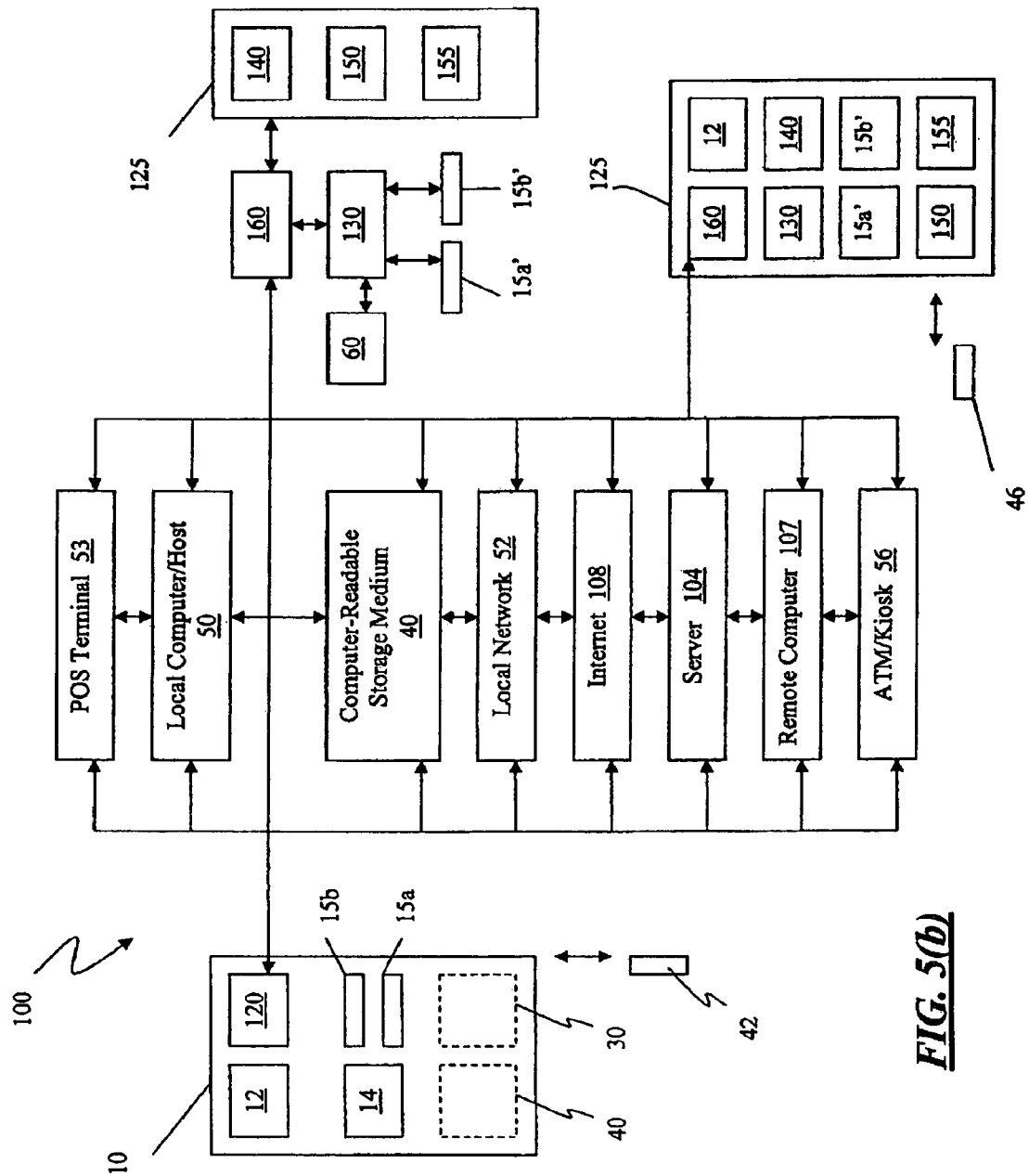

In still another aspect of the present concepts, a biometric input device (e.g., 15a, 15b), such as shown in FIG. 5(b), may be used to control access to a currency processing machine 10 (e.g., CTK's, MPS's, coin redemption machines, currency recyclers, currency redemption machines, currency exchange machines, vending machines, or other types of currency handling machines requiring operator log-in) or features resident therein, including access control to supervisor modes, diagnostic modes, set-up modes, and/or log-in modes. For example, a biometric device 15a may be configured to receive a user's biometric input and a controller 30 configured to extract at least one feature from the biometric input and to compare the feature(s) with at least one stored value of the feature(s) (i.e., template) for the user. Since this mode of operation relates to the interaction of an employee, supervisor, technician, service employee, armored car service, or the like, templates are preferably established for each person provided access to the machine or selected features of the machine. The controller 30 is also configured to, responsive to a match between the feature(s) and the stored value of the feature(s), output a control signal to the currency processing machine 10 and/or a remote computer 107 and/or a local computer or host 50 via an appropriate communication device and path. As with the previous examples, a display device 12 is provided to display information thereon to inform the user at least as to the status of the currency processing machine 10.

In accord with the present example, the control signal is configured to activates a supervisor mode for the currency processing machine, activates a diagnostic mode for the currency processing machine, activates a set-up mode for the currency processing machine, activates a log-in mode for the currency processing machine, unlock a locking mechanism associated with the currency processing machine, and/or activate an operating mode for the currency processing machine. Generally, the control signal may be adapted to enable or disable any desired feature or protection of the currency processing machine 10 in relation with an authorization level associated with the user presenting the biometric input.

In one aspect, the currency processing machine 10 is a coin processing machine configured to receive a batch of coins in an input region 14 and process the batch of coins to determine a value thereof. In one optional configuration, the coin processing machine 10 may be configured to require a biometric input for each batch of coins to be processed. The controller 30 may also advantageously be configured to enable the coin processing machine to perform an associated coin processing function only following an output of said control signal.

Alternatively, the currency processing machine may comprise a bill processing device (not shown) configured to receive a single bill or, more preferably, a batch of bills, which could comprise one or more bills input singly (e.g., sequential input of a plurality of bills) or collectively (e.g., a group of bills input together), in an input region and to process the batch of bills to determine a value thereof. Similar to the coin processing machine example, the bill processing device may optionally be configured to require a biometric input for each batch of bills to be processed.

Still another example of the present concepts is shown in FIG. 5(*b*), which generally relates to a currency processing machine 10 in which a combination of different biometrics (e.g., 15*a*, 15*b*) are employed to increase the security of the currency processing system (e.g., more than one fingerprint, or a fingerprint in conjunction with a face print, or any of the other combinations using a biometric feature). In this example, the currency processing system 100 comprises a currency processing machine 10 configured to receive a batch of currency in an input region 14 and process the batch of currency to determine a value thereof. In at least some aspects, a display 12 is provided as a user interface to convey information to the user and, optionally, to accept user inputs (i.e., a touch screen).

A first biometric device 15*a* is provided to receive a user's first biometric input, a second biometric device 15*b* is provided to receive a user's second biometric input. The first biometric device 15*a* may be the same as or a different type of biometric device than the second biometric device 15*b*, non-limiting examples of such different types of biometric devices being noted above. Thus, both the first biometric device 15*a* and the second biometric device 15*b* may comprise a fingerprint detector, wherein the user's first biometric input comprises the reading of a first of the user's fingers and the user's second biometric input comprises the reading of a second of the user's fingers on the same hand or on the other hand. In another example, the first biometric device 15*a* may comprise a fingerprint detector and the second biometric device 15*b* may comprise a vein or nailbed scanner (or any other biometric device) configured to obtain the second biometric input from the back of a user's finger or hand (e.g., the same finger and/or hand involved in the fingerprint scan or a different one), respectively.

A controller 30 is also provided and is configured to extract at least one feature from each of the first and the second biometric inputs. The controller 30 is configured to compare the feature(s) from the first biometric input to a stored value(s) of the first feature for the user (i.e. a first template) and to compare the feature(s) from the second biometric input to a stored value(s) of the second feature for the user (i.e. a second template). The controller 30 is further configured to, responsive to a match between at least one of the first feature and the stored value(s) of the first feature and the second feature and the stored value(s) of the second feature, output a control signal to the currency processing machine 10 and/or local computer or host 50 and/or a remote computer 107, or other destination, via an appropriate communication device and/or path. As noted above, the communication device (e.g., 160) may comprise any device configured to output data from controller 30 to another controller (e.g., 130), service, computer, or computer-readable storage medium (e.g., 40, 106) and may include, but is not limited to, any conventional communication device or medium such as, a serial port, parallel port, USB port, ECP port, IEEE 1394 port, broadband device, Ethernet port, wireless device, modem, RF device, and IR device.

The control signal output to the currency processing machine 10 and/or computer (e.g., host system 50 and/or remote computer 107) via a communication device (e.g., 160) responsive to a match between the first feature and the first template and/or the second feature and the second template is used, in various aspects of the present concepts, to activate at least one of a supervisor mode, set-up mode, log-in mode, and operating mode for the currency processing machine. In accord with a preferred aspect of at least some of the present concepts, the controller 30 is configured to enable the currency processing machine 10 to perform an associated currency processing function (e.g., processing coins) following or concurrent with an output of the control signal. In other words, unless a satisfactory biometric input has been provided and recognized by the controller 30, the user will not be permitted to operate the machine or access and/or activate any features of consequence. The functions of the controller 30 noted above may be performed locally or remotely by another controller (e.g., 130).

In a feature substantially related to service or maintenance, the control signal may be configured to manipulate a locking mechanism, such as the energization and/or de-energization of a conventional electromagnetic locking mechanism. The currency processing machine 10 may be provided with a plurality of separate locking mechanisms controlled by the output signal so as to, for example, permit access to selected portions of the currency processing machine. In this manner, if a particular service requirement (e.g., identified by an indicator out message or signal output by the currency processing machine) requires servicing of only a specific component in a first portion of the currency processing machine (e.g., a receipt printer), the service technician or employee addressing such service requirement need not be permitted access to other portions (e.g., the coin receptacle station 28) of the currency processing machine. Moreover, each access may be accurately tracked by means of the control signal, which permits monitoring of each person accessing the currency processing machine 10, as well as the time(s), duration(s), and locations of such access.

The currency processing machine 10 may comprise a coin processing machine configured to receive a batch of coins in the input region 14 and process the batch of coins to determine a value thereof and/or a bill processing device configured to receive a batch of bills in the same or a different input region and process the batch of bills to determine a value thereof. In at least some aspects, the coin processing machine and/or bill processing device may be advantageously configured to require a biometric input for each batch of coins. In a retail application, this aspect comprises the standard configuration, as each user is required to input a biometric input for each transaction. In a commercial application wherein a single user might input numerous batches of currency (e.g., coins and/or bills), the user is required to enter a biometric input for each batch of currency processed. To avoid undue processing delays in such configuration, the biometric device(s) 15a comprises a hands-free devices (e.g., facial scan, vocal pattern/utterance analysis) which does not require numerous pauses in the users work. Similarly, the controller 30 may be configured to, using the biometric device(s) 15a, periodically sample the user's biometric input (e.g., facial scan, thermographic scan, weight (from an instrumented scale incorporated into a user's station), etc.).

Figure 7:
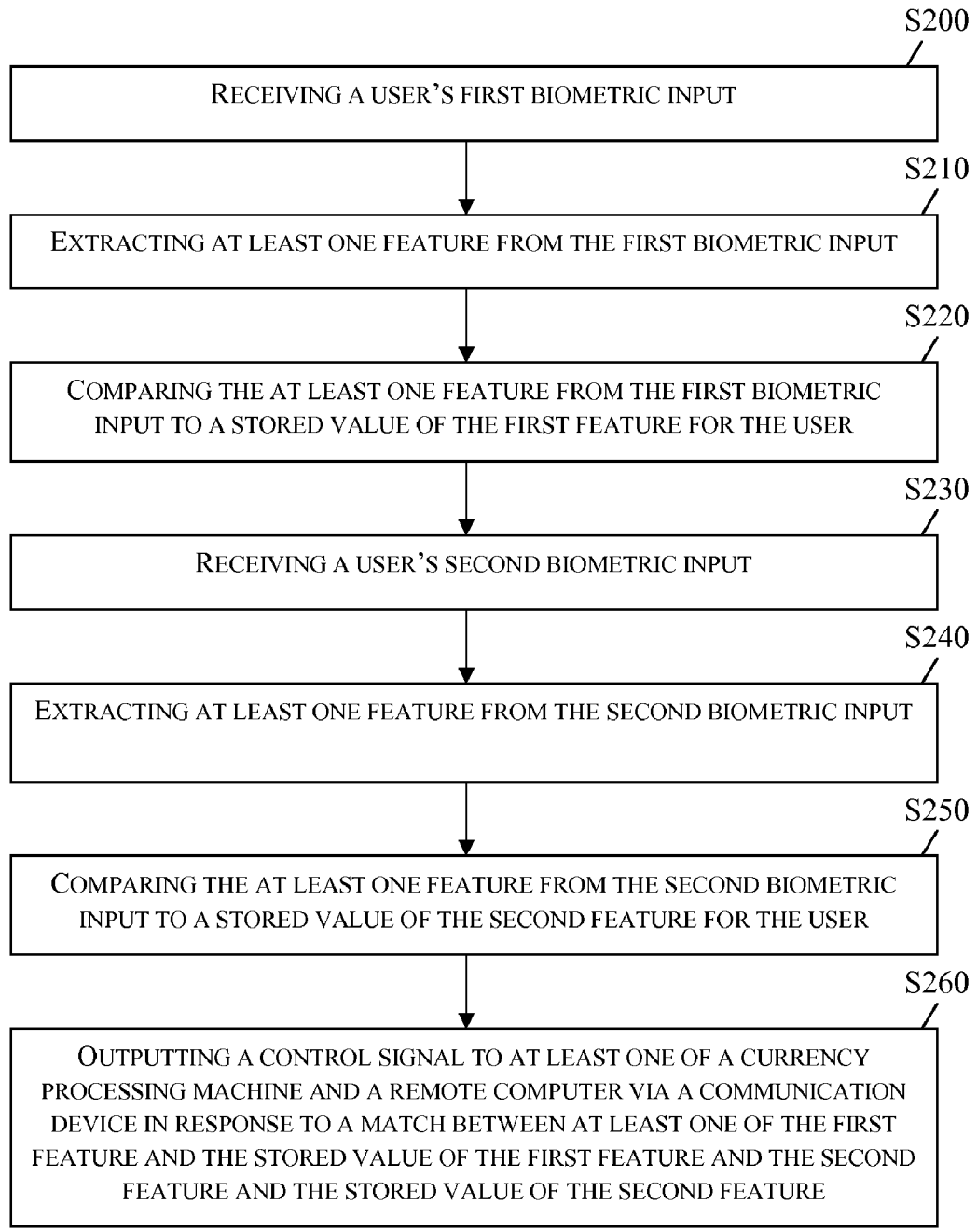
FIG. 7 shows aspects of one method in accord with at least some aspects of the present concepts.

Turning now to FIG. 7, another aspect of the present concepts includes a method for regulating a currency processing system and includes the acts of receiving a user's first biometric input (S200), extracting one or more features from the first biometric input (S210), and comparing the feature(s) from the first biometric input to a stored value of the first feature(s) for the user (i.e., a first template) (S220). The act of S200 may comprise receiving data relating to, for example, a fingerprint, facial dimension(s), teeth, retinal structure, iris structure, body part dimension(s), vein pattern, vein dimension(s), thermographic pattern, nailbed dimension(s), skin spectral response, and/or any other identifying characteristic, physical or otherwise. The act of S210, in accord with conventional feature extraction techniques well-known in the art, extracts characteristics appropriate to the particular data of interest (e.g., fingerprint data) and appropriate to the level of security/confidence, repeatability, speed, and robustness of the analysis. For example, sixteen characteristic features could be extracted from a fingerprint for a template in a higher security environment where a high level of security prevails over speed, whereas eight characteristic features may be extracted from a fingerprint for a template in a lower security environment where speed and/or convenience is a more significant concern.

This method also includes the acts of receiving a user's second biometric input (S230), extracting one or more features from the second biometric input (S240), and comparing the feature(s) from the second biometric input to a stored value of the second feature for the user (i.e., a second template) (S250). The method further includes the act of outputting a control signal to a currency processing machine 10 and/or a local or host system 50 and/or remote computer 106 via an appropriate communication device (e.g., 160) in response to a match between the first feature and the first template and/or the second feature and the second template.

Some other aspects of this method may further comprise the acts of outputting the control signal to currency processing machine, receiving a batch of currency in an input region 14 of the currency processing machine 10, and, processing the batch of currency, responsive to the control signal, to determine a value thereof. Likewise, still other aspects of this method may further comprise the acts of providing, as a currency processing machine 10, a bill processing device and/or coin processing machine, receiving a batch of bills and/or coins in an input region 14 of the currency processing machine, and processing the batch of bills and/or coins to determine a value thereof.

Similar to one of the aforementioned aspects, the method may also include the acts of outputting the control signal to the currency processing machine 10 and activating a supervisor mode, diagnostic mode, set-up mode, and/or log-in mode for the currency processing machine responsive thereto. Likewise, the method may alternatively or also include the acts of outputting the control signal to the currency processing machine 10 and unlocking a locking mechanism for the currency processing machine response thereto.

In still another aspect of the present concepts, FIG. 5(b) shows that the biometric obtained from a coin redemption machine 10 may be output to the retail point of sale ("POS") system so that the deposited amount may be applied to the purchase of goods or services from the retail establishment. In accord with at least some aspects of this example, the biometric provides an anonymous means by which the person buying the merchandise may be later verified as the same person that deposited coins at an earlier time. In accord with such example, a redemption system 100 comprising a coin processing machine 10 is configured to receive a batch of coins in an input region 14 and process the batch of coins to determine a value thereof. The coin processing machine 10 comprises a first biometric device 15a configured to receive a user's biometric input and a communication device 160 configured to output at least a first signal relating to the biometric input and a second signal relating to the value. Alternatively, a single signal combining data relating to the biometric input and data relating to the value is output by the communication device 160. The communication device may comprise, for example, a serial port, parallel port, USB port, ECP port, IEEE 1394 port, broadband device, Ethernet port, wireless device, modem, RF device, and IR device.

A second biometric device 15a' is provided in association with a point of sale terminal 53 and is configured to receive another biometric input of the user. The redemption system 100 also includes a controller 130 configured to compare the first signal received from the communication device 160 to the second biometric input received by the second biometric device 15a' to determine a degree of correspondence therebetween. The controller 130 is also configured to output an output signal associating data related to the first signal and/or the second signal to the user providing the second biometric input when the degree of correspondence satisfies at least one predetermined criterion. In other words, in some manner, the controller 130 will associate the person presenting the second biometric input with the value associated with the first biometric input which is matched to the user presenting the second biometric input. As noted above, each of the first biometric device 15a and second biometric device 15a' comprise a device configured to measure at least one physical characteristic of a user. These biometric devices, for example, are configured to measure a physical characteristic such as a fingerprint, facial dimension(s), vein pattern, vein dimension(s), nailbed dimension(s), or skin spectral response, but are not limited thereto.

As with at least some of the preceding aspects, and other examples, the biometric device(s) may advantageously be configured to take a plurality of sequential biometric inputs. This preferably comprises, one the user has placed the appropriate body part (e.g., a finger) in the appropriate position adjacent the biometric device (e.g., 15a), simply imaging the characteristic several times in succession and need not, and indeed preferably does not, require the user to reorient or reinsert the body part. The object of taking multiple sequential biometric inputs is primarily to provide a robust template and/or plural templates by which a subsequent biometric input could be compared. It is desired to avoid any instance where a user's second biometric input is unable to be appropriately correlated to the user's first biometric input. Conceivably, a user may be unable to immediately redeem the deposited funds and may have to redeem the funds at a later time. If, prior to redemption, a user accidentally cut his or her finger that had been used for the first biometric input, a redemption system 100 which uses only a single biometric input (e.g., a single measurement taken by a single biometric device 15a) rather than plural biometric inputs (e.g., plural measurements taken by plural biometric devices 15a-n) may return a no-call error, resulting in an unpleasant situation for the store. Although it is certainly desired and contemplated by the concepts herein to include backup measures which permit a user to provide a receipt or other information upon which a date and time of the transaction may be determined and the templates manually compared, it is generally desired to automate the process and provide templates and data sets that are robust. Accordingly, in this aspect, the communication device 160 is configured to output at least said first signal relating to the biometric inputs taken by the first biometric device 15a.

Further, in accord with the aspect of this example, as well as the other examples, the second biometric device 15a' is configured to take a plurality of sequential biometric inputs. The controller 130 is configured to compare the first signal relating to the first biometric inputs against the plurality of biometric inputs taken by the second biometric device to determine a degree of correspondence therebetween. In one aspect of such comparison, the controller may compare any combination of the plurality of biometric inputs taken from the first biometric device to the biometric inputs taken by the second biometric device.

When a match has been found, it is necessary in the embodiment of the present example, to communicate the result to a POS employee (e.g., a cashier) by, for example, an audible instruction to a POS employee via a speaker (e.g., 155), an instruction presented on a display (e.g., 140) to a POS employee, or a printed instruction via a printer (e.g., 150) to a POS employee. In accord with this instruction to the POS employee, the POS employee will tender money to the user or redeem the amount owed in the form of merchandise or services.

In with at least some of the aspects and examples presented herein, coin processing machine 10 further comprises a printer 32 and is configured to output therefrom a transaction ticket bearing indicia relating a time of the transaction, a date of the transaction, a transaction number, a value of the transaction, and/or a characteristic of said biometric input. In accord with the present concepts, the value of the transaction may be easily omitted, if not advantageously omitted, from the transaction ticket. Instead, it may be particularly advantageous in accord with the present concepts to print on a transaction ticket (if provided) a characteristic of the biometric input, so that such biometric input could be later compared, if necessary, to the second biometric input. Such a characteristic of the biometric input comprise, but are in no way limited to, the actual biometric input (e.g., a partial view of the fingerprint, such as a top half or left or right side, or a view of the fingerprint with a central portion obscured), encrypted or unencrypted textual information about the biometric input (e.g., "loop" to designate a fingerprint loop pattern), encrypted or unencrypted information about the spatial or mathematic relations between various features of the biometric input (e.g., height of loop, distance of "loop" terminus to ridge of specified number at a specified angle, etc.).

In still other aspects, where a camera is used as a biometric input device, a simple picture of the user may be taken and printed on the user's receipt. Alternatively, a feature of the user other than the biometric input and/or characteristic feature(s) may be captured and printed, in an encrypted or an unencrypted manner, on the receipt. For example, the user's fingerprint may be used as the biometric input and the user's picture could be taken with a relatively inexpensive web-based camera for association with the receipt and/or provided as a backup for a subsequent identification of the user. As with the biometric inputs in accord with at least some of the present concepts, the user's picture is preferably deleted from the system and/or disassociated with the transaction following redemption of the entire amount of the deposited coins, less any fees which might be levied. To minimize any attempts at forgeries and/or counterfeiting, the transaction ticket substrate may comprise a conventional security paper.

In still another aspect of the present concepts, shown in FIG. 5(f), the present concepts include a redemption system 100 comprising a currency processing machine 10, which may advantageously be a coin processing machine, disposed in a first store. The currency processing machine 10 is configured to receive a batch of coins in an input region 14 and to process the batch of coins to determine a value thereof. The coin processing machine 10 comprises a first biometric device 15a configured to receive a user's biometric input and a communication device 160 configured to a signal or signals relating to the biometric input and to the value. The redemption system 100 also includes a second biometric device 15a', disposed in a second store or business (e.g., a grocery store, a bank or credit union, a home store, a clothing store, a department store, a restaurant, a cafe, a sporting arena, etc.), configured to receive a second biometric input of the user in connection with a transaction. The second store may be related to the first store or may be unrelated to the first store and, in at least some aspects, the second biometric device may be associated with a point of sale terminal at the second store.

The redemption system 100 additionally includes a controller 130 configured to compare the first biometric input data borne by the first signal to the data corresponding to the second biometric input to determine a degree of correspondence therebetween and to output an output signal when the degree of correspondence satisfies at least one predetermined criterion. As with the prior examples, the output signal associates data related to the first signal and/or the second signal to the user providing the second biometric input, such as by causing an audible instruction instructing an employee of said second store to provide cash or merchandise in an amount up to the value of the processed coins, less any transaction fee. The second store may itself optionally charge a transaction fee (e.g., $0.25, $0.50, 1% of the transaction amount, 2% of the transaction amount, etc.) for the convenience of redeeming money processed in the first store. The instruction to the employee may also comprise, for example, an instruction presented on a display to an employee of said second store or a printed instruction to such employee.

To facilitate anonymity, the controller 130, or other like device, is configured to delete data associated with the first biometric input and the second biometric input following the successful matching thereof and output of the output signal if the transaction at the second store (or at the first store) is of a value at least equal to the value related to the first biometric input. For example, only when the amount due the user is completely redeemed should the user's data be deleted. In the instance where the user elects to, or is permitted to, redeem only a portion of the value associated with the user's data, the value of a subsequent transaction or transactions is then debited from the account associated with the data related to the first biometric input. The controller 130, or the like, is accordingly configured to debit a value related to the first biometric input if the transaction at the second store is of a value less than the value related to the first biometric input. Following such a transaction, however, the user's data relating to the second biometric input may be deleted or retained.

In still another aspect, shown in FIG. 5(*g*), a currency processing data management system 100, comprises a currency processing machine 10 including a currency discrimination device (not shown), a user input device 12, a currency storage device 28, a controller 30, and a first computer-readable storage medium 40. The controller 30 is configured to store currency processing information in the first computer-readable storage medium 40. The first computer-readable storage medium 40 itself bears an instruction set configured to transfer the processing information from the first computer-readable storage medium to a communication port 160 configured to receive a second, portable computer-readable storage medium 42. The processing information comprises information such as, but not limited to, a sub-batch total, batch total, day total, transaction total, denomination totals, beginning day balance, end of day balance, beginning shift balance, end of shift balance, number of bags full, and/or a number of bags changed. The user input device comprises, in one aspect, a display 12. The user input device may also or alternatively comprise a portable electronic device 46 connected, directly or through a wireless connection, to the communication port 160.

To control access to the processing information, the output of the processing data from the communication port 160 may be conditioned on a supervisor command input using the user input device 12, another user input device 46, or using a remote user interface associated with the communication port. In various aspects, the communication port 160 comprises a long-range or short-range (e.g., Bluetooth) wireless communication device, secured (e.g., encrypted) or unsecured communication link. The communication portion to which the second, portable computer-readable storage medium 42 may be removably connected may further be disposed internally (i.e., in a secure place not accessible to the public) to the currency processing machine 10. In various aspect, the second, portable computer-readable storage medium 42 may comprise a flash memory device, a memory of a PDA, a memory of a laptop computer, a magnetic memory card, a magnetic disk, an optical disk, memory chip, memory card, USB flash drive, and/or a flash memory card, or any equivalent portable storage device.

Figure 8:
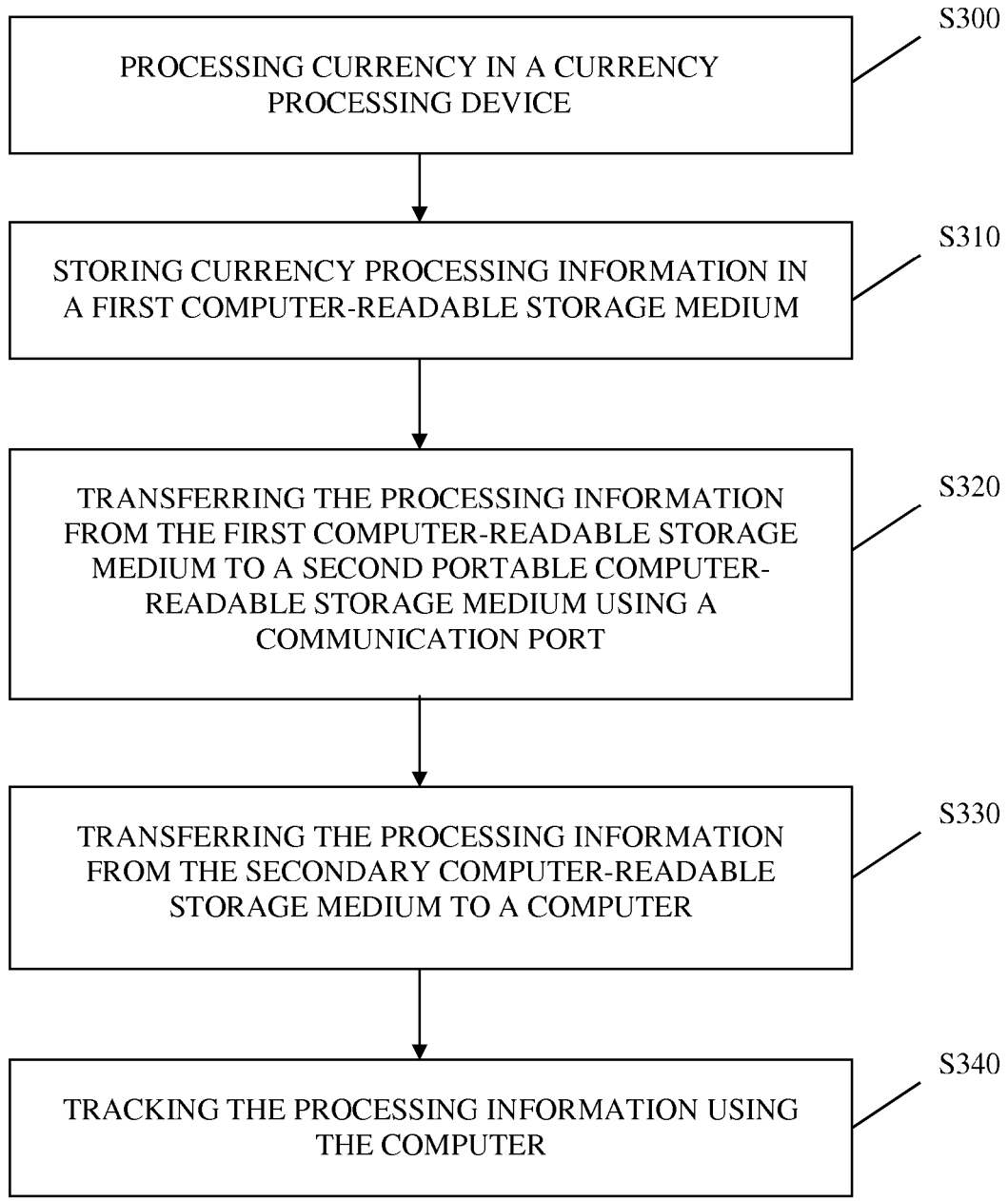
FIG. 8 shows aspects of one method in accord with at least some aspects of the present concepts.

In a related example, FIG. 8 shows still another aspect of the present concepts comprising a method of managing data from a currency processing system 100. This method comprises, initially, the act of processing currency in a currency processing machine, such as a coin and/or bill processing device, in S300. The method further comprises the acts of storing currency processing information in a first computer-readable storage medium 40 (S310), transferring the processing information from the first computer-readable storage medium to a second portable computer-readable storage medium 42 using a communication port 160 (S320), and transferring the processing information from the secondary computer-readable storage medium to a computer 48 (S330). As noted above, the processing information comprises information such as, but not limited to, a sub-batch total, batch total, day total, transaction total, denomination totals, beginning day balance, end of day balance, beginning shift balance, end of shift balance, number of receptacles (e.g., bags, bins, trays, etc.) full, and/or a number of receptacles changed. The method of managing data also includes an act of tracking the processing information using the computer 48 (S340). The method may still further optionally comprise transferring at least some of the processing information to a remote computer 134 from the computer 48, such option being conveyed to an appropriately authorized person such as by the display of such option on a computer display 49.

Use of a Pin or Other ID Number

Under certain other aspects of the present concepts, the user is requested by the coin processing machine 10 or a designated employee at the beginning of the transaction to enter a pin number, birthday, mother's last name, or any other code or information (e.g., numeric or non-numeric) known to the user that is easily remembered by the user. At the end of the transaction the user is directed to the service desk (or other redemption location, as noted above) to complete the transaction and redeem the deposited funds. In at least some aspects, the user then enters his or her pin number or other code or information into the terminal device (e.g. interface 200 in FIG. 14) at the service desk 210. The employee at the service desk 210 then checks the remote display on the terminal to determine whether or not the user's input corresponded to a previous input associated with an amount associated with the transaction. In one aspect, the employee at the service desk is presented, on the employee's display, with the pin number (or other code or information) entered by the user at the service-desk input device and the previously entered information and transaction information. In still other aspects, the user enters his or her PIN or other code or information, into a redemption interface 125, which may include a kiosk, ATM, vending machine, or the like, such as noted above. The display reveals the amount of cash due in payment against this pin number (or other code or information), if at all. After the transaction has been completed, the employee may delete the user's code and information, while optionally retaining the actual transaction information.

In at least one aspect of the present concepts, a redemption system 100 is provided comprising a coin processing machine 10 configured to receive a plurality of coins in an input region 14 and to process the coins to determine a value thereof. A user input device (e.g., a touch screen 12) is configured to receive an input of a code selected by a user and a controller 30 is configured to associate the code to the value. A communication device 120 is also provided and is configured to output the code and the value to a coin processing machine computer-readable storage medium 40, a local computer and/or a remote computer (e.g., host system 50). A receipt printer 32 may optionally be provided and configured to print a receipt bearing information relating to the processing of the plurality of coins.

Another user input device, disposed at a redemption location or interface 125 disposed remotely from the coin processing machine 10, is configured to receive a subsequent and corresponding input of a code by the user. A redemption controller 130 associated with or in communication with the redemption location or interface 125 is configured to compare the code input by the user into the user input device at the coin processing machine 10 (e.g., touch screen 12, keypad (not shown), etc.) and the code input by the user into the second input device 60. The redemption controller 130 then outputs a redemption signal to a local computer 50 and/or a remote computer 107 and/or redemption interface 125, or other device, when the code input into the user input device (e.g., 12) and the code input user into the second user input device 60 match. In another embodiment, the currency processing machine 10 controller 30 may serve as the redemption controller. The second user input device 60 may output the pertinent data, via a communication device associated therewith (e.g., communication device 160) to controller 30 for comparison to the code previously input into the user input device (e.g., 12). The controller 30 could then output via communication device 120 a corresponding redemption signal to a local computer 50 and/or remote computer 107 and/or redemption interface 125.

The input devices (e.g., 12, 60) are configured to receive a code comprising one or more numbers and/or letters, and preferably a plurality of numbers and/or letters. In some aspects of the present concepts, the code is the only user identification data associated with the value and/or other transaction data. In other aspects, the user's code may be associated with a transaction ID number and/or other transaction data in addition to the value.

Figure 9:
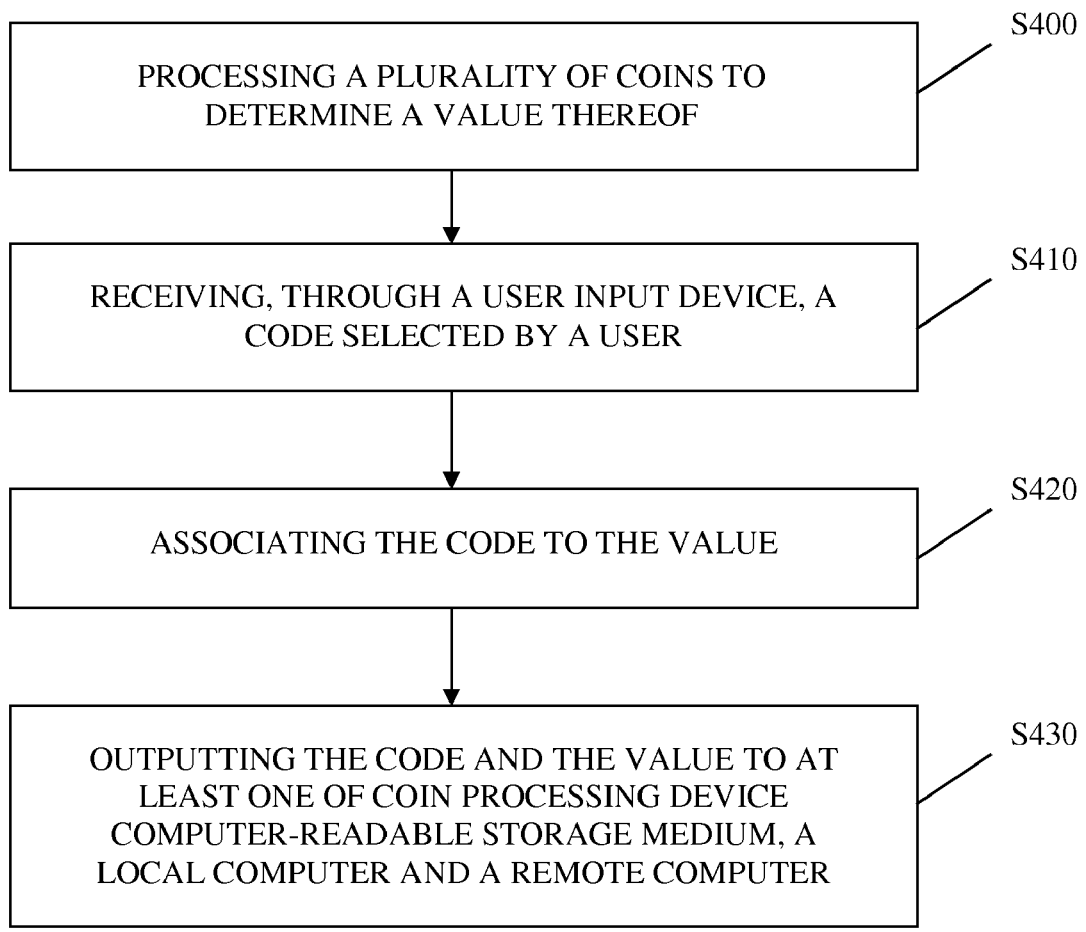
FIG. 9 shows aspects of one method in accord with at least some aspects of the present concepts.

FIG. 9 shows a currency redemption method in accord with at least some of the above-described aspects, the method comprising the acts of processing a plurality of coins to determine a value thereof (S400) and receiving, through a user input device (e.g., display 12), a code selected by a user (S410). The method also includes associating the code to the value (S410) and outputting the code and the value to a coin processing machine computer-readable storage medium, a local computer and/or a remote computer (S430). In lieu of the actual value, other transaction related data (e.g., transaction ID, transaction date/time) is optionally output with the code. When the user later enters a code for redemption, the successful matching of codes then permits the controller 130 to access a database which relates the other transaction related data to the specific value.

Additional acts include receiving, through a second user input device 60 disposed at a redemption location disposed remotely from the coin processing machine 10, an input of a code by the user (S440) and comparing the code input into the user input device (e.g., display 12) and the code input into the second input device 60 (S450), such as by a controller 130 configured to perform such comparison of data. The method also includes the act of outputting a redemption signal when the act of comparing indicates a match between the code input into the user input device (e.g., display 12) and the code input into the second user input device 60. Optional acts may include, for example, printing a receipt bearing information relating to the processing of the plurality of coins.

The acts of receiving in S410 and S440 may comprise, in some aspects, receiving a code including a number, a letter, a word, a color, a pattern, a shape, an expression, a relation, and/or a symbol. The user may be provided with prompts depicting one of a plurality of options to select from such as a template of colors (e.g., red, blue, yellow, green, etc.), shapes (e.g., circle, square, rectangle, etc.), etc. These options may provide a more memorable device by which a code entered by the user may be remembered. In other words, a user may opt to input, instead of a 4-digit or 5-digit code, the user can select a two digit number followed by a color and a icon, the color and icon having particular relevance to the user. Since the colors, icons, shapes, etc., may easily number greater than 10 (e.g., 64 colors), the security and variability in user codes may in fact be enhanced when a user selects from features other than numbers (each numeric position in the code having only one of ten values). The code may be, in some aspects, the only user identification data associated with the value.

The method may also include the act of associating the code with an expiration date and/or an expiration time. Thus, the redemption may be time limited. In one example, the act of associating the code with an expiration time may associate the code with an expiration time set at a predetermined time between about 15 minutes and about four hours from the act of associating the code to the value. Thus, a user is permitted varying degrees of time to complete the redemption transaction (e.g., one hour, two hours, etc.). The limited window of time for redemption helps ensure that a redemption is, in fact, promptly executed, minimize the potential for plural entry of the same code by different users (e.g., two users having the same birthdate and using the same as a code), and minimize the potential for fraud. In accord with this and other aspects, the method preferably includes the act of deleting the code from the coin processing machine 10 computer-readable storage medium (e.g., 40), local computer 50, remote computer 107, and/or wherever else resident, following redemption of the value.

The Assignment of a Random Number by the Machine (Deli Number)

In accord with still other aspects of the present concepts, the user is not required to enter their own number or code, as noted in the above examples. Instead, at the end of (or at the beginning or during) the currency processing transaction the currency processing machine 10 issues a unique random identifier (e.g., a random number, code, non-numeric representation, a transaction identifier, a customer identifier, etc.), such as a "deli number." This unique random identifier (e.g., "36" or "A36" or "ZXERYQ") is printed on a piece of paper (e.g., security paper) or other substrate or electronic device and dispensed to the customer.

The customer then carries this substrate or device bearing the unique random identifier to the service desk (or other locations, as noted above) for redemption or payment. In one aspect, the employee enters the unique random identifier at the service desk. The unique random identifier appears on the remote terminal and indicate the amount due on the transaction. Once the transaction is completed, the employee can close out the transaction, and the files are updated accordingly. In other aspects, the customer can enter the unique random identifier (e.g., key-in data or scan the random number) directly into a redemption interface 125 such as, but not limited to, a kiosk (e.g., an ATM or vending machine).

In accord with aspects of the present example, a redemption system 100 may comprise a coin processing machine 10, as noted above, comprising a receipt printer 32 and a controller 30. The controller 30 (or other controller, such as controller 130) is, in this aspect, configured to cause the receipt printer to output a receipt bearing a code randomly generated by the controller. The controller 30 associates the random code printed on the receipt to the value and, through a communication device 160, outputs the code and the value to a computer-readable storage medium (e.g., 40, 106), a local computer or host system 50 and/or a remote computer 107 and/or other device. As with the preceding examples, the communication device 160 can comprise any means and/or medium by which data can be conveyed from one controller to another controller including, but not limited to a serial port, parallel port, USB port, ECP port, IEEE 1394 port, Ethernet port, modem, wireless device, RF device, and IR device.

The communication device 160 is preferably configured to output the code and the value to, for example, a local computer 50 or remote computer 107 configured as a redemption interface. At the redemption interface, an input device 60 (e.g., a keypad, a keyboard, a button panel, a touch screen, scanning device, bar code scanner) may be provided to accept an input of the code by a user or employee. As with at least some of the preceding disclosure, the code associated with the transaction and value may be assigned with an expiration date and expiration time, at which time the code will be invalid for redemption. The code may comprise any code selected within the constraints of the system and may generally include any letter, number, word, color, pattern, shape, expression, relation, or symbol. In several unconventional aspects, the code comprises a particular combination of product items for sale in the store to relate to a particular theme or even to particular advertiser's names or product names so as to possibly provide a source of advertising revenue. The controller 30, following issuance of the random numbers, may advantageously be configured to prohibit re-selection of any recently issued numbers or relations, so as to avoid the possibility that two entirely random codes might inadvertently match. Alternatively, of course, the random codes are selected from a population of codes having a number of potential codes sufficiently large that the possibility of duplicate codes are infinitesimally small. The controller 130 at the redemption interface is configured to compare the code entered into the secondary user interface 60 with the code input into the currency processing machine 10 interface to determine if the codes are identical.

Figure 10:
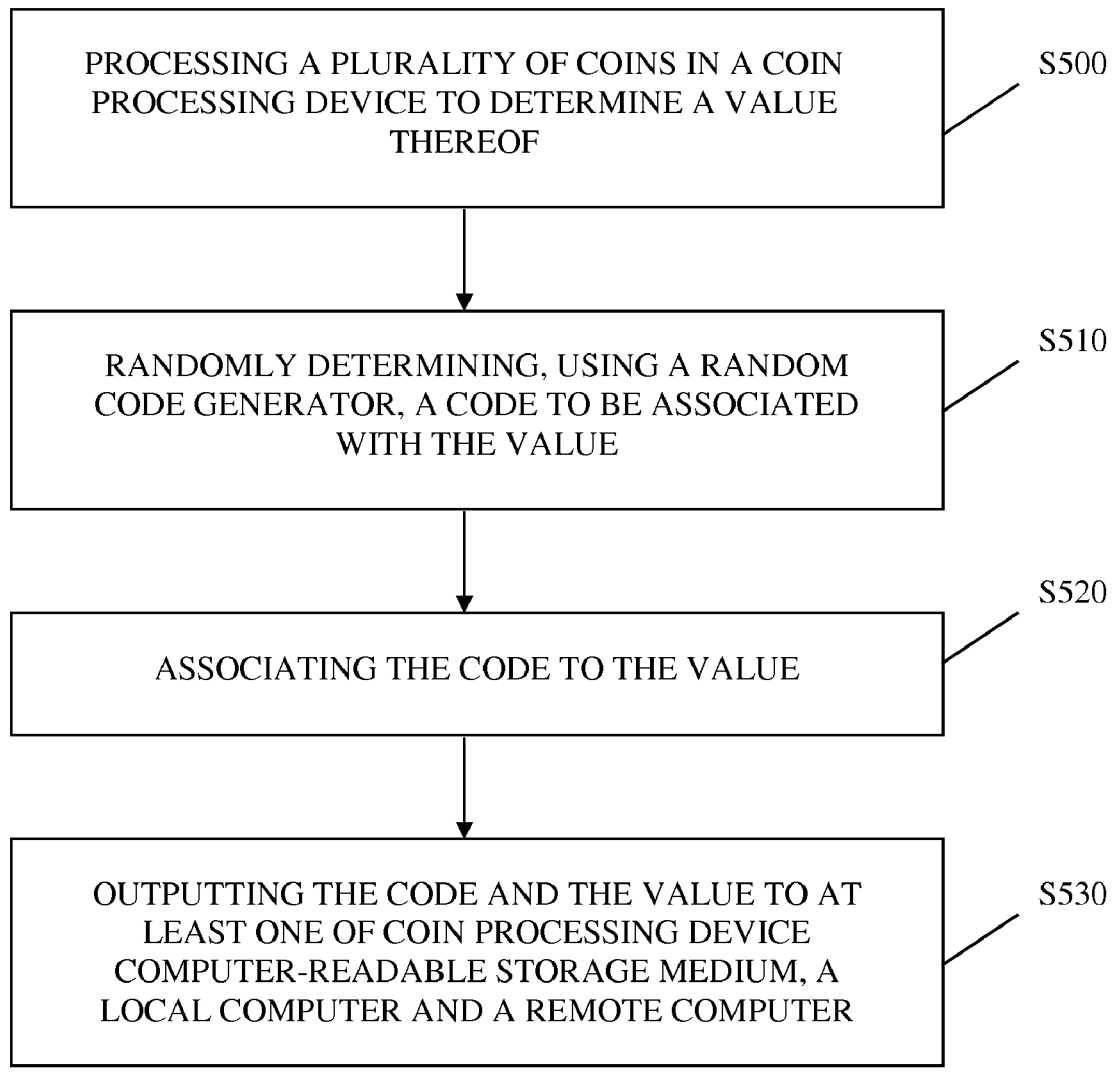
FIG. 10 shows aspects of one method in accord with at least some aspects of the present concepts.

Still other aspects are shown in the currency redemption method of FIG. 10, which includes the acts of processing a plurality of coins in a coin processing machine to determine a value thereof (S500), randomly determining, using a random code generator, a code to be associated with the value (S510), associating the code to the value (S520), and outputting the code and the value to at least one of coin processing machine computer-readable storage medium, a local computer and a remote computer (S530). The random code generator generated may be selectively modified to ensure that two random numbers are not inadvertently issued within some predefined period. For example, the random code generator may comprise a filter that prevents the improbable issuance of a random code that is identical to a random code that is, or may be, potentially active and redeemable. The filter could, for example, force the random code generator to pick another random number if the initial random code selected had been previously issued within the past month, quarter, or year. The code, in one aspect, may comprise a bar code representation of the randomly generated code.

The method may further comprise the act of printing a receipt bearing the code determined by the random code generator. In accord with the present concepts, it is not necessary to print the value of the transaction on the receipt, although this may certainly be done. If an expiration date or expiration time is to be assigned to the code, the receipt should prominently indicate such expiration date and time.

The method may also include the act of receiving, at a redemption interface 125, an input of a code borne by a receipt, such as by the user, an employee of the store in which the redemption interface is disposed, and/or a scanning device (e.g., a bar code scanner, OCR scanner, etc.). The redemption interface 125 may, in one aspect, comprise an input device 60 comprising a scanner accessible to the user adjacent a service desk window or teller window. The user may scan the receipt and the random code read by the scanner is transmitted to a redemption controller 130 configured to perform the act of comparing the code input into the redemption interface 125 and the code associated with the value to determine if they match. When a match is found, the user presenting the receipt is provided with the value associated with the user's transaction, less any optional transaction fees, in cash, merchandise, credit, and/or services in an amount up to but not exceeding the value. Following redemption, the method comprises the act of deleting the code from redemption system, wherever stored (e.g., the coin processing machine computer-readable storage medium 40, a local computer 50 and/or remote computer 107).

Cards Provided at the Coin Processing Machine

In yet another aspect of the present concepts, a coin processing machine 10 is configured to (1) receive a magnetic-strip-bearing card having information thereon relating to an account established with a third-party vendor and (2) transmit information on the transaction to the account (e.g., transfer a value or portion of the value of the transaction to the account set up with the third-party vendor). In at least some aspects, rack of magnetic-strip cards or encoded cards are provided on a rack adjacent one of the coin processing machines 10, each card bearing optional text and/or optional graphics signifying a particular third-party vendor (e.g., Crate and Barrel, Williams and Sonoma, etc.) and bearing encoded information which may be used to activate an account. The third-party vendor could comprise, for example, the store in which the currency processing machine is situated (e.g., a Jewel grocery store) and, in this way, the customer may be optionally constrained to apply the value of the processed coins to such store or to a redemption device 125 (e.g., ATM, kiosk, vending machines, etc.) located therein. The encoded information may include, for example, a card number, an actual account number, a reference number, or information useable to establish an account. In a preferred aspect, the cards do not have any value stored to them or any intrinsic value. A customer selects a card, from amongst an optional plurality of available types of cards, from the rack adjacent the coin processing machine 10 and insert the card into a card reader associated with the coin processing machine before, during, or after processing of a batch of coins. The card reader then transmits the encoded information to either access an empty account that has already been established or establishes a new account with the third-party vendor and to associate the particular card selected by the customer to the newly activated account.

After activation of the account with the third-party vendor, the value of the batch of processed coins is transferred to the account. In another aspect, a third-party card or small electronic readable ID device (e.g., an RFID, a flash memory device, etc.) is dispensed to the customer at the end of the transaction at the currency processing machine 10.

In another example, the coin processing machines 10 is configured to permit a customer to input a plurality of coins for processing and select via an input device a vendor from which they would like to receive a stored value card. The coin processing machines 10 is configured to establish an account with the selected third-party vendor and dispense a magnetic-strip-bearing stored-value card having information thereon (i.e., an account number) relating to the account established with a third-party vendor.

Whatever the source of these third-party cards, whether directly from the machine or whether selected from a kiosk, rack, display or counter adjacent the machine, the customer may use the selected card, following coin processing and activation, to access the third-party vendor account and apply a portion of the balance or the entire balance toward the purchase of one or more items from the third-party vendor.

In still other aspect, the currency processing machine 10 is configured to dispense a card or small electronic readable ID device (e.g., an RFID, a flash memory device, etc.) to the customer at the end of the transaction (or at the beginning of the transaction or during the transaction) at the currency processing machine 10. This card or device would have the user's transaction number, random code, identification number, or the like, embedded in the card or device or otherwise integrally associated therewith (optically, magnetically, electrically, physically, etc.). The currency processing machine 10 could, such as by a controller 30, select a user's transaction number, random code, identification number, or the like, and write or otherwise associate such number or code on or with the card or device. Alternately, the card or device contains a unique number, code, or characteristic embedded or formed in the card when it was manufactured. In this latter embodiment, the currency processing machine 10 captures or read the number, code, or characteristic from the card or device and activate the number, code, or characteristic (e.g., by populating the database of numbers, codes, or characteristics associated with a redeemable transaction with the captured or read number, code, or characteristic) when the card or device is dispensed. The card or device may comprise, for example, a card containing various types of readable codes including magnetic strip, some type of radio frequently device, smart chip, or other common methods of readable devices known in the art that are used on such cards. In some respects, this embodiment is similar to the "deli number" approach disclosed above.

After receiving the card or device, and after the processing of the coins, the user is directed to the service desk, such as by a display 12 prompt or message on the receipt output by the currency processing machine 10. At the service desk there is a device, such as a user input device 60 or a similar device provided to an employee at a service desk that is able to read the card or device. The device (e.g., user input device 60) transmits this information to a terminal at the service desk (or other location) to enable the store employee to identify the receipt (and by implication the customer) to the correct transaction. The payment or credit is then made against the transaction and the transaction closed out on the terminal and the company records updated accordingly.

A redemption system in accord with at least one aspect of the present concepts comprises a coin processing machine 10 configured to receive a plurality of coins in an input region 14 and to process the plurality of coins to determine a value thereof. The coin processing machine 10 comprises, in various aspects, a card or device dispenser, a card or device writing device, and/or a card or device dispenser reading device. In one aspect, a controller 30 causes the card or device dispenser to output a card or device bearing a number or code (a "first code") randomly generated by the controller and written to the card or device by a writing device appropriate to the card or device. In another aspect, a controller 30 causes the card or device dispenser to output a card or device bearing a predetermined number or code (a "second predetermined code") embedded in or associated with the card or device. Depending on the configuration, the controller 30 is configured to activate a respective one of the first code and the second predetermined code and associate the activated code to the value. As previously described, the activated code may comprise any combination of an encoded letter, a number, a word, a color, a pattern, a shape, an expression, a relation, and a symbol.

A communication device 160 is provided and is configured to output the value and the activated code to a coin processing machine 10 computer-readable storage medium 40, a local computer 50 and/or a remote computer 107. As previously noted, the communication device 160 can comprise any means by which communication between controller 30 and another controller or external system 50 may be achieved including, but not limited to, a serial port, parallel port, USB port, ECP port, IEEE 1394 port, Ethernet port, modem, wireless device, broadband device, Bluetooth device, RF device, and IR device. The communication device 160 is configured to output the value information for the processed currency and the activated code to, for example, a local computer 50 and/or a remote computer 107, at least one of which is configured as a redemption interface 125.

The redemption interface 125 comprises an input device 60 configured to receive an input of the activated code from a user or from an employee responsible for providing redemption assistance, the input being from a card or device bearing the first code or the second predetermined code previously activated by the controller 30 and transmitted to the redemption interface. The input device 60 comprises a device to read at least one of a magnetic, electrical, and optical characteristic of a card or device bearing a respective one of said magnetic, electrical, and optical property or characteristic. For example, the input device 60 may be configured to read a magnetic strip, a bar code, an IR ink, or a UV ink. In other aspects, the input device 60 may be configured to read a smart chip or receive/read transmitted RF signals. As with previous embodiments, the activated code or number may be associated with an expiration date and time, at which time said activated code or number will be invalid for redemption. When presented for redemption, the redemption interface 125 controller 130 is configured to compare the activated code with the code input into the redemption interface to determine if the codes are identical. If the codes are, indeed, identical, then the bearer of the receipt is provided with compensation in currency, merchandise, credit or services up to an amount of the value.

Figure 11:
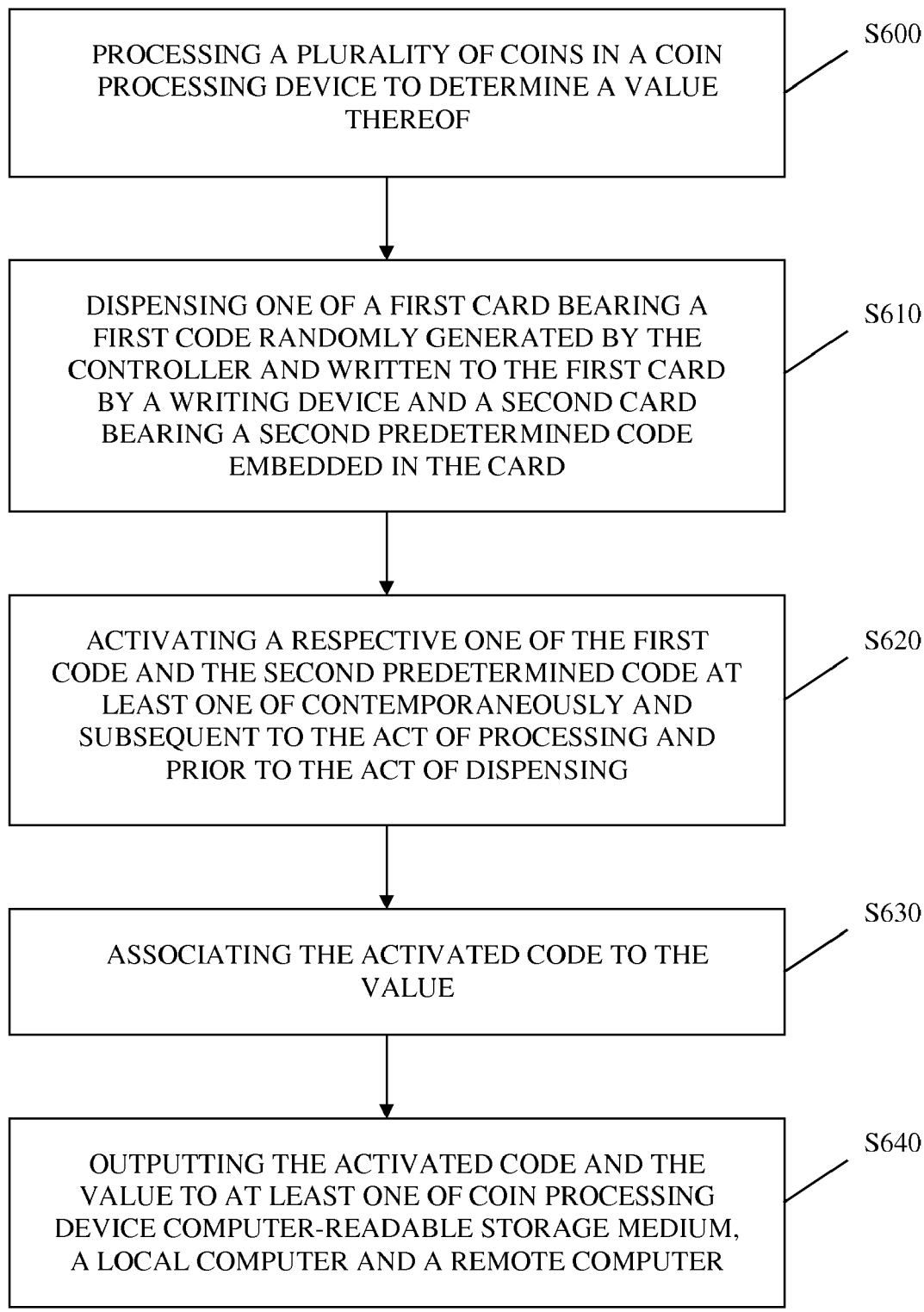
FIG. 11 shows aspects of one method in accord with at least some aspects of the present concepts.

In accord with the above concepts, a currency redemption method in accord with the present concepts is shown in FIG. 11. This currency redemption method comprises the acts of processing a plurality of coins in a coin processing machine to determine a value thereof (S600) and dispensing one of a first card or device bearing a first code randomly generated by the controller 30 and written to said first card or device by a writing device and a second card or device bearing a second predetermined code embedded in or associated with the card or device (S610). Before, during, or after the dispensing act S610, the method includes activating a respective one of the first code and the second predetermined code (S620) and associating the activated code to the value (S630). The method further includes the act of outputting the activated code and the value to a coin processing machine computer-readable storage medium, a local computer and/or a remote computer (S640).

The method of FIG. 11 may further include the act of receiving, at a redemption interface 125, an input of a code borne by a card or device, such as by an input device, and the act of comparing the code input into the redemption interface and the activated code associated with the value to determine if they match. This method may further comprise the act of providing a currency, merchandise, credit, or service, or the like, to a bearer of the card or device in an amount up to the value if the code input into the redemption interface 125 and the activated code match. Once an activated code has been matched to a redeemed code, the method further includes the act of deactivating the activated code from the coin processing machine computer-readable storage medium, local computer and/or remote computer following redemption of the value.

Alternatively, the above-noted third party cards may be stored in one or more dispensers or cartridges in or near the coin processing machine 10. In some aspects, the dispensers or cartridges are electronically-based mechanisms configured to automatically dispense a requested card responsive to a customer input. In some other aspects, the dispensers or cartridges are mechanically-based mechanisms configured to automatically present a card for a customer to draw (e.g., a mechanical spring loaded dispensing system), upon the removal of which another card is automatically presented for a subsequent draw. As noted above, the card could be dispensed before, during, or after a coin processing transaction.

Use of a Store Preferred Card for ID Purposes, Credit Card, or ID

Another idea in accord with at least some aspects of the present concepts includes the use of biometric data in conjunction with a store's "loyalty" program. For example, this may be viewed, in some respects, as being akin to using biometric data in lieu of a Jewel card or some other store card or loyalty program in which the customer receives special offers as a result of being a card member or a club member. In at least some aspects, a database (e.g., database 106, FIG. 3) contains an index to the biometric data so that a specific name is associated with the biometric information particular to that user. In at least some other aspects, such database index the biometric data, but attaches no specific name to the biometric information, as represented, for example, in FIG. 12

In an alternate embodiment, the self service coin machine is equipped with a card reading device and/or other readable medium reading device (e.g., an RFID reader such as a Mobil 1 quick pass reading device). This device is configured to read various codes, including magnetic, smart card, chips, radio frequencies, bar codes, flash memory, or other methods of codes utilized in cards or other similar mediums. At the beginning of a transaction, the user is instructed to dispose their preferred store card, credit card, debit card, smart card, or other readable medium in an appropriate position relative to the card reading device and/or other readable medium reading device to permit such reading device to read information from the card or other readable medium, as applicable. The currency processing machine optionally provides instructions or information to the user, such as by outputting a prompt or prompts on the display 12, from a speaker, or by printing instructions on a receipt.

The user then completes the transaction by going to the service desk or other location (e.g., ATM, kiosk, vending machine, etc., as noted above) to receive payment or other form of redemption. At the service desk there is a similar device available to read the store's preferred card (or other card or readable medium) and the preferred card's ID number code is transmitted to the terminal device at the checkout desk enabling a store employee to match the customer ID to the correct transaction. Payment is then made to the customer and the transaction completed, closed and the accounting system updated.

One advantage conferred by the preferred card is that it enables a store to directly issue a balance to the user on their preferred card account. Therefore, a user might make several deposits of coins and run up a credit balance on the preferred card account at the store of, for example, $300. The user could then choose to redeem this balance for cash, or alternately redeem this for products at the store, coupons, promotional, or use at other participating retailers. The store may, for example, give special promotions for those using credit balances off of their preferred accounts (e.g., you might get two cake mixes for the price of one, a fixed or tiered discount, etc.), by using balances associated with the preferred card. These aspects enable the retailer to reward their most loyal customers and drive customer purchases into their stores.

Under still another embodiment, the currency processing machine 10 would be equipped with a reading device to read various types of cards and/or devices including credit cards, ATM cards, flash memory, debit cards, or other machine readable identification cards or devices held by customers (e.g., driver's license, membership in a co-op, member in Costco, Mobil 1 quick pass, etc.). As noted above, this reading device is configured to read cards and devices bearing data including, but not limited to, magnetic strips, smart chips, RF signals, flash memory, bar codes, and the like. At the beginning of the transaction the user would be instructed to insert a machine readable card or device (e.g., Visa, American Express, etc.). At the completion of the transaction, the user is instructed or prompted to go to the service desk or other location to receive payment or other compensation. A device configured to read the credit card, ID card, or other card or device is likewise provided at the service desk for use by the user or by an employee working at the service desk. In accord with at least some aspects of the present concepts, the unique ID number on the credit card, ID, or other device is matched to the transaction previously conducted by the user presenting the card or device in connection with the request for redemption and a successful match (or unsuccessful match) displayed on the terminal at the self service desk or otherwise communicated to the store employee (e.g., via speaker output or printed output). The store employee can then make the payment, provide merchandise, offer credit, offer services or provide other compensation against the transaction and close out the transaction and update the accounting system.

In accord with the above concepts, another redemption system in accord with at least some of the present concepts comprises a coin processing machine 10 configured to receive a plurality of coins in an input region 14 and to process the plurality of coins to determine a value thereof. The coin processing machine comprises a reading device configured to read a code comprising an identification code, an account code, and/or a transaction code from a code bearing medium. A communication device 160 is provided and is configured to output data relating to the value and data relating to the code to, for example, a computer-readable storage medium 40, local computer 50, remote computer 107, server 104, and/or a computer network 52. In some aspects, the coin processing machine 10 also comprises a controller 30 configured to prevent processing of the plurality of coins until the reading device outputs a signal relating to a successful read of the code or number from the code bearing medium.

In other aspects, the coin processing machine 10 further comprises a controller 30 configured render the input region 14 inaccessible to a user until the reading device outputs a signal relating to a successful read of the code. For example, the input region 14 may be covered by a movable door that is moved to an open position in response to a successful read of the code. In each of the latter two aspects, the operation of the currency processing machine is made contingent upon the user's successful input of a code bearing medium permitting reading of a code therefrom comprising an identification code, an account code, and/or a transaction code. As with the prior examples, wherein the redemption interface 125 controller 130 is configured to compare the code entered into the currency processing machine 10 with the code input into the redemption interface to determine if the codes are identical. If so, the user will be permitted to redeem a value up to the amount of the value, less any optional fees, in currency, merchandise, credit, or services.

In any of the above aspects, the reading device may be configured to read a code from a code bearing medium bearing a code in at least one of a magnetic, electrical, electromagnetic, and optical medium. For example, the reading device may be configured to read at least one of a magnetic strip, bar code, IR ink, UV ink, smart chip, and RF signal. The code may comprise a letter, a number, a word, a color, a pattern, a shape, an expression, a relation, and a symbol, singly or in combination. As previously described, the code may be assigned, by the redemption interface 125 controller 130 or currency processing machine controller 30, an expiration date and time, at which time the code will be invalid for redemption of the associated amount (e.g., the database would disassociate the code from the amount).

Figure 12:
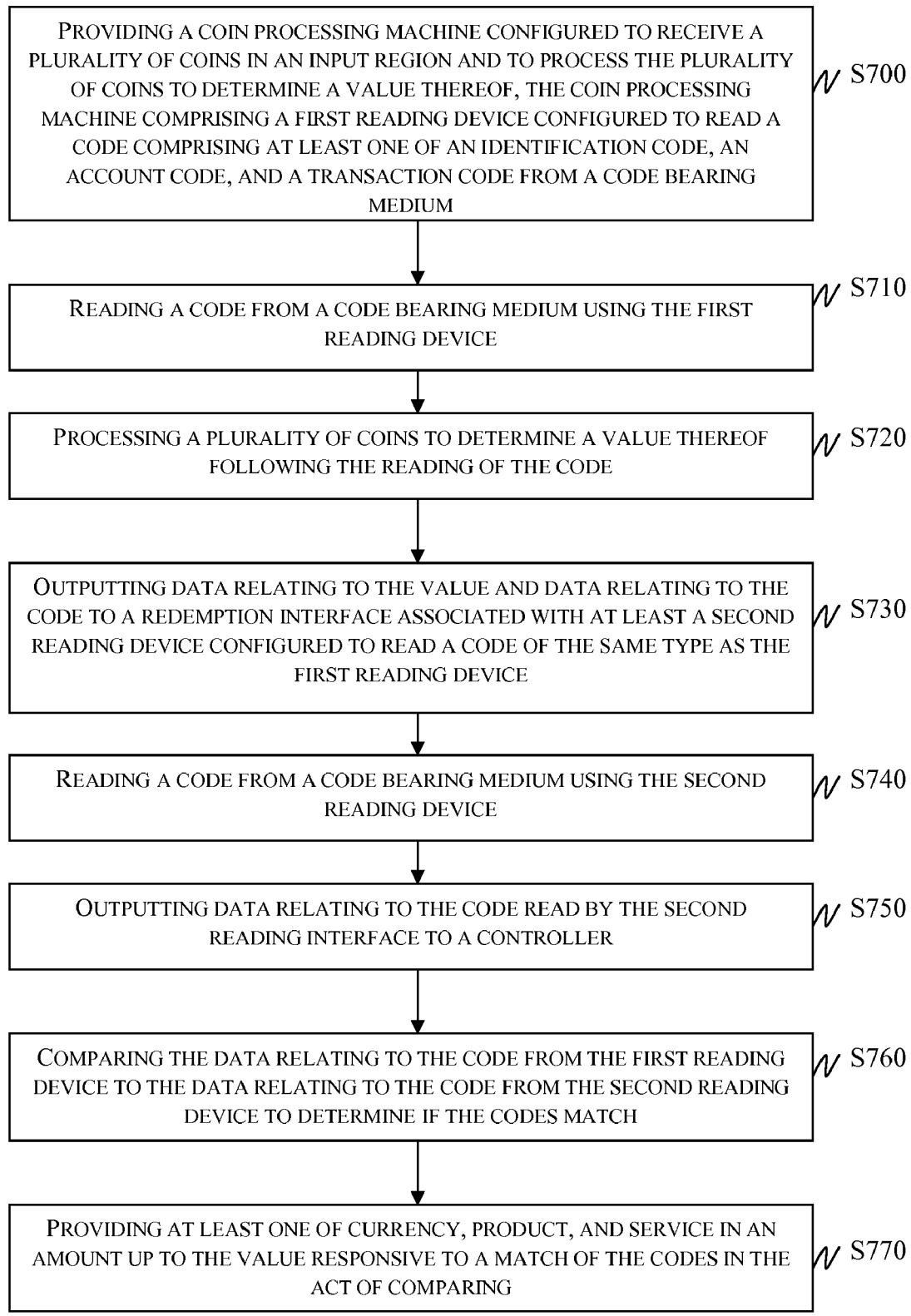
FIG. 12 shows aspects of one method in accord with at least some aspects of the present concepts.
Figure 13:
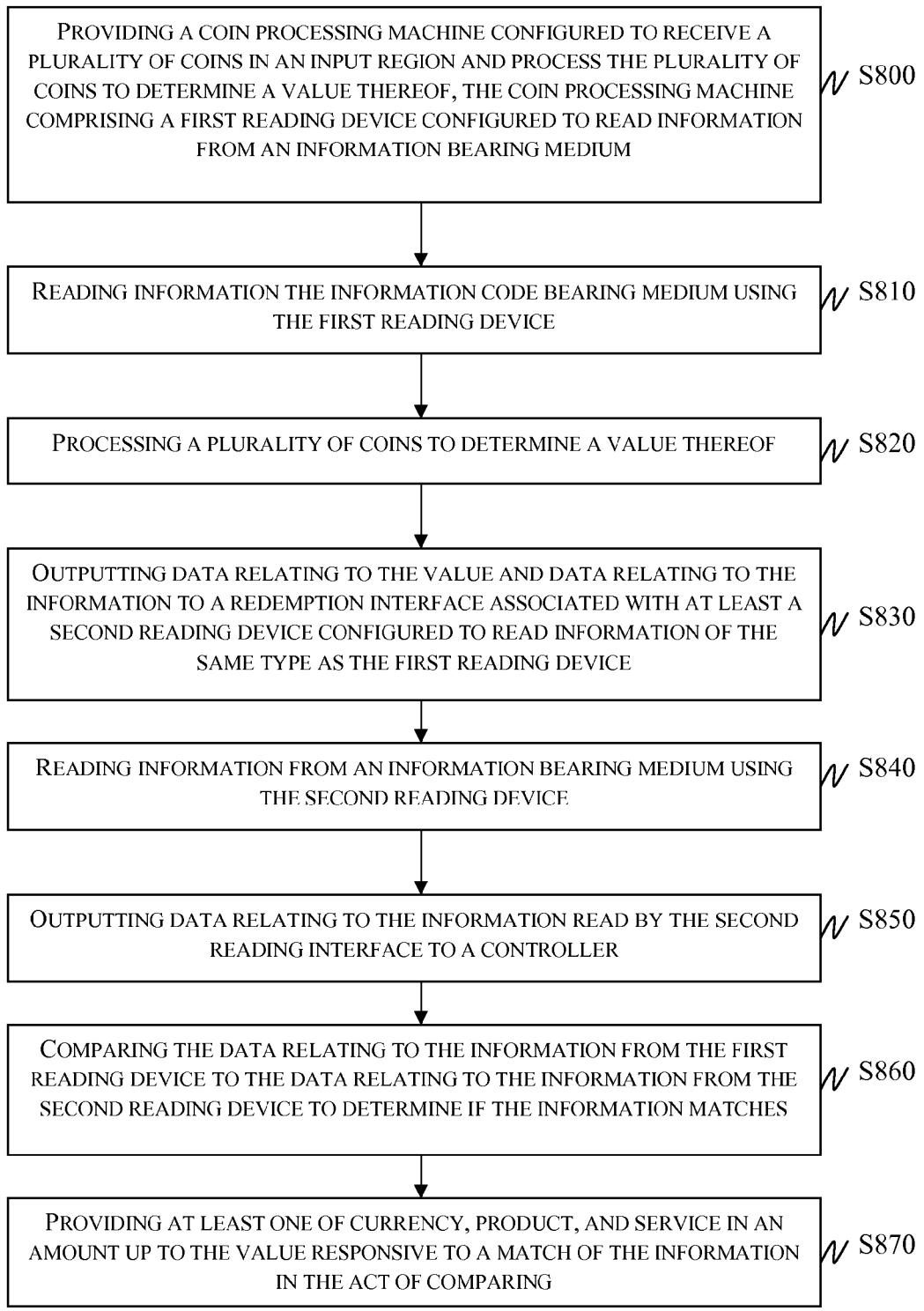
FIG. 13 shows aspects of one method in accord with at least some aspects of the present concepts.

FIG. 12 shows, in another aspect of the present concepts, a method for redeeming currency comprising the acts of providing a coin processing machine 10 configured to receive a plurality of coins in an input region 14 and to process the plurality of coins to determine a value thereof (S700), wherein the coin processing machine 10 comprises a first reading device configured to read a code comprising an identification code, an account code, and/or a transaction code from a code bearing medium. The method also includes, in S710, the act of reading a code from a code bearing medium using the first reading device and, following the reading of the code, an act S720 of processing the coins to determine a value thereof. The method further includes, in S730, the act of outputting data relating to the value and data relating to the code to a redemption interface 125 associated with a second reading device configured to read a code of the same type as the first reading device. The redemption interface 125 comprises, in various aspects, a computer-readable storage medium, local computer, remote computer, server, and/or a computer network.

The method further includes the acts of reading a code from a code bearing medium using the second reading device (S740), outputting data relating to the code read by the second reading interface to a controller (S750), and comparing the data relating to the code from the first reading device to the data relating to the code from the second reading device to determine if the codes match (S760). Responsive to a match of the codes in the act of comparing, at least one of currency, product, and service in an amount up to the value is provided (S770). In one aspect, this latter act S770 may include providing a currency, product, and/or service in an amount of the value responsive to a match in the codes in the act of comparing (S760).

Another act in a preferred aspect is to disassociate the value from the code obtained in the act of reading a code from a code bearing medium using the first reading device following the act in S770 of providing at least one of currency, product, and service in an amount up to the value responsive to a match in the codes in the act of comparing.

The act of reading a code from a code bearing medium using the first reading device (S710) may itself comprise reading data from a magnetic strip of a store loyalty card or preferred card and, correspondingly, the act of reading a code from a code bearing medium using the second reading device (S740) comprises reading data from a magnetic strip of the store loyalty or preferred card. In another example, the act of reading a code from a code bearing medium using the first reading device (S710) may comprise reading data from an RFID associated at least with a store in which the coin processing machine 10 is disposed and the act of reading a code from a code bearing medium using the second reading device (S720) likewise comprises reading data from an RFID associated at least with a store in which the redemption interface is disposed.

In some aspects, the act of providing a currency, product, and/or service in an amount up to the value responsive to a match in the codes in the act of comparing (S770) further comprises providing a benefit to a bearer of the code read from a code bearing medium using the second reading device, the benefit being related to the match in the comparing step and/or the value. Thus, in one example, the act of providing in S770 is used to increment a counter. When a code associated with a redemption counter is credited with a predetermined number of transactions, the code itself may be associated with a benefit, which is accordingly passed to the bearer of the code. For example, the redemption system 100 can store historical information on that biometric input (e.g., a thumb print) for marketing purposes. In other words, for every $1,000 in coin redeemed, you now get a rebate of at least a portion of past service fees, a waiver of the next service fee, a coupon for future purchases, a $25 gift certificate, etcetera. Even though the redemption system 100 may not be configured to identify the person associated with the biometric input, the redemption system may be configured to track, for example, that that particular thumb was used in ten instances to process and redeem currency. Thus, the person presenting the thumb print for the tenth time might see, on the display, a message of thanks and congratulations stating that this biometric input has just been associated with its tenth transaction with a description of the benefit to be conveyed to the bearer of that biometric input.

Similarly, data relating to the value may be assigned to an account associated with the identification code, account code, or transaction code and this value may be debited in an amount corresponding to that provided in the act of providing (S770). Likewise, the value assigned to the account may be supplemented by subsequent acts of processing coins and of outputting data relating to the value and data relating to the code to a computer-readable medium and, ultimately, such account.

Still another aspect of the present concepts, shown in FIG. 12, includes a method for redeeming currency comprising the act of providing a coin processing machine 10 configured to receive a plurality of coins in an input region 14 and process the plurality of coins to determine a value thereof (S800), the coin processing machine comprising a first reading device configured to read information from an information bearing medium. The method further comprises the acts of reading information the information code bearing medium using the first reading device (S810), and processing a plurality of coins to determine a value thereof (S820). The method also includes outputting data relating to the value and data relating to the information to a redemption interface associated with at least a second reading device configured to read information of the same type as the first reading device (S830).

The method further includes the acts of reading information from an information bearing medium using the second reading device (S840), outputting data relating to the information read by the second reading interface to a controller (S850), and comparing the data relating to the information from the first reading device to the data relating to the information from the second reading device to determine if the information matches (S860). Responsive to a match of the information in the act of comparing, at least one of currency, product, and service in an amount up to the value is provided (S870).

The information bearing medium may comprise, but is not limited to, a credit card, debit card, ATM card, flash memory, machine readable card, store identification card, business identification card, government issued identification card, RFID, and body part.

In accord with at least some embodiments of the present concepts described by way of example above, a user may go up to a coin processing machine, place his or her thumb on a fingerprint biometric input device, process a batch of coins, walk over to the service center or POS, or other redemption device (e.g., kiosk, ATM, vending machine, etc.) present his or her thumb to another fingerprint biometric input device, and receive cash or merchandise in like value. The present concepts do not require the person's identity to be tied to the biometric input. The redemption system in accord with these aspects is not associating the biometric input to a particular person, but is rather associating the biometric input to a value. Thus, the person providing a matching biometric input is permitted to access and obtain such value.

Use of a ClearingHouse for Coin Deposit

Typically, when a customer presents credit card information to a merchant, the merchant transmits this data, along with their merchant ID code, to an e-commerce clearinghouse or ACH ("Automatic Clearing House") handling EFT ("electronic funds transfer"). The ACH is typically a firm that has contracted with the merchant's bank to clear charges in exchange for a flat fee and a percentage of every charge processed. The data is often transmitted by using a credit card POS terminal 53 to transmit the information. The clearinghouse contacts the bank that issued the customer's credit card and verifies that the charge is acceptable. If it is accepted, the clearinghouse then sends a confirmation message to the merchant. At the same time, the available credit from the customer's credit card is frozen by the amount of the transaction. At the end of a business day, the merchant, the merchant's computer or credit card terminal calls the clearinghouse and verifies all transactions for that day to ensure that the merchant's system and the clearinghouse agree on the transactions that have occurred during that day. Once the merchant and the clearinghouse agree on the day's transactions, the clearinghouse starts the process of transferring the money from the credit card bank to the merchant's bank account.

In accord with the present concepts, still another embodiment of the above-described coin processing machine 10 may be used to deposit funds through an ACH. The coin processing machine 10, in at least one such configuration, is connected to a DSL, cable, or other high-speed connection. When a card is swiped, the transaction is immediately routed over an Internet Protocol (IP) to a designated ACH. In accord with at least one aspect of such embodiment, a user of the coin processing machine 10 inserts or swipe their credit card, bank card, store account card, or like account identifier (or manual entry of data through user interface) before, during, or after the processing of a batch of coins and the amount processed, minus an associated transaction fee (e.g., such as, but not limited to, the ACH fee), is sent to an ACH for processing and deposit to the user's account associated with the card. In still another aspect, the routing to the ACH does not occur until after the user validates the transaction at a POS, such as by a biometric input.

Figure 14:
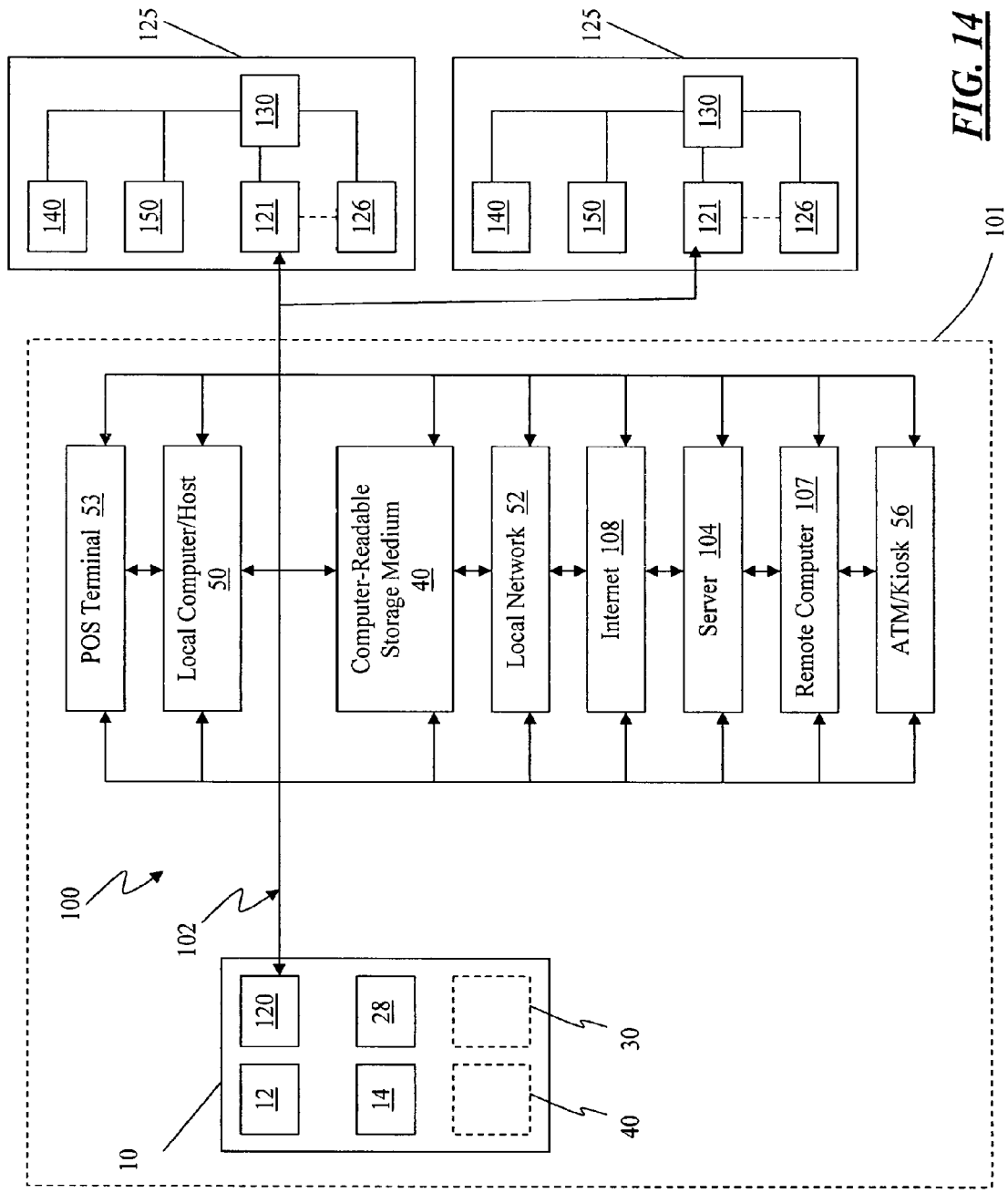
FIG. 14 shows aspects of one method in accord with at least some aspects of the present concepts.

Receipt Provided, if at all, after Completion of Transaction at Redemption Location In still another aspect of at least some of the present concepts, a coin processing machine 10 is configured to communicate via an in-store computer system communication link 202, 204 to an interface or receiving device 200 at any one of a plurality of destination locations, such as is shown by way of example in FIG. 14. In various aspects, the destination locations includes, but is not limited to, a service desk 210, a POS station 220a-n, a kiosk 230 (e.g., an ATM, a vending machine, a ticket dispensing machine, etc.), and/or a portable electronic device 250. The interface or receiving device (hereinafter "interface" for brevity) 200 comprises, but is not limited to, a display, a touch screen display, a computer, a controller, a printer, a communication device, a memory storage device, a portable electronic device and/or a speaker, such as may be provided in or with a service desk 210, a POS 220, kiosk 230, and/or a portable electronic device 250.

The interface 200 at the service desk 210 may be a non-networked, stand-alone interface. For example, the interface 200 comprises a display or printer disposed at a service desk, wherein the display or printer is connected to the coin processing machine 10 through an RS232 port, or the like, and serves as a remote display or remote printer of the coin processing machine. The coin processing machine 10 and/or interface 200 may be connected to an in-store computer, an in-store network, an external computer and/or an external network. Alternatively, in lieu of the service desk 210, the interface 200 is associated with other locations such as, but not limited to, a dedicated cashier station or POS (e.g., 220a), a specified one of a plurality of dedicated cashier stations or POSs 220a-n, or a kiosk 230 located only in the store, in the store and across the store's network (i.e., in other commonly owned or operated stores), and/or elsewhere. The term kiosk, as used herein, refers to any electronic self-service interactive terminal. A kiosk 230 includes, for example, but is not limited to an ATM, a vending terminal (e.g., cash, negotiable instruments, tickets, products, merchandise, coupons, etc.), an internet access terminal, an electronic catalog/on-line sales terminal, or the like.

The communication link between the coin processing machine 10 and the interface 200 at the service desk 210, POS 220, kiosk 230 and/or portable electronic device 250 could be a wireless connection 204 (e.g., an IR communication link, a light-based communication link, a radio frequency communication link, a broadband communication link, etc.) or a hardwired connection 202 (e.g., a serial port connection, parallel port connection, 10bT port connection, ethernet port connection, etc.). Either or both of the hardwired and wireless connections 202, 204 may be advantageously connected to, for example, one or more of a host system 50, network 52, and external systems, such as the internet 108, server 104, database 106, or remote computer 107, such as shown by way of example in FIG. 3.

In at least some aspects in accord with at least this embodiment, the coin processing machine 10 comprises or is connected to a data input device configured to accept a code from a customer. In at least some other aspects, a code may be randomly assigned to a customer. As used herein, the term code may include any combination of letters, numbers, symbols, words, characters, icons, colors, sounds, or the like, of any length, or may include any characteristic or data intended (e.g., a biometric input) to be relationally associated with some other data (e.g., a transaction). The data input device (not shown) may include, but is not limited to, one or more of a numeric and/or alphanumeric keyboard, a keypad, a touch pad, a microphone, a touch screen display, a touch pad, a magnetic scanner (e.g., magnetic card reader, bar code reader), a biometric input device (e.g., fingerprint reader, iris scanner, body part dimension, vein scan, nail bed scan, etc., as described by way of example elsewhere herein), or a carrier wave receiver (e.g., RF, IR, Bluetooth, etc.).

Preferably prior to initiation of a coin processing transaction on a coin processing machine 10, such as is described herein by way of example, the user is instructed (e.g., verbal instructions by an employee, written instructions, display prompts, etc.) to enter a code, such as a customer-selected PIN, a pre-assigned PIN, birthday, mother's last name, web-address, last 4-digits of a phone number, combination of letters and numbers (e.g. a name plus a number), driver's license number, or any other code or information (e.g., numeric or non-numeric) known to the user that could be reproduced by the user. In one aspect, for example, the code comprises a four digit number. In other aspects, the code comprises information stored on a magnetic strip and/or bar code of a card held by the customer such as, but not limited to, a store card, an ATM card, a bank card, an AMEX card, a VISA card, a library card, driver's license, or the like. In still other aspects, the code comprises a RF signal or other electromagnetic waveform signal, pulsed or continuous, of any wavelength, emitted from a portable electronic device (e.g., a fob, an electronic car key, a cell phone, a digital wallet, etc.). In still additional aspects, the code comprises a customer's biometric input or information derived therefrom (e.g., an extracted characteristic feature, features, and/or relation between features), as described elsewhere herein.

Optionally, in at least one aspect, a customer-profile database may be created and stored, locally on the coin processing machine 10 or remotely on, for example, a host computer 50. In this customer-profile database, a customer's profile might include the customer's mother's maiden name, date of birth, favorite sport's team, favorite color, name of first pet, and/or favorite activity, etc. to provide one or more data points which may later be compared to an inquiry. This type of database is similar that used by banks when a customer makes inquiries and provides some additional assurance when assistance is needed to reference a documents or to confirm an ID.

Following a successful input of the code, whatever the source (e.g., manual input through key entry of a four digit number, electronic input through a magnetic card swipe of a customer's store card, electronic input through a magnetic card swipe of a customer's credit card or bank card, biometric input through a personal hand-held biometric device or a biometric device provided in combination with the coin processing machine 10, etc.), the customer is permitted to begin the coin processing transaction. Alternatively, although not presently preferred, the customer may be permitted to start the processing of the coins and enter the code after the processing of the coins has been completed.

When the coin processing has been completed, the display 12, written instructions, and/or verbal instructions (e.g., from an employee locally or remotely situated), inform the customer that the transaction is not yet complete and instruct the customer to proceed to the service desk 210 or other designated redemption location to complete the transaction. For example, the display 12 displays a message that the transaction is not complete and must be completed at the service desk. In some aspects, the coin processing machine may be optionally configured to print a receipt at this stage.

Alternatively, the customer is instructed to enter the code following completion of the coin processing, rather than prior to the coin processing, at which point they are then directed to proceed to the redemption location to complete the transaction.

Following the instruction to the customer from the coin processing machine 10 or employee to proceed to the redemption location to complete the transaction, the customer then goes to the service desk 210 and either enters the same code previously entered at the coin processing machine 10 through a similar and/or identical data input device (e.g., a touch screen display, key pad, keyboard, biometric input device, scanner, receiver, etc.) or provides such code to a customer-service representative or other designated employee for entry, if applicable. The controller (e.g., 30, 130, etc., depending upon configuration) then automatically searches for an identical code within the system using conventional data systems search tools and techniques. When a code match is found by the controller (e.g., 30, 130, etc.), the transaction data associated with that particular code in the data base arrangement and/or electronic storage medium is retrieved, wherever resident, by the controller. The searching and retrieval may also be performed manually/semi-automatically by the customer-service representative or other designated employee (e.g., by scrolling through a hit list or by scrolling through recent transactions).

Once the appropriate transaction associated with that particular code has been identified, the customer-service representative or other designated employee identifies the amount due to the customer and issues a cash out ticket, second receipt, or the like, for the net amount due to the customer. The cash out ticket includes, for example, the date of the transaction, the gross amount, the commission earned, and the net paid to the customer, and the name or initials of the person handling the redemption. The customer is then paid the net amount due and the customer-service representative or other designated employee then puts the cash out ticket in the cash drawer to close out the transaction. At this time, the customer-service representative or other designated employee preferably inquires as to whether the customer would like a receipt for the transaction. If a customer desires a receipt, a receipt is printed and issued to the customer. Thus, the receipt is provided directly by the customer-service representative or other designated employee, not the coin processing machine 10, which avoids, for example, the need to install, service, and maintain a separate printer in the coin processing machine.

After the transaction has been completed, the employee may then delete the user's code and information, or such user's code and information could automatically be deleted from the system memory, wherever located, while optionally retaining the actual transaction information.

Each of the above-described aspects may optionally be performed on a kiosk 230, such as is represented by way of example in FIG. 14. In other words, the customer inputs his or her code into a data input device related to a coin processing machine 10, as described above, either before or after the processing of the coins. After completion of the coin processing and entry of the code, regardless of sequence, the customer may then proceed to a kiosk 230 where the customer will again input his or her code. Preferably, but not necessarily, the coin processing machine 10 is configured to instruct the customer to proceed to the kiosk 230 for completion of the transaction. If the kiosk 230 controller (e.g., 130) finds a corresponding match, then the kiosk can, for example, complete the redemption transaction by providing value to the customer in the net amount due. The providing of value by the kiosk 230 may include, but is not limited to, the dispensing of currency (e.g., bills and, optionally, coins), dispensing other item(s) (e.g., merchandise, food, negotiable instruments, coupons, etc.) having value, electronically transferring the net amount due to an account (e.g., personal account, account of another, charity, etc.) selected by the customer, electronically transferring the net amount due to a portable electronic device (e.g., cell phone). To the extent a plurality of redemption options are available from a given kiosk 230, it is preferred to display all such options to a customer. The customer may then be prompted, such as by voice prompts or display prompts, to respond to an inquiry regarding a desired method of redemption and, additionally, to respond to an inquiry regarding whether a receipt is desired following closeout of the transaction, such receipt being optional.

In still additional aspects, a fully automated coin redemption system may include, as noted above, a coin processing machine 10 biometric device 15*a* comprising a camera and/or video recording device (i.e., a facial recognition device, standard camera, thermographic camera, etc.), together with the necessary software to analyze an image acquired with the camera and extract the required characteristic feature(s) necessary for a successful matching against a subsequent image. At the redemption location, such as a kiosk 230 (e.g., an ATM) another biometric device 15a' comprising a camera is provided to capture another image of the customer for feature extraction and comparison against a collection of characteristic features associated with open transactions. This process may also be semiautomatic, with the computer system (e.g., 50) or controller (e.g., 130) passing authority of the final decision to a customer service representative or designated employee. In other words, once the computer system 50 or controller 130 find a match, they send both characteristic features and/or original images to a customer service representative or designated employee for visual comparison before disbursing funds, transferring funds, and/or dispensing other item(s) of value in the net amount due.

Still further, in a related aspect, a digital camera (e.g., a CCD) and/or a video camera takes a photograph, video still frame, or video of the customer at the beginning of the transaction, during the transaction, and/or at the end of the transaction. The photograph, video still frame, or video are advantageously time and date stamped. When the coin processing has been completed, the coin processing machine 10 instructs the patron, such as by a prompt on display 12, to proceed to the service desk or other redemption location. At the service desk or other location, an employee navigates through the photographs, video still frames, or videos, or thumbs or portions thereof and make a match to the customer in front of the employee. Once the match is made, the employee then determines the net amount due to the customer and close out the transaction by, for example, printing a cash out ticket and putting the cash out ticket in the cash drawer, and paying the customer. Optionally, the employee may also provide the customer with a receipt, if desired, upon close out of the transaction.

In accord with the above aspects, no receipt is issued until the transaction has been completed at the redemption location.

Self Service Coin Machine in Combination with Currency and Coin Redemption Machine As noted above, the currency processing machine 10 may, in accord with at least some aspects of the present concepts, include a currency dispensing module for dispensing currency in the amount of the deposited coins, or in the amount of the deposited coins less a fee. Thus, the self-service coin redemption machine 10 may be provided not only for input of coins, but for the automatic output of currency bills and/or change in an amount related to the totaled amount of coins.

In these aspects of the present concepts, a customer approaches the self-service coin redemption machine 10 and deposits a batch of coins into the self-service coin redemption machine. The complete amount is counted by the self-service coin redemption machine 10. For example, the totaled amount may be shown to be $100.53. Optionally, after all the coin and currency is counted and deposited in an escrow, the customer is asked to verify or accept the total count and press a button to indicate such acceptance to cause the deposited coin in escrow to be moved to a coin storage compartment, bin, or coin receptacle. The self-service coin redemption machine 10 is configured to then automatically instruct the currency dispenser to dispense $100 in cash from the cash dispenser and to dispense $0.53 cents in coin from the coin dispenser. The transaction is thus automatically completed. A printed receipt may optionally be provided upon request or automatically.

This configuration provides enhanced security for the customer, quick turn around of payment, and no time or intervention required by the store employees.

In a related aspect, a self-service coin redemption machine 10 is provided in a first location and a separate currency and coin redemption machine is provided elsewhere at a redemption location (i.e., within a store at a self service desk, kiosk, POS, outside of a store, remote from store, etc.). As described elsewhere herein, each of the self-service coin redemption machine 10 and separate currency and coin redemption machine are provided with a code input device (e.g., keypad, touch screen display, keyboard, biometric input device, reader, scanner, receiver, etc.). The customer enters the code into the code input device at the self-service coin redemption machine 10, before or after the coin processing, and later enters the same code into the code input device at the currency and coin redemption machine disposed at the redemption location. The software of the currency and coin redemption machine uses the input code to find a matching code associated with a coin processing transaction and, upon finding such match, outputs bills and coins in an amount indicated as being due to the customer (e.g., the full amount of the processed coins minus an optional or nominal commission). Again, in this aspect, the process is fully automated and no involvement by an employee is required. Security is enhanced by the lack of any non-cash output.

Acknowledgement of Use Ticket

As above, in accord with these aspects of the present concepts, a coin processing machine 10 is configured to communicate via an in-store computer system communication link 202, 204 to an interface or receiving device 200 at any one of a plurality of destination locations, such as is shown in FIG. 14. As noted above, in various aspects, the destination locations include, but are not limited to, a service desk 210, a POS station 220a-n, a kiosk 230, and/or a portable electronic device 250. The interface 200 comprises, but is not limited to, a display, a touch screen display, a computer, a controller, a printer, a communication device, a memory storage device, a portable electronic device and/or a speaker, such as may be provided in or with a service desk 210, a POS 220, kiosk 230, and/or a portable electronic device 250.

The interface 200 at the service desk 210 or other location or redemption location is, in at least some aspects, a non-networked, stand-alone interface (e.g., directly connected to the coin processing machine 10). In at least some other aspects, the coin processing machine and/or interface 200 may be connected to an in-store computer (e.g., 50), an in-store network (e.g., 52), an external computer and/or an external network (e.g., 104). The communication link between the coin processing machine 10 and the interface 200 at the service desk 210, POS 220, kiosk 230 and/or portable electronic device 250 comprise, in various aspects, a wireless connection 204 (e.g., an IR communication link, a light-based communication link, a radio frequency communication link, a broadband communication link, etc.) or a hardwired connection 202 (e.g., a serial port connection, parallel port connection, 10bT port connection, ethernet port connection, etc.).

Continuing from the concepts disclosed above, in the aspects of the present concepts described below, one document is printed from the coin processing machine 10. After all of the coins have been counted, or alternatively after each separate batch of coins have been counted, the coin processing machine 10 display instructs the customer to go to the service desk 210 or other redemption location (e.g., POS 220) to complete the transaction. The coin processing machine 10 also substantially contemporaneously print a piece of paper containing the same instruction or message along with a time and date stamp. The time and date stamp optionally comprises a security ink (e.g., a thermochromic ink, pressure sensitive ink, fluorescent ink, etc.) to suppress counterfeiting. For example, the document may have printed thereon "Congratulations for using the self serve coin kiosk! Please proceed to the service desk to complete your transaction" and, elsewhere, the date and time that the coin processing started and/or ended. For example, "Start: 9:45 am, Apr. 15, 2006; End: 9:46 am, Apr. 15, 2006." This document contains, in a presently preferred aspect, no transaction identifier or total amount. As such, this document is useful in an audit function in the rare instance where a customer could not remember the code that they entered into the coin processing machine 10 by the time they went to enter the code in at the service desk 210 or other redemption location. The noted document provides a sufficient measure of traceability and verification, even though the total amount is not known.

The coin processing machine 10 is configured with an auditing feature wherein the coin processing machine makes a record of each transaction. At the end of the day or the shift, the customer service representative or other designated employee (e.g., supervisor) will typically run an audit of the of the day listing all transactions. The transactions that have been closed and paid out will be known. In other words, substantially all users can be expected to successfully enter the code of their choosing. This would, in most instances, leave only one open transaction in the system, which open transaction would also have associated with it a time and date information fields. No matter how many open transactions remain at the end of the day, the document bearing the time and date stamp can successfully identify which of the open transactions is associated with the bearer of the document.

Thus, if a customer is unable to remember their code, for whatever reason, the customer is informed by the customer service representative or other designated employee that the store will perform an audit of all remaining open and unpaid transactions at the end of the day. The customer is then requested to leave their time and date stamped ticket with the store, with their name, address, phone number, email address, and/or any other contact information so that they may be contacted. Clearly, where there is still a transaction open at the exact time and date indicated by the time and date stamp, the store can probably determine within 24 to 48 hours by a process of elimination and lack of claim from any other customer that this is the transaction properly due and payable to the patron who had forgotten their code.

The above-noted document gives the store a way to reconcile transactions wherein a customer is unable, for whatever reason, to recall or reproduce their code. This contingency involves intervention of an employee (e.g., an employee of a store, business, or financial institution, etc.), at the end of the day, performing the daily accounting or balancing function.

In a related aspect, the coin processing machine 10 may be provided with a supervisor mode in which a supervisor may access, in a viewing mode only, the auditing feature containing a record of each transaction through a local terminal, remote terminal, or directly through the coin processing machine display 12. The supervisor then, particularly for a known and trusted customer, accesses the transaction records, identifies the particular time and date stamp, and then authorizes disbursement of the indicated total amount due. If the customer is not a known and trusted customer to the supervisor, then the supervisor could require the documenting of additional information about the customer, such as a driver's license number, name, and address, two forms of identification, etc. Such identification provides some measure of security against counterfeiters who might attempt to, having observed a large transaction and estimated the start time and end time, alter an existing time and date stamp on a previous document or to forge a new fake document to bear the estimated the start time and end time. Moreover, conventional security papers and/or security inks may be used for such document to provide additional protection against forgery and/or counterfeiting. This avoids the need for a customer to wait up to several days to receive their money or other compensation, but does bypass the checks and balances advantageously provided by the end of the day audit.

Receipt Bearing Transaction Information

In still another aspect of at least some of the present concepts, a coin processing machine 10 is configured to communicate via an in-store computer system communication link 202, 204 to an interface or receiving device 200 at any one of a plurality of destination locations, such as is shown in FIG. 14. As noted above, in various aspects, the destination locations include, but are not limited to, a service desk 210, a POS station 220a-n, a kiosk 230, and/or a portable electronic device 250. The interface 200 comprises, but is not limited to, a display, a touch screen display, a computer, a controller, a printer, a communication device, a memory storage device, a portable electronic device and/or a speaker, such as may be provided in or with a service desk 210, a POS 220, kiosk 230, and/or a portable electronic device 250.

As also noted above, the interface 200 at the service desk 210 may be a non-networked, stand-alone interface. For example, the interface 200 comprises a display or printer disposed at a service desk, wherein the display or printer is connected to the coin processing machine 10 through an RS232 port, or the like, and serves as a remote display or remote printer of the coin processing machine. The coin processing machine 10 and/or interface 200 may be connected to an in-store computer, an in-store network, an external computer and/or an external network. Alternatively, in lieu of the service desk 210, the interface 200 is associated with other locations such as, but not limited to, a dedicated cashier station or POS (e.g., 220a), a specified one of a plurality of dedicated cashier stations or POSs 220a-n, or a kiosk 230 located in the store or elsewhere. As noted above, the term kiosk 230, as used herein, refers to any electronic self-service interactive terminal.

The communication link between the coin processing machine 10 and the interface 200 at the service desk 210, POS 220, kiosk 230 and/or portable electronic device 250 is a wireless connection 204 (e.g., an IR communication link, a light-based communication link, a radio frequency communication link, a broadband communication link, etc.) or a hardwired connection 202 (e.g., a serial port connection, parallel port connection, 10bT port connection, ethernet port connection, etc.).

The above configurations permit an option of various redemption locations, either to the store in which the coin processing machine 10 is disposed and/or to the user individually. As to the store, such coin processing and redemption system permits the store flexibility to assign or move the redemption function to any one of a plurality of designated staffed locations 210, 220 within the store where store personnel are available to assist a customer who has deposited coins or other items of value (e.g., ticket, tokens, negotiable instrument, etc.) for redemption. The coin processing machine 10 is, accordingly, configured in such embodiments to direct a customer to a specific one of the plurality of designated locations 210, 220a-n. This configuration could be time-based or schedule-based, or could be fluidly assigned by the store supervisor. For example, in one aspect, the store supervisor inputs a command to the coin processing machine 10, directly or remotely, to direct the customer processing coins or other items of value and/or subsequent customers to a designated staffed location 210, 220 within the store where store personnel are available to assist the customer(s) or to any one of a plurality of designated staffed locations 210, 220 within the store where store personnel are available to assist the customer(s). This enables the store supervisor to adapt the redemption instructions provided by the coin processing machine 10 to the customer processing coins or other items of value to the staffing configuration and/or work-load of the store.

In accord with at least these aspects, the coin processing machine 10 dispenses a conventional receipt to the customer. The receipt may bear one or more of a code (e.g., a transaction number, a random or pseudo-random PIN code, Customer ID code, etc.), time of transaction, date of transaction, location of transaction, machine identification, a total amount of the processed coins and/or a total amount due to the customer following application of any commissions or fees, or the like. As used herein, the term code may include any combination of letters, numbers, symbols, words, characters, icons, colors, or the like, or any length. The receipt may also bear other indicia or information such as, but not limited to, "Record of Transaction," "Receipt of Exchange Amount," or "Customer Receipt." Some of the information borne by the receipt is optionally encrypted, converted to a desired machine-readable medium (e.g., bar-coded), and/or printed with a security ink, such as a temperature-sensitive, pressure-sensitive, and/or fluorescent inks.

The coin processing machine 10 is advantageously configured to communicate some or all of the above-noted transaction information, or other transaction related information, via a hardwired 202 or wireless 204 connection to a connected controller (e.g., controller 30, host system 50, etc.) and/or to a connected device (e.g., interface 200, printer 205, etc.).

In at least some aspects of the present concepts, the customer brings the receipt to the service desk 210 or other designated staffed redemption location where the customer conveys to the customer-service representative or other designated store employee certain information from the receipt (e.g., transaction number, PIN code, Customer ID, amount, etc., singly or in combination with other information). The customer-service representative or other designated store employee then enters this information into the interface 200 (e.g., a touch screen display or terminal) or, alternatively, the customer enters specified information into a key pad at the redemption location.

In at least some aspects, the customer retains the receipt and does not turn-in or hand-over the receipt to the customer-service representative or other designated store employee. In at least some other aspects, the customer retains the receipt, but temporarily relinquishes control of the receipt and permit the customer-service representative or other designated store employee to look at the receipt to more clearly read the code or customer ID, or the like, and return the receipt to the customer. For example, a customer-service representative at a service desk 210 could read the customer ID number off of the receipt, key the customer ID number into the service-desk interface 200, access the transaction associated with that customer ID, verify the transaction information on the computer system, pay the amount due the customer, close out the transaction, and return the receipt to the customer together with the appropriate amount due. In these aspects, the receipt remains the property of the customer and the receipt is not exchanged for the redemption proceeds.

The customer-service representative or other designated store employee cancels out the redemption transaction in a conventional manner. For example, the electronic record of the transaction may be completely deleted, altered to indicate that the redemption transaction has been completed, or associated with a database of completed transactions. These cancellation measures may also be accompanied by a physical cancellation, which may include actions such as punching or perforating of the receipt to visibly denote the transaction as having been consummated and/or to destroy in whole or in part the specified information (e.g., akin to a train conductor punching a ticket), and/or apply an ink, a security ink, a stamp, signature, initial, or other permanent mark on the receipt (e.g., over the customer number).

Figure 15:
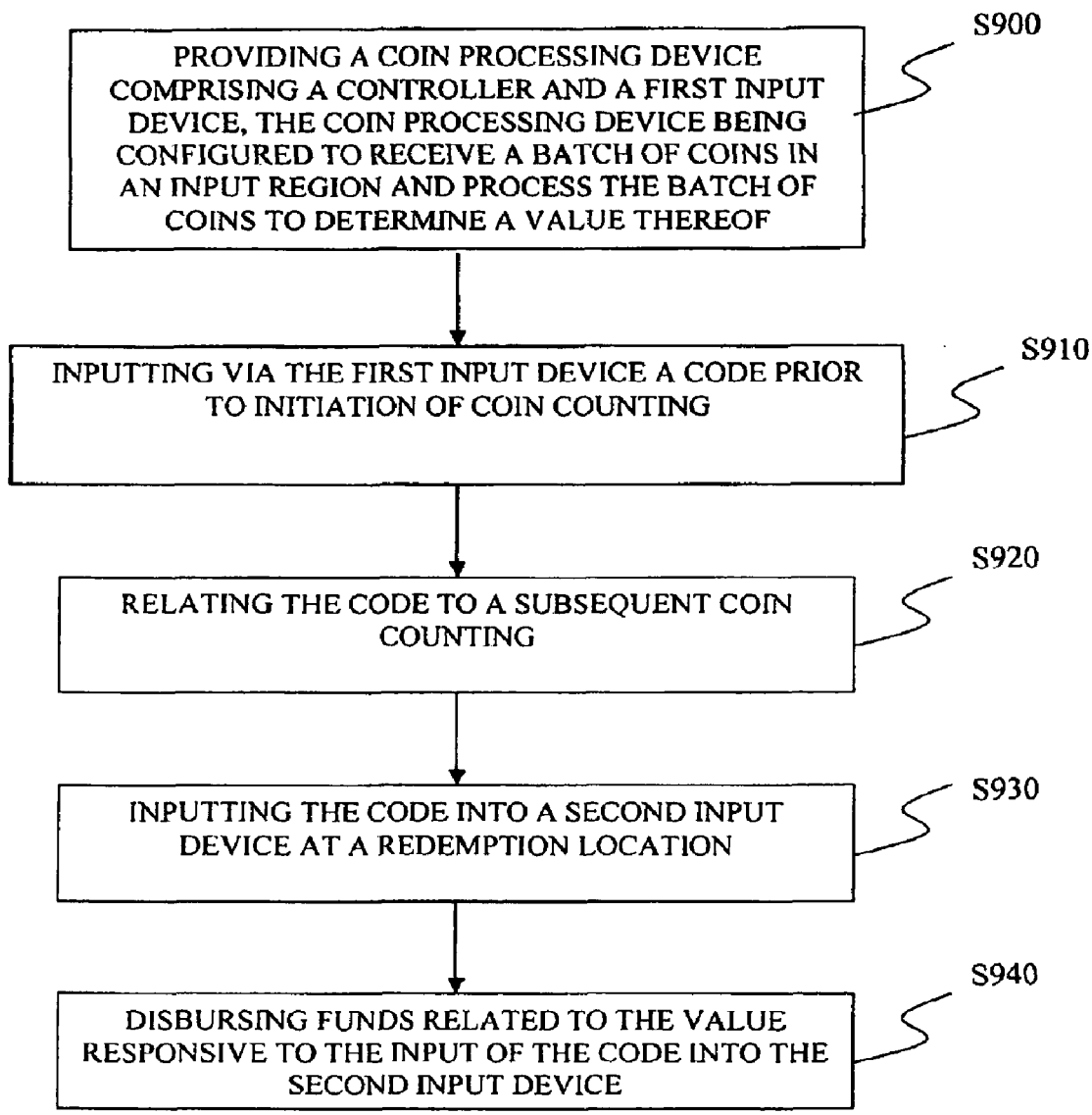
FIG. 15 shows aspects of one method in accord with at least some aspects of the present concepts.

In at least some aspects, such as is represented in the example of FIG. 15, a method for processing coins may include an act (S900) of providing a coin processing machine 10 comprising a controller (e.g., 30) and a first input device (e.g., touch screen display 12, coin processing machine buttons, portable electronic device, etc.), wherein the coin processing machine is configured to receive a batch of coins in an input region 14 and process the batch of coins to determine a value thereof. This method may further includes the acts of (S910) inputting via the first input device 12 a code prior to initiation of coin counting and (S920) relating the code to a subsequent coin counting. This method may still further include the acts of (S930) inputting the code into a second input device (e.g., interface 200) at a redemption location (e.g., service desk, POS, teller, kiosk, etc.) and (S940) disbursing funds related to the value responsive to the input of the code into the second input device.

In an embodiment wherein the interface 200 is a remote display of the coin processing machine 10, the coin processing machine 10 may simultaneously display on such interface 200 information presented on display 12. Thus, as the customer is processing coins at the coin processing machine 10, the customer-service representative or other designated store employee and the customer are shown at least the same information (i.e., the store representative or employee may be shown information, such as but not limited to a video feed or image of the customer, not shown to the customer). Additionally or alternatively, after the customer has completed the processing of coins at the coin processing machine 10, the customer may be shown some or all of the same information and/or different information than that shown to the customer-service representative or other designated store employee. For example, the customer-service representative or other designated store employee may be shown additional information not shown to the customer such as, but not limited to, a video feed or image of the customer, an image of customer, an image or likeness of the actual printed receipt or data corresponding to the transaction, not shown to the customer.

In accord with at least some of the above aspects, the customer-service representative or other designated store employee then verifies the specified information on the system (i.e., the interface 200 and/or on the coin processor machine 10 controller). For example, the customer-service representative or other designated store employee compares on the interface 200 or printer 205 a transaction number and/or other information input by the customer, or input by the customer-service representative or other designated store employee, to information relating to valid transactions (e.g., a list of valid transaction numbers, customer IDs, and/or other information, such as an image of a customer taken in correspondence to an issued transaction number or customer ID). Once the customer-service representative or other designated store employee has verified the specified information on the system, such representative or employee pays the amount indicated by the system to the customer, such as by issuance of cash, a voucher, a negotiable instrument, credit, a stored value card, a smart card, script, tokens, a coupon, or the like, or by an electronic transfer of the value to an account (e.g., a customer's account, an account of another person or entity designated by a customer, etc.), or to a customer's portable electronic device 250. The customer-service representative or other designated store employee subsequently cancels or otherwise nullifies the specified information.

In accord with at least some of the above aspects, the electronic transmission of the transaction data from the coin processing machine 10 to an in-store destination location need not be encrypted, particularly when the coin processing machine is wired to the service desk 210, POS station(s) 220a-n, kiosk 230, and/or portable electronic device 250. Where desired, any conventional encryption technique can be applied to this or any of the other disclosed aspects.

In any of the various disclosed aspects of the present concepts, the transaction related data optionally comprises a first plain-text (unencrypted data) with a subsequent unencrypted or encrypted transmission occurring at a predetermined interval or at an interval corresponding in some way to the transaction related data. For example, for transactions in a range between 0-x, where x is a predefined value, a first unencrypted transmission at T0 is followed at time T1 by an unencrypted transmission of the same and/or different data, whereas for transactions in a range between x-y, where y is a predefined value greater than x, a first unencrypted transmission at T0 is followed at time T2 by an unencrypted transmission of the same and/or different data. Thus, the time delay itself provides a supplemental data source attesting to the validity of the transmission and transaction utilizing only plain-text data. Thus, in one aspect, the coin processing machine transmits the same plain-text information at two different times T0, T1 (e.g., 0 seconds, 1.0 second) or T0, T2 (e.g., 0 seconds, 3 seconds), depending on the value of the coins processed. In other aspects, the transaction related data may be advantageously tagged with an optional electronic security tag, data log, digital signatures, or encrypted code associated therewith.

In a related aspect, a printer 205 is provided at the designated staffed location (e.g., 210, 220) and a receipt similar to that printed by the coin processing machine 10 and provided to the customer is also printed at the designated staffed location. In this aspect, the customer may provide his or her copy of the receipt for comparison by the customer-service representative or other designated store employee to the store version of the receipt. After the customer-service representative or other designated store employee verifies the customer's receipt against the store copy of the receipt, the customer's receipt is returned to the customer, if it was relinquished, and the amount indicated by the receipt is paid. Preferably, the customer copy has printed thereon "Customer Copy" and the store copy have printed thereon "Merchant Copy," similar to current credit card sales receipts. Further, the customer copy and the store copy are advantageously printed on different color or stock of paper. Following redemption, the customer-service representative or other designated store employee destroys and/or marks the store receipt to prevent any subsequent disbursement relating thereto.

In at least one aspect of the above concepts, the transaction may only be permitted to be consummated at the service desk 210 to ensure that merchandise transactions cannot be commingled with the redemption transaction.

Different Transaction Information Provided on Customer Receipt than Provided to Service Desk Customer Service Representative In some aspects of at least some of the present concepts, it may be preferable to display or output (e.g., display, printout, speaker, etc.) some information to a customer is processing coins at the coin processing machine 10, and to transmit different information or different form(s) of the information to the customer-service representative at the service desk 210 or to another designated store employee at a respective one of the POSs 220a-n, via interface 200 and/or printer 205, such as noted above. In one aspect, the service desk 210 interface 200 or printed receipt may show different information or more information than that provided on the customer's receipt (e.g., for security reasons, etc.) For example, the customer receipt might show only the transaction number, only the total amount, or only a bar code, or the like, or only an encrypted data field, or only a time/date stamp.

The customer-service representative or other designated store employee could then, for example, query the customer to inquire as to the date/time of the transaction, approximate value of the processed coins, location of the machine, or other information, to compare with the more complete information provided on the customer-service representative or other designated store employee 210, 220a-n interface 200. This approach enhances security by increasing the variability of inquiry by the customer-service representative or other designated store employee and correspondingly increasing the risk of inappropriate responses by a counterfeiter. In other words, even if a counterfeiter could alter the data field of a total amount or transaction number, answering one or more specific questions about the transaction would significantly increase the possibility of exposure. Additional aspects of this concept permit the combination of any of these factors (e.g., a transaction number combined with a time/date stamp).

Figure 17:
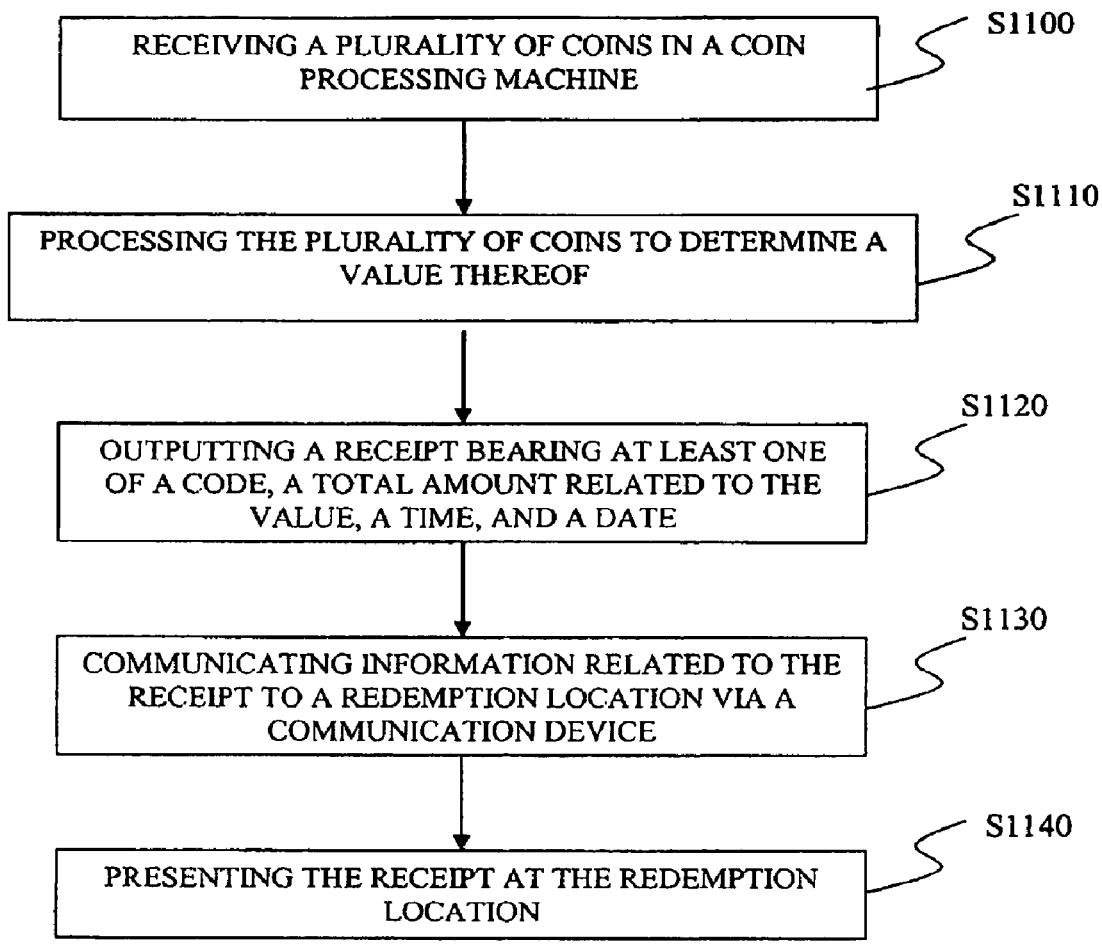
FIG. 17 shows aspects of one method in accord with at least some aspects of the present concepts.

In one aspect, such as is represented by FIG. 17, a method for redeeming coins is provided which includes the acts of (S1100) receiving a plurality of coins in a coin processing machine (e.g., 10), (S1110) processing the plurality of coins to determine a value thereof, and (S1120) outputting a receipt bearing at least one of a code, a total amount related to the value, a time, and a date. This method also includes the acts of (S1130) communicating information related to the receipt to a redemption location and (S1140) presenting the receipt at the redemption location.

In at least one aspect of the above concepts, the transaction may only be permitted to be consummated at the service desk 210 to ensure that merchandise transactions cannot be commingled with the redemption transaction.

Redemption Ticket Plus Optional Receipt

In still other aspects of at least some of the present concepts, the currency processing machine 10 may be advantageously configured to print and dispense two separate tickets to the customer.

The first ticket (e.g., a "redemption ticket" or "exchange ticket") comprises a code, such as noted above. The code may comprise, but is not limited to, a customer ID, a transaction number, a transaction character string, an authorization code, a PIN number, a customer-selected code, or the like. The second, separate ticket (e.g., a "receipt") comprises a record of the transaction including any desired information such as, but not limited to, a total amount, a debited amount, denomination breakdowns, time, date, a message such as "Transaction Record—Not Negotiable" or the like, etcetera. Following dispensing of the first ticket, and completion of the coin processing, the coin processing machine 10 may be configured to dispense the second ticket automatically or upon an input or request by a customer. A separate printout of and/or electronic version relating to either or both of these tickets may also be transmitted to a designated, customer-selected, or machine-selected redemption location. As previously noted, the redemption location may comprise a kiosk 230.

It is further noted that the term ticket is used generally herein to refer to any medium or substrate which may bear information imparted thereto by conventional printing means (e.g., impact, laser, thermal transfer, thermochemical, pressure-sensitive chemicals, ink jet, etc.) or electronic means (e.g. an electronic ticket, such as an RFID bearing substrate, RF transmitting device, portable electronic storage device, etc.) and is not intended to be limited merely a paper-based medium. Thus, as used herein, the term ticket could include, but is not limited to, plastic substrates such as plastic cards or sheets.

The second ticket is retained by the customer solely for their personal records. Following completion of the coin processing, the customer then goes to the redemption location to exchange the first ticket for the net amount due to the customer. The first ticket, for example, is handed to the customer-service representative or other designated store employee. Such customer-service representative or other designated store employee then keys-in or otherwise inputs the code into the computer or controller. Once the transaction associated with the code (e.g., customer ID, etc.) has been accessed, the customer-service representative or other designated store employee may then verify the information, such as by a visual verification of the first ticket against the corresponding information (e.g., code) and related net amount due displayed on the interface 200 and then pay the customer the net amount due. The customer-service representative or other designated store employee retains, destroys, alters and/or discards the first ticket upon completion of the transaction. As part of the transaction closure, the customer-service representative or other designated store employee prints a second receipt (e.g., from printer 205) for reconciliation purposes.

In one aspect, the first ticket is alternatively used by the customer, who personally keys in, scans, or otherwise enters the code at the redemption location to obtain the funds associated with the information on the first ticket. For example, where the first ticket is a magnetic strip bearing plastic card or paper-stock card, the customer inputs the first ticket into a kiosk 230, which is configured to scan the code and access, through an appropriate controller (e.g., 130, 30) and communication link (e.g., 202, 204), the transaction information relating to that code. The kiosk 230 then retains the first ticket and output to the customer the net amount due to the customer, such as by output of cash, negotiable instruments, tickets, products, merchandise, coupons, electronic transfer of funds to a local portable electronic device, electronic transfer of funds to a remote account, etc.

Figure 16:
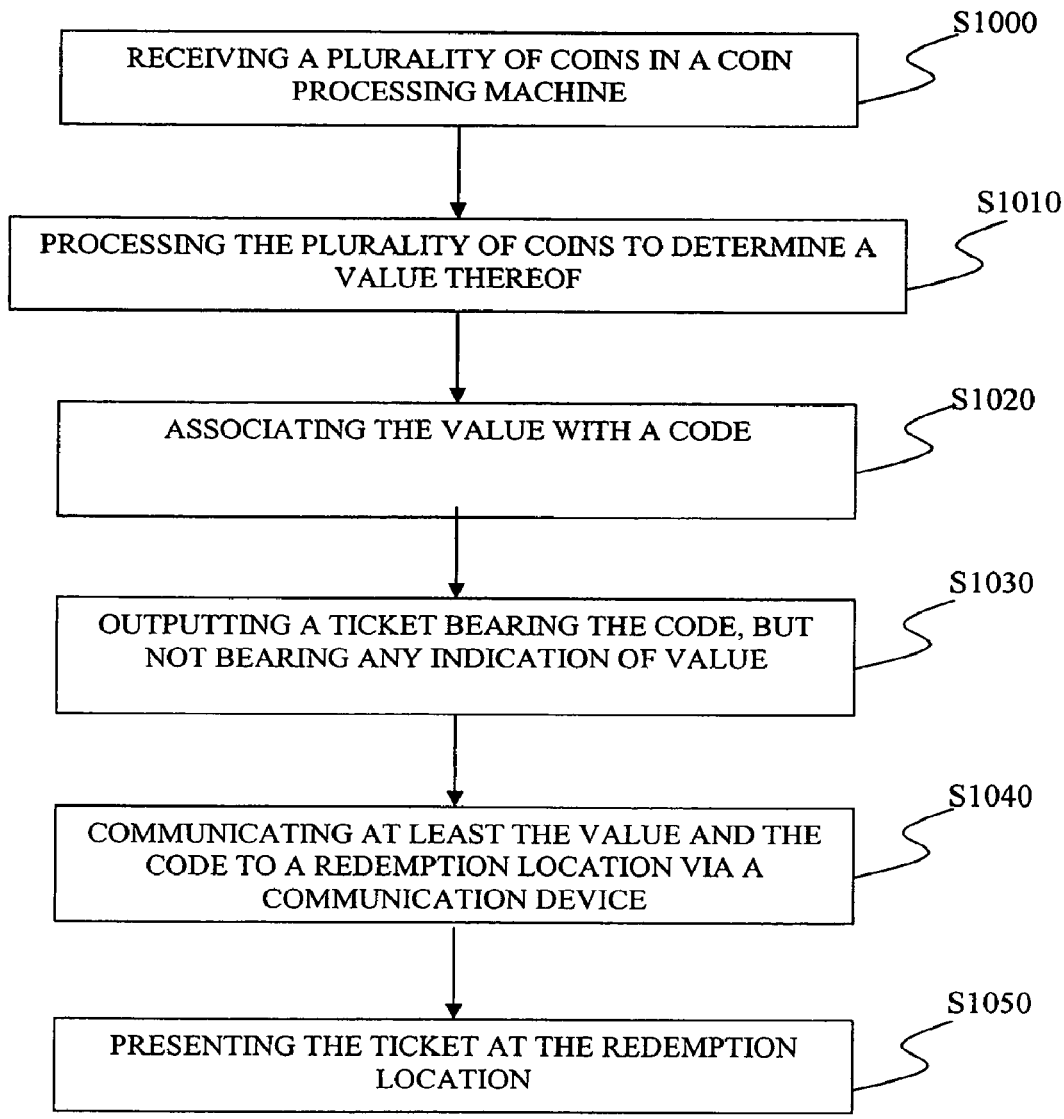
FIG. 16 shows aspects of one method in accord with at least some aspects of the present concepts.

In one example of at least one aspect of this concept, represented by way of example in FIG. 16, a method for redeeming coins is providing and includes the acts of (S1000) receiving a plurality of coins in a coin processing machine (e.g., 10), (S1010) processing the plurality of coins to determine a value thereof, (S1020) associating the value with a code, and (S1030) outputting a ticket (e.g., the first paper or ticket) bearing the code, but not bearing any indication of value. This method also includes the acts of (S1040) communicating at least the value and the code to a redemption location via a communication device and (S1050) presenting the ticket (or the ticket code) at the redemption location. The second ticket (e.g., a receipt) may optionally be printed for the customer, if desired.

For store recording purposes, to close out the transaction, a receipt for the redemption transaction could advantageously be printed on the store's local POS or store-network printer to be placed in the appropriate cash drawer for reconciliation purposes.

In one aspect, the coin processing machine 10 may automatically print only the first ticket, optionally together with instructions to the customer on redemption thereof, and then may inquire as to whether a receipt (i.e., the second ticket) is desired. If a receipt is separately requested by the customer, then second ticket is printed for the customer.

In a variation of the above noted two-ticket concept, wherein the coin processing machine 10 is advantageously configured to print and dispense two separate pieces of paper or tickets to the customer or user, a first ticket (i.e., the "exchange ticket" or first ticket noted above) is printed and/or dispensed by the coin processing machine 10 to the customer in advance of sorting. A second ticket (i.e., the "receipt" or second ticket noted above) is then optionally printed or dispensed after the processing of the coins is completed. In accord with this aspect of the present concepts, the exchange ticket printed and/or dispensed by the coin processing machine 10 in advance of sorting is the user's link to the transaction and is used at the service desk for redemption of the funds processed by and deposited in the coin processing machine 10. The second ticket or receipt acts as a record of the transaction, is retained by the user, and plays no role in redemption. In at least some aspects, an exchange ticket may be obtained by the user from the service desk or redemption location prior to performing the coin processing transaction. The exchange ticket may comprise a transaction ID number, PIN, or other code or indicia which is either pre-printed, or printed on-the-fly, possibly with the ID number, code, or indicia representing the time and date of generation. Thus, the exchange ticket could be obtained at the service desk, a teller line (e.g., in a bank, credit union, or other financial institution), self-checkout line, or rack or dispenser external from and/or separate from the coin processing machine 10.

In an aspect wherein the exchange ticket is printed, generated, or disposed at or near the coin processing machine 10, the user prompts the coin processing machine to initiate a coin processing, such as by pressing a button. The pressing of the button, or similar input, then causes the coin processing machine 10 or other device to automatically dispense to the user an exchange ticket, such as noted above, prior to processing of any coins. This exchange ticket contains a transaction ID number or other code or indicia which is either pre-printed, or printed on-the-fly, possibly with the ID number, code, or indicia representing the time and date of generation. The user may then be required to enter the transaction ID, number, code, or indicia on the coin processing machine 10 key pad, touch screen, touch pad, or other input device (e.g., scanner). If the exchange ticket is generated on-the-fly, the transaction ID, number, code, or indicia is already present in the system and does not need to be separately entered by the user.

The exchange ticket, however generated or wherever obtained, is then associated with the transaction about to transpire and the user is allowed to process his or her coins. Subsequent to the coin processing transaction, the user may optionally be issued a receipt indicating information such as a total amount, the characteristics of the processed batch of coins, or the like. The user then takes the exchange ticket to the service desk, enters the transaction ID, number, code, or indicia into a corresponding data input device, or simply conveys the information to the customer-service representative or other designated store employee (e.g., verbally or by giving the exchange ticket to such representative or employee). Once the exchange ticket has been verified, the customer-service representative or other designated store employee then pays the funds associated with the exchange ticket to the user. The act of verifying the exchange ticket may optionally comprise the generation of a separate store receipt, which may then be placed into the service desk 210 or POS 220*a-n* cash drawer.

In still another example, the user is prompted to initiate a coin processing function at the coin processing machine 10, such as by inputting coins to be processed into an instrumented or sensor-bearing hopper. The processing may be immediately or subsequently started and an exchange ticket, such as noted above, is automatically generated and dispensed to the user prior to or at the commencement of coin processing. This exchange ticket contains a transaction ID number or other code or indicia which is either pre-printed, or printed on-the-fly, possibly with the ID number, code, or indicia representing the time and date of generation. The exchange ticket is associated to the transaction in progress or about to take place by a controller (e.g., 30, 130). Optionally, the user may be allowed to process his or her coins only after such association has been made. Subsequent to the coin processing transaction, the user may optionally be issued a receipt indicating information such as a total amount, the characteristics of the processed batch of coins, or the like.

To redeem the processed coins, the user then takes the exchange ticket to the service desk, enters the transaction ID, number, code, or indicia into a corresponding data input device, or simply conveys the information to the customer-service representative or other designated store employee (e.g., verbally or by giving the exchange ticket to such representative or employee). Once the exchange ticket has been verified, the customer-service representative or other designated store employee then pays the funds associated with the exchange ticket to the user. The act of verifying the exchange ticket may optionally comprise the generation of a separate store receipt, which may then be placed into the service desk 210 or POS 220*a-n* cash drawer.

Service Desk and/or Redemption Location Issuance of PIN

In accord with still additional aspects of at least some of the present concepts, a customer may be required to obtain an ID number or the like from a service desk employee or other designated employee. The customer must then enter this ID number into the coin processing machine 10, or an associated device adapted to provide a customer's input to the coin processing machine, before beginning the coin processing transaction. After the coin processing transaction is completed, the customer the returns to the service desk or other designated redemption location and again provides the ID number.

The service desk employee or other designated employee then accesses information relating to the coin processing transaction using at least one of an interface 200, printer 205, or other output device configured to output information received from the coin processing machine 10. The service desk employee or other designated employee is then able to review the information relating to the coin processing transaction before issuing a ticket, voucher, script, money, negotiable instrument, or other form of physical or electronic compensation to the customer.

Following review of the transaction, the service desk employee or other designated employee may then close out the transaction and redeem the funds owing to the customer (e.g., by issuance of cash, an electronic disbursement, etc.). Since the employee is able to review the transaction before closing it out, the store employee is provided an opportunity to intervene into a transaction where there is any kind of a problem including, for example, a customer alleged miscount of the coins by the machine, suspicion by the employee that the individual presenting the PIN, transaction number, code, ID, etc. has put slugs through the machine (e.g., due to the large quantity of the deposit), or the fact that some valuable coins were accidentally deposited and the individual customer would like to have those retrieved.

If an issue is identified by either the customer and/or the service desk employee or other designated employee may then intercede in the transaction, go over to the coin processing machine 10, enter the control and/or data system of the coin processing machine via a supervisory mode (e.g., by entering special codes and/or keys), and recover and/or audit the transaction associated with the particular ID number.

In accord with these aspects, the customer is not provided with a ticket, voucher, or other negotiable instrument, which may be subject to counterfeiting or forgery. Instead, such aspects address security, auditing, and accounting problems that may be associated with the unilateral ability of the customer to self-issue an exchange ticket or the like and close the transaction. Consistent with the above aspects, only a store employee or special software at a kiosk 230 (e.g., an ATM) is able to make the final decision on the acceptability of the coin processing transaction and issue cash, a voucher, a negotiable instrument, a credit, a electronic payment, or the like to the customer in conjunction with a closing out of the transaction by such employee.

Figure 19:
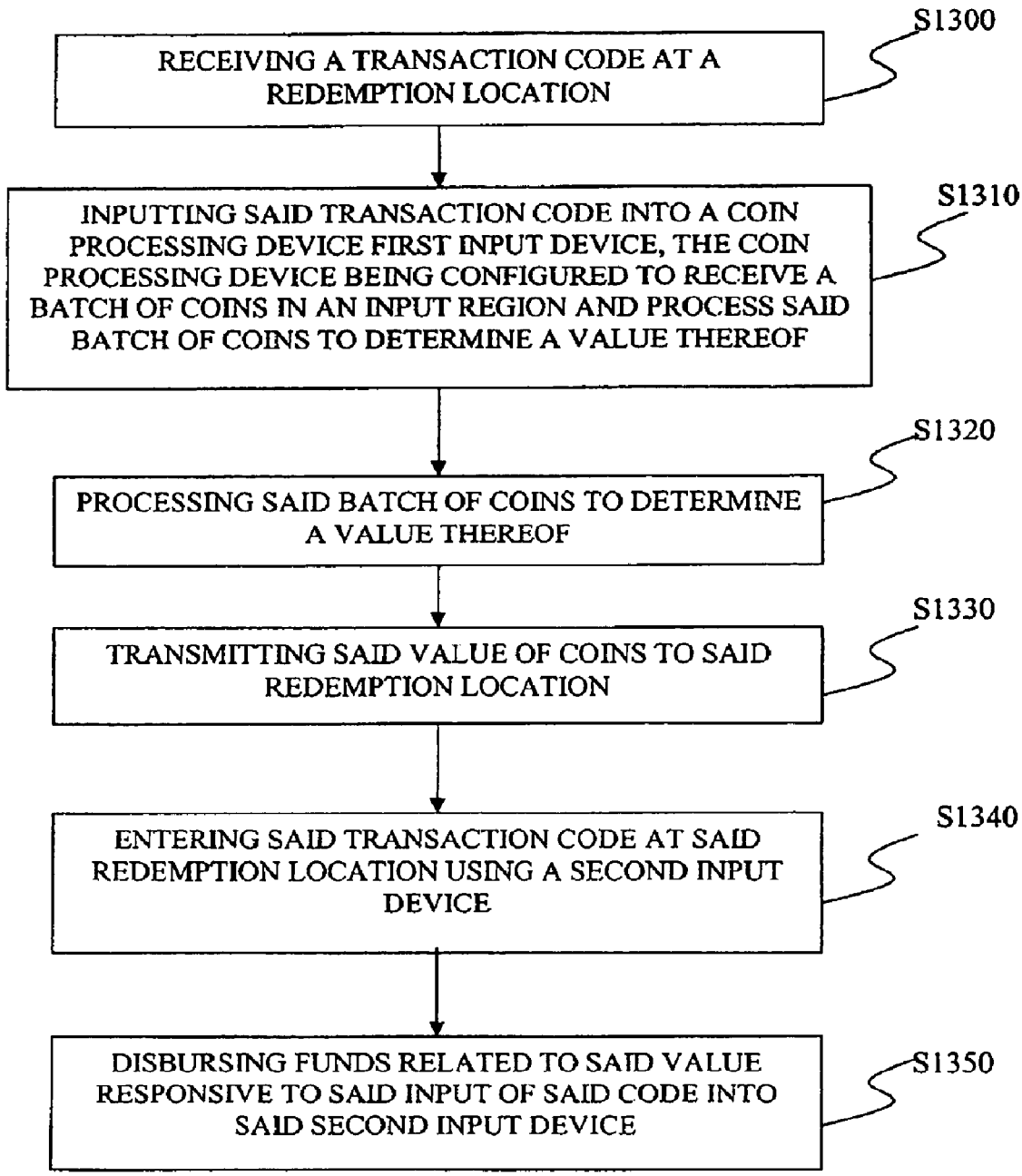
FIG. 19 shows aspects of one method in accord with at least some aspects of the present concepts.

In accord with at least one aspect, a method for processing coins in accord with at least some of the above concepts comprises, as shown in FIG. 19, the acts of (S1300) receiving a transaction code at a redemption location (e.g., a service desk 210) and (S1310) inputting the transaction code into a coin processing machine 10 first input device, the coin processing machine being configured to receive a batch of coins in an input region and process the batch of coins to determine a value thereof. This method also includes the acts of (S1320) processing the batch of coins to determine a value thereof, (S1330) transmitting the value of coins to the redemption location via a communication link (e.g., 202, 204), and (S1340) entering the transaction code at the redemption location using a second input device. This method further includes the act of (S1350) disbursing funds related to the value responsive to the input of the code into the second input device.

Ticketless Electronic Redemption

In still other aspects of the present concepts, as shown in FIG. 14, a total amount related to the value of the processed coins, such as is discussed above but omitted herein for brevity, may also be transferred directly to a portable or handheld electronic device 250 from the coin processing machine 10 via a wired or wireless communication path or link 202, 204. The portable electronic device 250 communicates with the coin processing machine 10 via a wired 202 or wireless 204 communication link. The portable electronic device 250 can also communicate with a kiosk 230 or other interface, terminal, or device (e.g., 200) via a wired or wireless communication link 202, 204. The portable electronic device 250 includes a display and a communication interface for enabling communications via the communication links 202, 204. The communication links 202, 204 may utilize any convention wired or wireless protocol including, but not limited to, Ethernet, 802.11, Bluetooth™, USB, cellular (CDMA, GSM, and the like), and so forth. The associated communication interfaces may include wireless transceivers, USB controllers, Ethernet controllers, RFID transceivers, radio microchips, and/or transponders, and the like, for example.

The portable electronic device 250 may, in different embodiments, be a digital wallet, a mobile phone, a PDA, a smart card, a token, a fob, and the like. In one example, the portable electronic device 250 may comprise, for example, a Nokia 3220 telephone comprising a payment chip or a cellular telephone under development by Nokia and Cingular embedded with a "near field communication" ("NFC") chip. The portable electronic device 250 may be linked to an online payment account such as, but not limited to, a PayPal® account, available from eBay, Inc., Obopay of Palo Alto, Calif., or ViVOtech of Santa Clara, Calif.

For example, the player's mobile telephone number can be linked to a PayPal® account and funds can be transferred by sending a text message to the PayPal service. As noted above, such mobile telephone 250 may comprise a NFC that wirelessly transmits funds to a sensor (not shown) of the coin processing machine 10 via the communication link (e.g., 204). The funds may then be deducted from the player's PayPal® account or may be charged directly to the customer's mobile telephone bill. In the PayPal® model, the company's customers can link their PayPal® account(s) to their cell phone number. By sending a simple text message to PayPal®, they can deliver cash to a friend or purchase a product from a merchant, who will then ship it as if it were a typical online PayPal transaction, move cash around quickly, and/or make electronic donations to charities.

In accord with the present concepts, the portable electronic device 250 is advantageously, but not necessarily, linked to an account. For example, as noted above, credit card data, bank account information, store loyalty card information, or any other customer account data may be stored and/or embedded into a customer's cell phone or other portable electronic device 250. Still further, services such as Obopay permit customers to create special mobile accounts which allow, for example, funds received from a coin processing transaction to be transmitted from the coin processing machine 10 to the customer's portable electronic device 250 (e.g., a cell phone) and the customer may then transmit the funds to another portable electronic device 250 (e.g., the cell phone of the customer's child or spouse).

In accord with these aspects of the present concepts, a total amount related to the value of the processed coins may be transferred directly to a portable electronic device 250 without the need to print out any tickets and without the need for in-store redemption. Advantageously, the coin processing machine 10 is configured to only close-out the transaction upon receipt of an electronic signal from the portable electronic device 250 that the transfer of funds has been successfully accomplished. Should an error in transmission and/or receipt occur, the coin processing machine 10 may be configured to inform the customer, via display 12 and/or speaker or other output device, and to inform the store (or other institution) service desk personnel or designated employee to assist the customer. In such situation, the service desk personnel or designated employee may access the details of the transaction through a supervisory control system, determine the details of the transaction, and provide the customer a total amount related to the value of the processed coins. As one potential security measure, the information on the portable electronic device 250 obtained by the coin processing machine 10 in the failed transfer attempt could be checked against the same information or signature of the portable electronic device 250 being used in the attempt to redeem the amount of the processed funds. As an additional security measure, the coin processing machine 10 may be configured, as a precondition to the processing of the coins, to require the temporary registration of the portable electronic device 250 to the coin processing machine to ensure that the link therebetween is properly established and/or maintained prior to the processing of the coins.

The coin processing machine 10 may output a receipt, if desired. Alternatively, the aspects relating to the use of the aforementioned portable electronic device 250 are provided in combination, without limitation, with any of the disclosed aspects herein. For example, in the aforementioned temporary registration of the portable electronic device 250 to the coin processing machine to ensure that the link therebetween is properly established and/or maintained prior to the processing of the coins, the coin processing machine 10 may upload a PIN number, transaction number, or code to the portable electronic device 250 and the customer then disposes their portable electronic device in the proximity of a scanner at the redemption location to enable the scanner to read such information and/or manually input such PIN number, transaction number, or code (e.g., reading the information from the display of the telephone and manually inputting the information into a redemption location touch screen or key pad).

In still another aspect, the portable electronic device 250 comprises a device, which may optionally be numbered and/or tracked, which is provided to a customer who intends to process coins for redemption. Such device 250 need not have a display or any other visible output means to convey information to a customer. The portable electronic device 250 may then be registered or connected with the coin processing machine (e.g., putting the device in a cradle, slot, or receptacle), preferably ensuring that the link therebetween is properly established and/or maintained prior to the processing of the coins. In various aspects, a light, such as a green light or red light may be provided on the portable electronic device 250 and/or on the coin processing machine 10 to indicate to the user that the device is properly registered or connected with the coin processing machine, or such information is conveyed to the customer through the coin processing machine display. In this example, the coin processing machine 10 does not need to upload a PIN number, transaction number, code, or the like, to the portable electronic device 250, since the portable electronic device is already associated therewith an identifier. The customer then conducts the coin processing transaction. Some or all of the data relating the transaction may be electronically output to the portable electronic device 250 or, optionally, some of the data relating the transaction (e.g., a total amount) may be output to the redemption location (e.g., service desk 210) via a wired or wireless communication link 202, 204. The customer then returns the portable electronic device 250 to the location from which it was obtained (e.g., service desk 210) for validation and redemption.

In accord with at least the above aspects, the service desk employee (or other designated employee) is enabled to review the transaction completely before a ticket, voucher, script, money, negotiable instrument, or other form of physical or electronic compensation is issued to the customer. Following review of the transaction, the service desk employee may then close out the transaction and redeem the funds owing to the customer (e.g., by issuance of cash). Since the employee is able to review the transaction before closing it out, the store employee is provided an opportunity to intervene into a transaction where there is any kind of a problem including, for example, a customer alleged miscount of the coins by the machine, suspicion by the employee that the individual presenting the PIN, transaction number, code, ID, etc. has put slugs through the machine (e.g., due to the large quantity of the deposit), or the fact that some valuable coins were accidentally deposited and the individual customer would like to have those retrieved.

Figure 18:
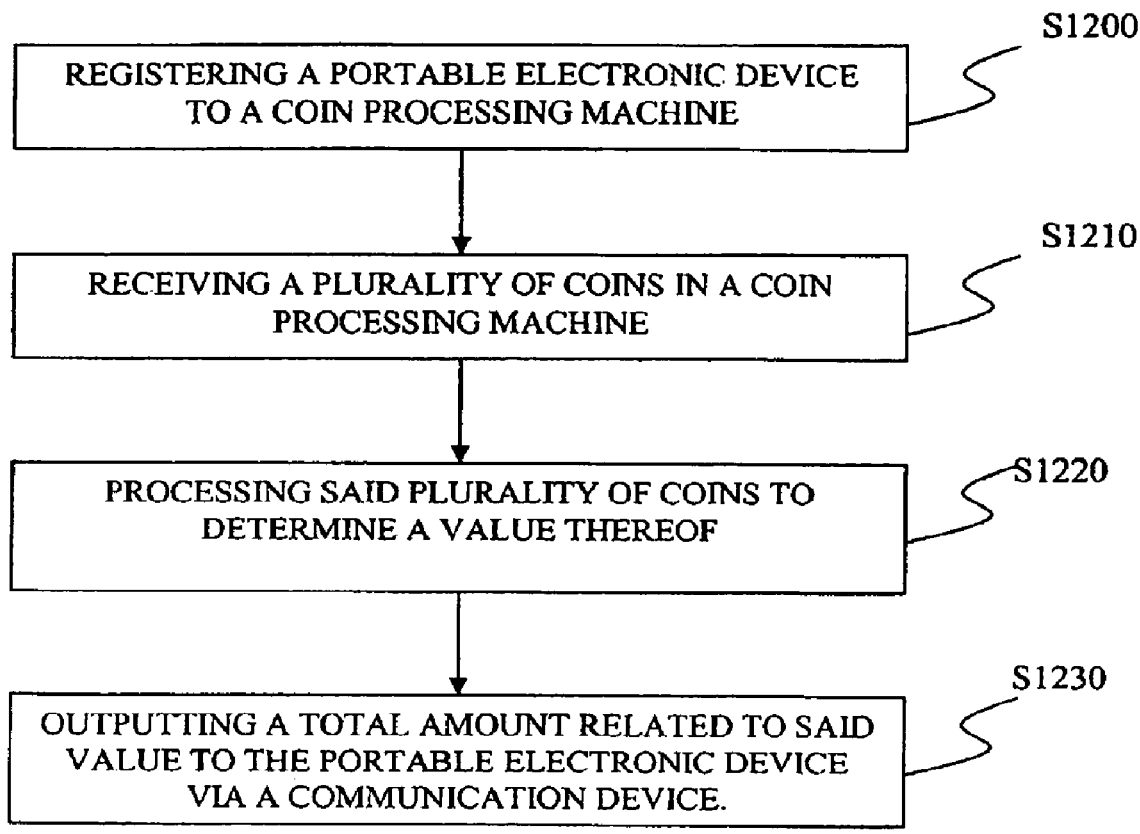
FIG. 18 shows aspects of one method in accord with at least some aspects of the present concepts.

Thus, in accord with at least one aspect of a method in accord with concept, represented in FIG. 18, a method for redeeming coins comprises the acts of (S1200) registering a portable electronic device 250 to a coin processing machine 10, (S1210) receiving a plurality of coins in the coin processing machine, (S1220) processing the plurality of coins to determine a value thereof, and (S1230) outputting a total amount related to the value to the portable electronic device via a communication device. In one aspect, the portable electronic device may comprise a cellular phone.

Assigned Identification Cards

In still additional aspects of the present concepts, a hybrid of the aforementioned "deli number" approach may be employed. In accord with at least some of these aspects an interface 200 is present at a redemption location, such as a service desk 210, POS 220, or kiosk 230. A printer 205 is optionally provided. The coin processing machine 10 is connected to such redemption location interface 200 via a hard-wired or wireless link 202, 204. The coin processing machine 10 outputs data and/or commands to the interface 200, data and/or commands which may be acted upon by the interface and/or passed to a connected component (e.g., printer 205). The coin processing machine 10 is also configurable as a stand-alone machine.

In accord with at least some aspects of the present concepts, a plurality of unique reusable identification cards or identification devices or one-time use identification cards having an identification code provided thereon are provided either at a central, staffed location, such as a service desk, POS, or teller, at a kiosk, or in a dispenser in or adjacent the coin processing machine 10.

In accord with one embodiment, the identification cards comprise a durable substrate (e.g., a plastic) and have an identification code (e.g., a 2-digit, 3-digit, 4-digit, or 5-digit number) embedded therein or printed thereon. The identification code comprises, in at least some non-limiting aspects, a large human-readable number, a machine-readable number, a magnetically-encoded number, a bar coded number, and/or a RFID bearing a number, and the like. The identification cards are stored, in one aspect, at a specified location (e.g., a service desk, POS, kiosk, or teller) in an easy-to-use and easy -to-load cartridge or dispenser. The identification cards are individually dispensable by the store employee or teller from the dispenser when requested by a customer for user in conjunction with a coin processing transaction. When the cards are later returned by the customer, such as to the store employee at the service desk 210, or the like, the store employee then re-loads the identification card into the back or bottom of the dispenser (i.e., a point removed from the dispensing location). The identification cards need not be sequentially arranged and, in fact, may enhance security by fostering a degree of randomness that avoids predictability. Alternatively, the redemption location (e.g., a kiosk 230) may comprise a return chute, bin, or acceptor into which the customer inserts and returns the identification card.

Accordingly, in an example of a retail store, convenience store, specialty store, or the like, the customer proceeds to the service desk 210, POS 220, or kiosk 230 and requests an identification card to use at least on the coin processing machine 10. It is noted that other automated equipment in the store (e.g., photocopy machines, vending devices, etc.) may be configured to operate responsive to the input of a valid identification code and, as such, the identification card lends itself to use in multiple applications. In accord with at least some aspects, the activation of the identification code borne by the identification card provided to the customer by the employee at the service desk 210 (e.g., or POS 220, etc.) or the kiosk 230 automatically the output of a signal (e.g., from the service desk 210 interface 200 or kiosk 230 to the coin processing machine 10) to enable operation of the coin processing machine responsive to entry of that identification code. In at least some aspects, the activation of the identification code borne thereby and transmission of the signal to the coin processing machine 10 is accomplished automatically, such as by an employee's (or customer's) swiping of the identification card through a magnetic reader, bar code reader, or other reading device, preferably with an acknowledgement, such as through interface 200, verifying the acceptability of the input and transmission of the signal to the coin processing machine 10 to enable operation thereof upon input of the identification code.

At the coin processing machine 10, the customer directly or indirectly enters the identification code through an input device including, but not limited to, a touch screen, a keypad, a keyboard, a magnetic card reader, a bar code reader, a RF receiver, or the like, as appropriate to the identification code medium. It is presently preferred that a coin processing transaction does not start until after the identification code is input and is successfully matched to an authorized identification code. Thus, absent a successful match, the coin processing machine 10 will not operate. Instead, the coin processing machine 10 will instruct the customer to return to the service desk 210, POS 220, or kiosk 230, as appropriate, for assistance.

Alternatively, instead of the activation of the identification code when the identification card is dispensed, such as by a service desk 210 employee entering and enabling the identification code associated with the dispensed identification card when the identification card is provided to the customer, the activating of the identification code occurs after the customer inputs the identification code into the coin processing machine 10. In this aspect, the coin processing machine 10 would, following such input of the identification code, issue a request to the service desk 210, POS 220, or kiosk 230, to then validate the identification code.

Where dual representations of the identification code are provided in the identification card, such as a visible numeral and an embedded RFID tag, the coin processing machine 10 is optionally configurable to require input and matching of both identification codes prior to activation and/or to output a signal to the service desk where a match is not detected. For example, the coin processing machine 10 prompts the customer to enter the identification code displayed in or on the card and polls or otherwise communicates with the RFID tag to determine whether the identification number on the RFID tag is the same as that entered by the customer. Such redundant measures serve to thwart inappropriate uses of the identification card.

As additional security features, the characteristics of the substrate could be utilized to distinguish the substrate from other objects which might be inserted into, for example, a card input slot. For example, in some aspects, the coin processing machine 10 is configurable to measure at least one of the substrate dimensions (e.g., width, length, thickness), transmissivity, reflectivity, color, and/or embedded security features to validate the identification card itself.

Continuing with the above example, once the coin processing machine 10 controller 30 has matched the identification code directly or indirectly entered by the user to the authorized active identification code(s), the coin processing machine displays traditional greetings and/or prompts instructing the customer to input their coins into an input region of the coin processing machine. Upon completion of the coin processing, the coin processing machine 10 is further configured to inform the customer, such as by display prompts, that the counting of the coins has been completed and that the customer may return to the redemption location (e.g., service desk 210, POS 220, kiosk 230, etc.) with their identification card to complete the transaction. The coin processing machine 10 then outputs the transaction related information, including the net amount due to the customer, to the redemption location (e.g., service desk 210 computer, interface 200, and/or printer 205, etc.) or, alternatively, updates the coin processing machine 10 memory with such transaction related information for later access by the service desk computer or other authorized computer or controller.

The customer, upon his or her arrival at the redemption location, then presents to an employee (e.g., service desk employee or POS employee) or kiosk 230 the identification card provided to such customer for use in conjunction with the coin processing transaction. The employee then keys in, scans in, swipes a magnetic strip, or otherwise enters the identification code. For a kiosk 230, the customer would key in, scan in, swipe a magnetic strip, or otherwise enters the identification code. The identification code is then matched by the employee or kiosk 230 to a specific transaction and the net amount due to the customer for that transaction are accessed. This matching of the identification code to a specific transaction is performed by accessing the memory and/or database updated by the coin processing machine 10, wherever such memory and/or database is situated.

Where there is a match between the identification code on the identification card returned by the customer and a specific transaction, the employee or kiosk 230 then pays the customer the net amount due, after deduction of any applicable commission charge. The employee or kiosk 230 advantageously prints a cash out ticket summarizing the gross amount of the transaction, the commission retained by the store, and the net proceed to the customer for accounting purposes. If desired by the customer, the employee or kiosk 230 can print and provide to the customer a receipt showing the gross amount, commission and net paid to the customer. In at least some aspects, the receipt is printed at one of a cash register printer, a built-in coin processing machine 10 printer, kiosk 230, and a printer connected to a coin processing machine locally or remotely.

As noted above, at the completion of the transaction the service desk employee returns the identification card to the cartridge or dispenser for later re-issue to another customer. In a kiosk 230 embodiment, the kiosk identification card accepter is configured to direct the inserted identification card to an appropriate position within a secured identification card dispenser or cartridge.

Obviously, as in accord with other aspects described herein, the payment of the net amount due to the customer may assume any form. For example, the net amount due the customer is disbursable as a credit to an account (e.g., a store card account, a bank card account, a card affiliated with a third party account, or any designated account configured to receive an electronic transmission of funds) or as a value on a stored value card or smart card.

In still additional aspects of the present concepts, a redemption method is provided eliminating the need for the customer to go to the service desk 210, or the like, to obtain the identification card. Instead, in accord with at least some aspects, the dispenser or cartridge containing the identification cards is disposed within or adjacent the coin processing machine 10. In accord therewith, when the customer approaches the coin processing machine 10, the controller 30 causes the display 12 to display prompts instructing the customer to first obtain an identification card (e.g., or device) from the dispenser. The customer inputs the identification code borne thereby into a coin processing machine 10 via an input device (i.e., keypad, touch screen, card input slot, magnetic card reader, scanner, receiver, etc.). In this configuration, the coin processing machine 10 is not enabled to perform a transaction until after a valid identification code is entered.

Once the valid identification code is entered, the customer's transaction is then associated with such identification code and the customer is permitted to process their coins. During or after processing of the coins, the controller 30 is configured to cause the display 12 to display prompts instructing the customer to retain the identification card for presentation at the service desk 210 or other redemption location (e.g., POS, kiosk, etc.) to complete the transaction. At the service desk 210 or other redemption location, the customer presents the identification card to the service desk employee. The service desk 210 employee then proceeds to complete the transaction in the same manner as described above (e.g., disbursing funds, generating a cash out ticket and placing the cash out ticket in the cash drawer, etc.). Further, at the end of the transaction, the service desk employee retains the identification card presented by the customer for later reintroduction into the dispenser or cartridge located in or adjacent the coin processing machine 10. Preferably, the identification cards would be stored in a secure area such as the cash register drawer or a secured cartridge or dispenser at the service desk. Then, at the end of the day, such as when balancing out the coin processing machine 10, the identification cards can be removed from the secured cartridge or dispenser at the service desk and reinserted into the cartridge or dispenser in or adjacent the coin processing machine. Alternatively, if a sufficient number of identification cards are present in the secured cartridge or dispenser, the secured cartridge or dispenser may be exchanged for the one in or adjacent the coin processing machine, such. Despite these examples, there is no limitation on the time of day or manner in which the identification cards are reintroduced for subsequent use.

In accord with the above-described identification card, it is noted that a large retail store system may have several hundred or even 1,000 or more store locations. To accommodate such a large number of locations, the identification card advantageously includes unique tags and unique numbers to each store so that, for example, a customer obtaining an identification card at one store cannot be presented at a second store to falsely collect a payment at the second store. In one example, the identification card comprises an embedded store identifier (e.g., an RFID). In another example, the identification cards comprise a series of identification codes that are unique to each store. For example, a first might have assigned thereto identification codes 0 to 100, the next store 111 to 151, and so on. The origin of the identification card is further defined, in at least some aspects, by small print on the back of the identification card comprising a unique and verifiable store locator code and/or writing of the name of the store thereupon (e.g., Publix Store #1, Publix Store #2, etc.) with or without an address and/or contact information and/or encrypted code.

In the above disclosed aspects of the present concepts utilizing an identification card (or device), the identification card (or device) is a durable material. Alternatively, each of the above aspects may utilize an identification ticket produced on a thick paper stock. In at least one example, the material is the same as that used in magnetic-strip parking tickets dispensed from a parking ticket dispenser. The identification tickets are advantageously, but not necessarily, preprinted with identification code. These identification tickets would not be reusable, but would rather be destroyed and/or permanently defaced upon completion of the transaction. Additional identification tickets can be procured on an as-needed basis. It at least some aspects, the identification tickets are time and date stamped as they are dispensed to provide additional information useful in audit control. Aside from the substrate material and reusability, the identification tickets operates in other respects as the aforementioned identification cards.

Monitored Processing and Redemption

In still other aspects of at least some of the present concepts, a coin processing machine 10 is configured to communicate via an in-store computer system communication link 202, 204 to an interface or receiving device 200 at any one of a plurality of destination locations, such as is shown in FIG. 14. As noted above, in various aspects, the destination locations include, but are not limited to, a service desk 210, a POS station 220*a-n*, a kiosk 230, and/or a portable electronic device 250.

The interface 200 comprises, but is not limited to, any one or more of a display, a touch screen display, a computer, a controller, a printer, a communication device, a memory storage device, a portable electronic device and/or a speaker, such as may be provided in or with a service desk 210, a POS 220, kiosk 230, and/or a portable electronic device 250. The coin processing machine 10 further comprises (or is disposed adjacent to) a conventional audio and/or video communication device such as, but not limited to, a video camera, web camera, microphone, and/or speaker. Such a conventional audio and/or video communication device enables audio and/or video communication between a customer at the coin processing machine 10 and a local or remote person at a stationary or mobile terminal.

In at least one aspect, the audio and/or video communication device is staffed by an employee or individual located within a store or business (e.g., a grocery store, a bank, etc.) or remote from the store or business (e.g., at an offsite location). The employee or individual is empowered, via the audio and/or video communication device, to monitor and manage one coin processing machine 10 and/or a plurality of coin processing machines in one store or in a plurality of stores. Advantageously, the interface (e.g., interface 200) of the employee or individual is configured to permit the employee or individual to not only view and communicate with the customer, but is further configured to permit the employee or individual to monitor the electronic outputs of any and all of the coin processing machines 10 (e.g., coin counts, fault conditions, bag totals, bag fill amounts, coin mixes, flags, etc.) authorized for view by the employee or individual. The term individual is used herein at least to particularly emphasize that the person staffing the audio and/or video communication device need not be an employee of, or even be affiliated with the store or business in which the coin processing machine 10 is disposed and could be, for example, a third-party service provider, an employee or contractor of an owner or operator of the coin processing machine disposed in or adjacent a store or business, and/or owner or operator of the coin processing machine disposed in or adjacent such store or business.

Thus, for example, an employee in one store can monitor an entire network of machines across multiple stores, or a sub-portion thereof. The employee or individual is provided, via the audio and/or video communication device, audible and/or visual communication capabilities with any and all machines under their purview. In accord with these aspects of the present concepts, a customer at the coin processing machine 10 is required to contact the employee or individual (or be contacted by the employee or individual) via the audio and/or video communication device and obtain permission to conduct and/or complete a coin processing transaction.

The employee or individual, responsive to the customer's request, responds audibly with an identification code, visually presents an identification code on the coin processing machine 10 display 12 or other display, provides electronically an identification code to a customer (e.g., an email to a customer, accessibly by a cell phone or Blackberry device), or instructs the coin processing machine 10 printer to output a piece of paper bearing the identification code. The employee or individual then audibly or via a terminal display or other display instructs the customer to begin the transaction and count all of their coins (and currency, if available). Upon completion of the coin processing, the employee or individual instructs the customer to proceed to the redemption location (e.g., service desk 210, POS, 220, kiosk 230, etc.) to complete the transaction and receive payment, such as is noted above.

A receipt is optionally printed at the coin processing machine 10 after the coins are counted.

Employee-Assisted or Employee-Monitored Transactions

In still additional aspects of the present concepts, a coin processing machine 10 is disposed adjacent to or in the vicinity of (e.g., within eyesight of, near, next to, in close proximity to, etc.) a staffed redemption location (e.g., a service desk 210, teller, POS 220, kiosk 230, vending area, etc.). The coin processing machine 10 includes one or more displays (e.g., 12), speakers, and/or signage viewable by the customer and an employee stationed at the staffed redemption location. In this example, when the customer completes the coin processing, the coin processing machine's 10 display(s), speakers, and/or signage directly inform the employee of the required redemption amount to be provided to the customer by visual and/or auditory information.

In situations where it may not be desired to permit customers to input their own coins, a coin processing machine 10 having one or more displays, speakers, and/or signage viewable by the customer and the employee may be disposed in an area accessible only to the employee (e.g., behind a customer service desk counter), but within the line of sight of the customer. The employee would input the coins into the coin processing machine 10 in view of the customer and, following completion of the coin processing, the employee would then give the customer cash, a physical cash substitute, an electronic cash substitute, merchandise, service, benefit, and/or food item, and close out the transaction. The redemption location may be disposed in, for example, a financial institution, casino, grocery store, department store, shopping mall, fast food restaurant, or any other public area or type of business or location open to the public.

In at least some other aspects of the present concepts wherein the coin processing machine 10 is provided adjacent or in the vicinity of a service desk 210, POS 220 terminal, or the like, an employee designated to supervise and/or handle coin processing transactions at the coin processing machine 10, upon seeing or being informed that a customer requires assistance, closes his or her cash drawer if open, exits the service desk, and proceeds to the coin processing machine to assist the customer.

To enable the coin processing machine 10 to perform the coin processing transaction, the designated employee accesses a supervisory control by entering an appropriate command and/or data through an input device. In various non-limiting aspects, the input device comprises a key-hole adapted to receive a key, a magnetic strip reader adapted to read a card bearing a magnetic strip, a bar code reader adapted to read a bar code, an RF receiver or transceiver configured to read and/or poll an RFID, a touch screen display adapted to receive an input of a supervisory command, identification and/or code, a button panel adapted to receive an input of a supervisory command, input and/or code, and/or a biometric device, such as noted above, adapted to receive a biometric input of a designated employee, recognize such biometric input, and accept supervisory inputs and/or commands from such designated employee. The input device includes, generally, any input device, wherever located, by which the designated employee may input identification information, commands, or the like, sufficient to enable operation of the coin processing machine 10. For example, an identification code entered by a designated employee using a keypad is compared by the coin processing machine 10 controller 30 to a list of authorized employees.

In another aspect, the designated employee may enable or authorize the transaction without having to leave the service desk 210, POS 220, or the like. Instead, in at least this aspect, the customer approaches the coin processing machine 10 adjacent the service desk 210 and indicates a desire to conduct a coin processing transaction (e.g., verbally, by pressing a button to call, page, text message, email, or activate an audible and/or visual indicator, etc.). The designated employee then, using a touch screen display and/or input device (e.g., keyboard, keypad) connected to the coin processing machine 10 by a wireless or hardwired link 202, 204, enables or authorizes the transaction to proceed. The employee optionally assigns a customer ID number or code to the transaction before initiating the transaction begins or subsequent to the initiation of the transaction. Following the above-noted authorization or enabling of the coin processing machine 10, the employee instructs the customer to input coins into the coin processing machine by verbal prompts, which may optionally be carried by a speaker, or output of messages and prompts directly to the coin processing machine display. Alternatively, the act of enabling the coin processing machine 10 by the designated employee, in some aspects, automatically causes the coin processing machine to display prompts to the customer to proceed with the transaction and input coins.

When the coin processing transaction is completed, the coin processing machine 10 displays prompts to the customer inquiring as to whether or not the customer is done inputting coins. Upon input of a response to the query, whether by the pressing of an acknowledgement button, or the like, or the lapse of a pre-set timer, the coin processing machine 10 outputs a signal via a hardwired or wireless link 202, 204, to an interface 200 at the service desk 210, POS 220, or other location, as appropriate. Alternatively, the signal output by the coin processing machine 10 is output to a display or signage at, near, or integral with the coin processing machine, viewable from the service desk 210, POS 220, or the like.

The signal output by the coin processing machine 10 to the interface 200 at the service desk 210, POS 220, or other location, indicates the net amount due to the customer and the display 12 on the coin processing machine 10 also indicates the net amount due to the customer. The customer is instructed by prompts displayed on the display 12 to proceed to a designated redemption location, such as the service desk 210, for payment. The designated employee at the service desk 210 then prints a cash out receipt for the transaction listing the gross amount, net amount and commissions paid and places this cash out receipt in the cash drawer concurrent with a payment to the customer of the net amount due. The designated employee then preferably inquires as to whether or not the customer wishes to receive a receipt for their own records, printing a receipt for the customer if requested. Once the above acts have been completed, the designated employee closes out the transaction via the interface 200 at the service desk 210, POS 220, or other location. The closing out of the transaction, in one aspect, automatically updates the transaction records at the coin processing machine 10. In accord with this aspect, only after the transaction had been closed out by the designated employee may a second customer begin permitted to use the machine in accord with the above-noted configuration and acts.

In yet additional aspects, the coin processing machine 10 may comprise a call or paging button or other input device. Alternatively, such a call or paging button or other input device may be disposed adjacent the coin processing machine 10. As but one example, such other input device could comprise a telephone disposed adjacent the coin processing machine 10, the telephone being linked to a service desk and/or a paging system. In accord with these aspects, a customer approaches a coin processing machine 10 located in a public area of a store, business, or financial institution, or in another public area. For example, the coin processing machine 10 may be disposed toward the front of a grocery store, where customers enter and exit. The coin processing machine 10 is configured, in these aspects, to display on the display (e.g., 12) a prompt to a customer to start a transaction by pressing the call or paging button, which may comprise, but is not limited to, a physical button or a touch-screen button, and may comprise other non-button input devices (e.g., dials, switches, voice command, touch sensitive device, sensor(s), state-changing devices, etc.). When the call or paging button, or other input device, is activated by a customer, the coin processing machine 10 is configured to display on the display a message information the customer that a store employee will be with them shortly to assist them with the coin processing transaction.

Concurrent with the customer's pressing of the call or paging button, or utilization of any other input device to the same effect, an output signal is generated to summon an employee to the coin processing machine 10. In one aspect, the output signal is generated by a transmitter in the coin processing machine 10, which outputs the signal via a wireless or hardwired link 202, 204 to a paging system configured to page a store employee assigned the task of supervising the coin processing machine 10 using conventional paging technology, such as pagers and paging systems manufactured by Motorola. In one aspect, the paging comprises broadcasting a message through a network, such as a cellular network, to contact a remote radio system, namely the employee's mobile transceiver (e.g., a cell phone). In another aspect, the paging comprises the use of a paging device through a paging service, wherein the paging device alerts the employee via a sensory message, such as an audible noise, flashing lights, and/or vibration of the receipt of a message. In still another aspect, the paging device comprises an email-configured device, such as a Blackberry device (manufactured by Research In Motion, Ltd.), a cell phone, and/or a computer, and the coin processing machine 10 outputs a predetermined email message to the designated email address associated with the Blackberry device or cell phone. For example, in at least some aspects, the coin processing machine 10 is configured to email a message to a service desk 210 computer or POS 220 terminal informing the designated person at the service desk or POS that a person requires assistance at the coin processing machine.

Alternative paging systems comprise a flashing light on the coin processing machine 10 and/or a fixed or portable flashing light disposed at a service desk 210, POS 220, back room, ceiling, and/or other location readily visible by the employee supervising the coin processing machine. Still further alternative paging systems comprise a speaker emitting an audible tone, noise, or alarm to notify the designated employee that assistance is required at the coin processing machine 10. In one aspect, the speaker is disposed in, on, or adjacent the coin processing machine 10. In another aspect, the speaker comprises a fixed or portable speaker disposed at a service desk 210, POS 220, back room, ceiling, and/or other location so as to be readily audible to the employee supervising the coin processing machine.

Any combination of the above-noted paging systems may be employed in accord with the present concepts.

Following notification of the designated employee, such as by one of the above-described methods and devices, the designated employee responds to the page and/or message and proceeds to the coin processing machine 10. To enable the coin processing machine 10 to perform the coin processing transaction, the designated employee accesses a supervisory control by entering an appropriate command and/or data through an input device. In various non-limiting aspects, the input device comprises a key-hole adapted to receive a key, a magnetic strip reader adapted to read a card bearing a magnetic strip, a bar code reader adapted to read a bar code, an RF receiver or transceiver configured to read and/or poll an RFID, a touch screen display adapted to receive an input of a supervisory command, identification and/or code, a button panel adapted to receive an input of a supervisory command, input and/or code, and/or a biometric device, such as noted above, adapted to receive a biometric input of a designated employee, recognize such biometric input, and accept supervisory inputs and/or commands from such designated employee. The input device includes, generally, any input device, wherever located, by which the designated employee may input identification information, commands, or the like, sufficient to enable operation of the coin processing machine 10. For example, an identification code entered by a designated employee using a keypad is compared by the coin processing machine 10 controller 30 to a list of authorized employees.

The designated employee takes actions necessary to enable or authorize the coin processing machine 10 to begin the coin processing transaction. The employee optionally assigns a customer ID number or code to the transaction before initiating the transaction begins. In another aspect, the employee optionally assigns a customer ID number or code to the transaction subsequent to initiation of the transaction. Following the above-noted authorization or enabling of the coin processing machine 10, the employee, or optionally the customer, then runs the coins through the coin processing machine. When the coin processing transaction is completed, the employee then commands the coin processing machine 10 to print a receipt or cash out ticket including, for example, the gross amount, commission, and/or net amount to be paid to the customer. Alternately, the customer presses a button, key, or the like to print the receipt or cash out ticket. In still another alternative, the coin processing machine 10 automatically prints out the receipt or cash out ticket at the completion of the coin processing transaction.

Following printing of the receipt or cash out ticket, the employee closes out the transaction. The customer is then permitted to obtain payment at a redemption location using the receipt or, optionally, any customer ID number or code assigned to the transaction by the employee. As previously noted, the redemption location may include, but is not limited to, a service desk 210, POS 220, kiosk 230, or portable electronic device. Alternatively, the redemption location can include a local cash drawer or box disposed adjacent to the coin processing machine 10. In at least some aspects, the above-noted designated employee would also supervise and/or perform the redemption to the customer as part of the close out process. For example, the designated employee accesses a cash drawer, whether located at a service desk 210, POS 220, or even adjacent the coin processing machine 10, and pays the customer the net amount due. The employee then places the receipt or cash out ticket into the cash drawer and, if requested, prints out a customer receipt. Alternatively, the designated employee instructs the customer to obtain redemption from another employee at a redemption location and the designated employee hands the receipt or cash out ticket to such another employee or directs the customer to hand the receipt or cash out ticket to such another employee.

In accord with the above-described aspects, a second transaction cannot be started by another customer at the coin processing machine 10 until such time as after the designated employee has closed out the first transaction (e.g., issuing payment to the prior customer and inserted the cash out ticket in the cash drawer). Once the designated employee has closed out the first transaction, the designated employee can attend to any subsequent messages or pages indicating additional assistance is needed at the coin processing machine 10. One benefit of the above-described aspects includes a lower susceptibility of the location to fraud since an employee supervises the transaction for the customer. Since, even in the conventional redemption systems, an employee must get involved to pay at least in the redemption portion of the transaction, the additional demands placed on the designated employee is not unduly burdensome. For the most part, the designated employee is free to perform other operations at the store or location, and only must attend the coin processing machine 10 when summoned to the coin processing machine.

Other Aspects of the Present Concepts

In accord with any of the biometrically-based concepts noted above, a record or receipt of the transaction may be optionally printed by the coin processing machine 10 for retention by the customer. In such biometrically-based concepts a first component of the redemption process, performed at the coin processing machine, comprises the customer providing a personal biometric data input (e.g., a single-finger scan, a double-finger scan, or any other biometric input) which links the customer to the transaction, transaction amount, or other suitable transaction identifying information. The customer then goes to the service desk 210 or other designated redemption location (e.g., POS, kiosk, etc.) and provides a matching biometric data input to receive the funds. In accord with the present aspect, the patron never relinquishes possession of the receipt. Rather, the scanning process and matching of the biometric data input (e.g., at the service desk 210) prompts the generation of a second receipt at the service desk. This second receipt is then used to reconcile or close-out the redemption transaction (e.g., the second receipt is placed in the cash drawer for reconciliation purposes).

In accord with any of the above-described aspects, embodiments, and/or examples, the association of a user to a transaction (e.g., via a biometric input) or the association of a paper or ticket to a transaction (e.g., an exchange ticket) may advantageously occur prior to the processing of any coins. Optionally, such association may be required as a prerequisite to any coin processing transaction.

In yet one more example, the coin processing machine 10 may be disposed within the service desk area and the customer-service representative may be responsible for inputting a customers coins and disbursing funds in an amount related to the value of the processed coins. In this example, no voucher or biometric identification is required. In a similar example, the coin processing machine 10 may be disposed adjacent the service desk area and a display provided so that a customer and the service desk personnel can both clearly see the tabulated total amount of the processed coins. The service desk personnel then disburses funds to the customer in an amount related to the value of the processed coins. Optionally, the service desk personnel may be provided with an "enable" switch, or the like, so that the coin processing machine 10 may only be operated when a service desk personnel is present. In such case, the display 12 may be configured to display an instruction to the prospective user to "See Service Desk Personnel Prior To Use" or the like and/or signage adjacent the coin processing machine 10 provides simple and explicit instructions for use and redemption. In another aspect, such enable switch may control a physical component of the coin processing machine 10, such as a hood or partition that blocks access to a coin input hopper or region. Thus, a prospective user may be prevented from inputting coins until such time as a service desk personnel is at the service desk and enables the coin processing machine 10 for operation.

In accord with the foregoing concepts, it is to be noted that any of the foregoing features and aspects may be combined with one another without limitation. Various features or groupings of features have been presented by way of example, but such examples should not be construed to limit the combinations of such features, such combinations being included within the present concepts. As but one example, a user may be required to input a first biometric input and a second non-biometric input (e.g., a random number), such inputs being combined or associated with one another in relation to the transaction or transaction amount or, alternatively, such inputs being individually associated with the transaction amount. In either case, the user would have to present both a matching biometric input and a matching non-biometric input to redeem the value.

In various other aspects, the present concepts include, without limitation, the following examples.

EXAMPLE A

A coin processing system is provided comprising a coin processing machine configured to receive a batch of coins in an input region and process the batch of coins to determine a value thereof, a display device, a first biometric device configured to receive a user's biometric input, and a controller configured to extract at least one feature from the biometric input, to compare the at least one feature with an acceptable range for the at least one feature, and to output a signal to the display device relating to one of an acceptance of the biometric input and a failure to accept the biometric input. The display device may comprise an indicator light and/or an LED. The display device comprises, but is not limited to, a touch screen display, a video display, an LCD display, a plasma display, and/or a haptic display. The haptic display may be integrated with the first biometric device.

The controller may be further configured to enable the coin processing machine to perform an associated coin processing function following or concurrent with an output of a signal to the display device relating to an acceptance of the biometric input. The controller may be further configured to enable the coin processing machine to perform an associated coin processing function only following or concurrent with an output of a signal to the display device relating to an acceptance of the biometric input. The coin processing system may further comprise a first communication device configured to output a signal relating to the biometric input. The first communication device may be configured to output a signal relating to the value. The coin processing system may further comprise a printer for printing a transaction ticket bearing information relating to at least one of the biometric input and the value and/or a dispensing device for dispensing a substrate bearing information relating to the biometric input.

The coin processing system may further comprise a second biometric device configured to receive another biometric input of the user, a second communication device configured to output a signal related to the another biometric input, and a controller configured to associate the signal related to the biometric input with the value, to compare the signal related to the biometric input with the signal related to the another biometric input to determine a degree of correspondence therebetween, and to output a signal associating at least one of the value and the signal related to the biometric input with the signal related to the another biometric input when the degree of correspondence satisfies at least one predetermined criterion.

The coin processing system first biometric device may comprise a device configured to measure at least one physical characteristic of a user. Such physical characteristic may include at least one of a fingerprint, facial dimension(s), teeth, retinal structure, iris structure, body part dimensions, vein pattern, vein dimensions, thermographic pattern, nailbed dimensions, and skin spectral response. The first biometric device may also or alternatively comprise a device configured to measure at least one characteristic of a user's vocalization.

In one aspect of at least this example, the first biometric device is remote from the second biometric device. At least the first biometric device may be configured to take a plurality of measurements of the user's biometric input and output a signal or signals corresponding to the biometric inputs. The controller may be configured, in one aspect, to compare at least one signal related to the biometric input from the first biometric device to the signal related to the another biometric input. The controller may be configured, in another aspect, to determine a degree of correspondence between the at least one signal related to the biometric input from the first biometric device and the signal related to the another biometric input. The coin processing system controller may be configured to output a signal associating the value with the signal related to the another biometric input when the degree of correspondence between any comparison between the at least one signal related to the biometric input from the first biometric device and the signal related to the another biometric input satisfies at least one predetermined criterion.

The controller may be configured to output a signal associating the at least one signal related to the biometric input from the first biometric device and the signal related to the another biometric input when the degree of correspondence between any comparison between the at least one signal and the signal related to the another biometric input satisfies at least one predetermined criterion. In at least one aspect, each of the first biometric device and the second biometric device may be configured to take a plurality of measurements of a respective one of the user's biometric input and the another biometric input and output a corresponding plurality of signals signal related to a respective one of the user's biometric input and the another biometric input. In at least some other aspects, the controller is configured to compare each signal in the plurality of signals related to the biometric input and the another biometric input, is configured to determine a degree of correspondence between each signal in the plurality of signals related to the biometric input and the plurality of signals related the another biometric input, and is configured to output a signal associating the value with at least one of the plurality of signals related to the another biometric input when the degree of correspondence between any of the comparisons between the signals related to the biometric input and the signals related to the another biometric input satisfies at least one predetermined criterion.

The communication device may comprise, for example, a serial port, parallel port, USB port, ECP port, IEEE 1394 port, broadband device, Ethernet port, wireless device, modem, RF device, and/or IR device. The controller is may further be configured to decrypt the signal related to the biometric input and the signal related to the another biometric input to determine a degree of correspondence therebetween and may still further be configured to output a signal indicating a correspondence between the decrypted signal related to the biometric input and the decrypted signal related to the another biometric input when a degree of correspondence therebetween satisfies at least one predetermined criterion.

EXAMPLE B

A method for implementing a loyalty program is provided which comprises the acts of opening a loyalty account for a user, receiving a user's biometric input and storing data relating to the user's biometric input on a computer-readable storage medium in association with the user's loyalty account, receiving a subsequent biometric input from the user in association with a coin processing transaction, and associating information relating to the coin processing transaction to the user's loyalty account.

The above method may further comprise the act of providing a benefit to the user in relation to the transaction. Such benefit may comprise, for example, a discount on a product involved in the transaction, a discount on a total value of the transaction, a discount on a total value of a subsequent transaction, a reduction of a fee associated with the coin processing transaction, and/or an elimination of a fee associated with the coin processing transaction.

The above-noted act of storing data relating to the user's biometric input on a computer-readable storage medium in association with the user's loyalty account may comprise transmitting the user's biometric input to a local and/or a remote computer-readable storage medium. The user's biometric input may be feature extracted, compressed, and/or encrypted prior to transmission.

The biometric input may comprise at least one physical characteristic comprising, such as noted above, and/or at least one non-physical characteristic, such as noted above.

EXAMPLE C

In one aspect, a currency processing system comprises a currency processing machine configured to receive a batch of currency in an input region and process the batch of currency to determine a value thereof, a biometric device configured to receive a user's biometric input, and a controller configured to extract at least one feature from the biometric input. The controller is also configured to compare the at least one feature with at least one stored value of the feature for the user and, responsive to a match between the feature and the stored value of the feature, output a control signal to at least one of the currency processing machine and a remote computer via a communication device.

The currency processing system preferably comprises a display, the controller being further configured to display information on the display. In various aspects, the control signal activates a supervisor mode, a diagnostic mode, a set-up mode, and/or a log-in mode for the currency processing machine. The control signal may unlock a locking mechanism and/or activate an operating mode for the currency processing machine.

The currency processing system may also comprise a coin processing machine configured to receive a batch of coins in an input region and process the batch of coins to determine a value thereof. In one aspect, the coin processing machine may be configured to require a biometric input for each batch of coins to be processed. The currency processing machine may also or alternatively comprise a bill processing device configured to receive a batch of bills in an input region and process the batch of bills to determine a value thereof. Such bill processing device could also be configured to require a biometric input for each batch of bills to be processed.

In the currency processing machine, the controller may be further configured to enable the coin processing machine to perform an associated coin processing function following or concurrent with an output of the control signal.

The biometric input may comprise at least one physical characteristic comprising, such as noted above, and/or at least one non-physical characteristic, such as noted above. The controller may be is configured to take a plurality of measurements of the user's biometric input and output a signal or signals corresponding to the biometric inputs. The controller may further be configured to compress, encrypt, and/or decrypt the signal related to the biometric input.

EXAMPLE D

A currency processing system is provided comprising a currency processing machine configured to receive a batch of currency in an input region and process the batch of currency to determine a value thereof, a first biometric device configured to receive a user's first biometric input, a second biometric device configured to receive a user's second biometric input, and a controller configured to extract at least one feature from each of the first biometric input and the second biometric input. The controller is configured to compare the at least one feature from the first biometric input to a template of the first feature for the user and to compare the at least one feature from the second biometric input to a template value of the second feature for the user. The controller is further configured to, responsive to a match between at least one of the first feature and the template of the first feature and the second feature and the template of the second feature, output a control signal to at least one of the currency processing machine and a remote computer via a communication device.

In the currency processing system, the first biometric device may be a different type of biometric device than the second biometric device.

The currency processing system may further comprise a display, wherein the controller is configured to display information on the display.

The control signal may activate (or deactivate) a supervisor mode, a diagnostic mode, a set-up mode, a log-in mode, a lock, and/or an operating mode for the currency processing machine.

The currency processing machine may comprise a coin processing machine configured to receive a batch of coins in an input region and process the batch of coins to determine a value thereof. The currency processing system may be configured to require a biometric input for each batch of coins to be processed. The currency processing system may alternatively or further comprise a bill processing device configured to receive a batch of bills in an input region and process the batch of bills to determine a value thereof. Such bill processing device may be configured to require a biometric input for each batch of bills to be processed.

The controller may be further configured to enable the coin processing machine to perform an associated coin processing function following or concurrent with an output of the control signal.

The first biometric device and the second biometric device may each comprise a device configured to measure at least one first physical characteristic of a user, such as noted above. The first biometric device and the second biometric device may also or alternatively comprise a device configured to measure at least one non-physical characteristic of a user, such as noted above. The biometric device may be configured to take a plurality of measurements of the user's first biometric input and output a signal or signals corresponding to the first biometric inputs. The controller may be configured to compress, encrypt, and/or decrypt the signal related to the biometric input.

The first biometric device and the second biometric device may be the same type of biometric device or may be different types of biometric device. The first biometric device and the second biometric device may both be fingerprint-based biometric devices configured to accept fingerprints for different fingers of a user.

EXAMPLE E

A currency processing system may comprise a currency processing machine configured to receive a batch of currency in an input region and process the batch of currency to determine a value thereof, a biometric device configured to receive a user's first biometric input comprising a fingerprint for a first finger of the user and to receive a user's second biometric input comprising a fingerprint for a second finger of the user, and a controller configured to extract at least one feature from each of the first biometric input and the second biometric input. The controller is configured to compare the at least one feature from the first biometric input to a stored value of the first feature for the user and to compare the at least one feature from the second biometric input to a stored value of the second feature for the user. The controller is further configured to, responsive to a match between at least one of the first feature and the stored value of the first feature and the second feature and the stored value of the second feature, output a control signal to at least one of the currency processing machine and a remote computer via a communication device.

EXAMPLE F

A method for regulating a currency processing system comprises the acts of receiving a user's first biometric input, extracting at least one feature from the first biometric input, comparing the at least one feature from the first biometric input to a stored value of the first feature for the user, receiving a user's second biometric input;

extracting at least one feature from the second biometric input, comparing the at least one feature from the second biometric input to a stored value of the second feature for the user, and outputting a control signal to at least one of a currency processing machine and a remote computer via a communication device in response to a match between at least one of the first feature and the stored value of the first feature and the second feature and the stored value of the second feature.

In this method for regulating a currency processing system, the first biometric device may be a different type of biometric device than the second biometric device.

The method for regulating a currency processing system may comprise outputting the control signal to at least the currency processing machine, receiving a batch of currency in an input region, and processing the batch of currency, responsive to the control signal, to determine a value thereof.

The method for regulating a currency processing system may comprise outputting the control signal to at least the currency processing machine, and activating or deactivating at least one of a supervisor mode, diagnostic mode, set-up mode, a lock, and log-in mode for the currency processing machine in response to the control signal.

The method for regulating a currency processing system according may comprise the acts of providing, a currency processing machine and/or a bill processing device, receiving a batch of coins and/or bills in an input region, and processing the batch of coins and/or bill to determine a value thereof.

The acts of receiving a user's first biometric input and second biometric input in the method for regulating a currency processing system may comprise receiving data relating to at least one of a physical and/or non-physical characteristic, as noted above.

EXAMPLE G

A currency processing and redemption system comprises a coin processing machine configured to receive a batch of coins in an input region and process the batch of coins to determine a value thereof, a first biometric device configured to receive a user's first biometric input, a second biometric device configured to receive a user's second biometric input, and a controller configured to extract at least one feature from each of the first biometric input and the second biometric input.

The controller may be further configured to compare at least one feature from the first biometric input to a template of acceptable ranges of the first feature and to compare the at least one feature from the second biometric input to a template of acceptable ranges of the second feature. The controller may be configured to, responsive to a match between the at least one feature from the first biometric input to a template of acceptable ranges of the first feature and to compare the at least one feature from the second biometric input to a template of acceptable ranges of the second feature, output a control signal to at least one of the currency processing machine and a remote computer via a communication device.

EXAMPLE H

A redemption system comprises a coin processing machine configured to receive a batch of coins in an input region and process the batch of coins to determine a value thereof, the coin processing machine comprising a first biometric device configured to receive a user's biometric input and a communication device configured to output at least a first signal relating to the biometric input and a second signal relating to the value, a second biometric device configured to receive another biometric input of the user, the second biometric device being associated with a point of sale terminal, and a controller. The controller is configured to compare the first signal to the another biometric input to determine a degree of correspondence therebetween, and to output an output signal when the degree of correspondence satisfies at least one predetermined criterion, the output signal associating data related to at least one of the first signal and the second signal to the user providing the another biometric input.

The first biometric device may comprise a device configured to measure at least one physical and/or non-physical characteristic of a user, such as noted above. The controller and/or first biometric device may be configured to take a plurality of sequential biometric inputs and the communication device may be configured to output at least the first signal relating to the plurality of sequential biometric inputs. The controller and/or second biometric device may also be configured to take a plurality of sequential biometric inputs. The controller being further configured to compare the first signal relating to the plurality of sequential biometric inputs against the plurality of sequential biometric inputs taken by the second biometric device to determine a degree of correspondence between any combination of the plurality of sequential biometric inputs taken from the first biometric device and the second biometric device.

The output signal may comprise an audible instruction to a POS employee, an instruction presented on a display to a POS employee, and/or a printed instruction to a POS employee.

The coin processing machine may comprise a printer configured to output a transaction ticket bearing indicia relating to at least one of a time of the transaction, a date of the transaction, a transaction number, a value of the transaction, and a characteristic of the biometric input. Such characteristic of the biometric input may be a different characteristic that that included within the first signal relating to the biometric input. The substrate bearing an indicia relating to the value may comprise a security paper.

The controller may be configured to delete data associated with the first signal related to the biometric input and the signal related to the another biometric input following the output of the output signal where the output signal corresponds to a redemption in full.

EXAMPLE I

A redemption system comprises a coin processing machine configured to receive a batch of coins in an input region and process the batch of coins to determine a value thereof, the coin processing machine comprising a first biometric device configured to receive a user's biometric input and a communication device configured to output at least a first signal relating the biometric input and the value, a second biometric device configured to receive another biometric input of the user, the second biometric device being associated with a point of sale terminal, and a controller. The controller is configured to compare a portion of the first signal relating to the biometric input to the another biometric input to determine a degree of correspondence therebetween, and to output an output signal when the degree of correspondence therebetween satisfies at least one predetermined criterion, the output signal associating a portion of the first signal relating to the value to the user providing the another biometric input.

The first biometric device may comprise a device configured to measure at least one physical characteristic or non-physical characteristic of a user, such as noted above. The controller and/or first biometric device may be configured to take a plurality of sequential biometric inputs, the communication device being configured to output at least the first signal relating to the plurality of sequential biometric inputs. The controller and/or second biometric device may similarly be configured to take a plurality of sequential biometric inputs. The controller is correspondingly configured to compare the first signal relating to the plurality of sequential biometric inputs against the plurality of sequential biometric inputs taken by the second biometric device to determine a degree of correspondence between any combination of the plurality of sequential biometric inputs taken from the first biometric device and the second biometric device.

A printer may be provided and configured to output a transaction ticket bearing indicia relating to at least one of a time of the transaction, a date of the transaction, a transaction number, a value of the transaction, and a characteristic of the biometric input. Such characteristic of the biometric input may be a different characteristic that that included within the first signal relating to the biometric input. The substrate bearing an indicia relating to the value may comprise a security paper.

The controller may be configured to delete data associated with the first signal related to the biometric input and the signal related to the another biometric input following the output of the output signal where the output signal corresponds to a redemption in full.

EXAMPLE J

A redemption system comprising a coin processing machine, disposed in a first store, configured to receive a batch of coins in an input region and process the batch of coins to determine a value thereof, the coin processing machine comprising a first biometric device configured to receive a user's biometric input and a communication device configured to output at least a first signal relating to the biometric input and a second signal relating to the value. A second biometric device, disposed in a second store, is configured to receive another biometric input of the user in connection with a transaction, the second biometric device being associated with a point of sale terminal at the second store. A controller is configured to compare the first signal to the another biometric input to determine a degree of correspondence therebetween, and to output an output signal when the degree of correspondence satisfies at least one predetermined criterion, the output signal associating data related to at least one of the first signal and the second signal to the user providing the another biometric input.

The first biometric device may comprise a device configured to measure at least one physical characteristic or non-physical characteristic of a user, such as noted above. The controller and/or first biometric device may be configured to take a plurality of sequential biometric inputs, the communication device being configured to output at least the first signal relating to the plurality of sequential biometric inputs.

The second biometric device may be configured to take a plurality of sequential biometric inputs, and wherein the controller is configured to compare the first signal relating to the plurality of sequential biometric inputs against the plurality of sequential biometric inputs taken by the second biometric device to determine a degree of correspondence between any combination of the plurality of sequential biometric inputs taken from the first biometric device and the second biometric device.

The coin processing machine may further comprise a printer and may be configured to output from the printer a transaction ticket bearing indicia relating to at least one of a time of the transaction, a date of the transaction, a transaction number, a value of the transaction, and a characteristic of the biometric input. Such characteristic of the biometric input may be a different characteristic than that included within the first signal relating to the biometric input.

The controller may be configured to delete data associated with the first signal related to the biometric input and the signal related to the another biometric input following the output of the output signal if the transaction at the second store is of a value at least equal to the value related to the biometric input. The controller may be configured to debit a value related to the biometric input if the transaction at the second store is of a value less than the value related to the biometric input.

EXAMPLE K

A redemption system comprises a coin processing machine, disposed in a first store, configured to receive a batch of coins in an input region and process the batch of coins to determine a value thereof, the coin processing machine comprising a first biometric device configured to receive a user's biometric input and a communication device configured to output at least a first signal relating the biometric input and the value. A second biometric device, disposed in a second store, is configured to receive another biometric input of the user in connection with a transaction, the second biometric device being associated with a point of sale terminal. A controller is configured to compare a portion of the first signal relating to the biometric input to the another biometric input to determine a degree of correspondence therebetween, and to output an output signal when the degree of correspondence therebetween satisfies at least one predetermined criterion, the output signal associating a portion of the first signal relating to the value to the user providing the another biometric input.

The first biometric device may comprise a device configured to measure at least one physical characteristic or non-physical characteristic of a user, such as noted above.

The controller and/or first biometric device may be configured to take a plurality of sequential biometric inputs, the communication device being configured to output at least the first signal relating to the plurality of sequential biometric inputs. The controller and/or second biometric device may also be configured to take a plurality of sequential biometric inputs. The controller is configured to compare the first signal relating to the plurality of sequential biometric inputs against the plurality of sequential biometric inputs taken by the second biometric device to determine a degree of correspondence between any combination of the plurality of sequential biometric inputs taken from the first biometric device and the second biometric device.

The output signal may comprise an audible instruction to an employee of the second store, an instruction presented on a display to an employee of the second store, and/or a printed instruction to an employee of the second store.

The coin processing machine may further comprise a printer and may be configured to output from the printer a transaction ticket bearing indicia relating to a time of the transaction, a date of the transaction, a transaction number, a value of the transaction, and/or a characteristic of the biometric input. Such characteristic of the biometric input may be a different characteristic that included within the first signal relating to the biometric input.

The controller may be configured to delete data associated with the first signal related to the biometric input and the signal related to the another biometric input following the output of the output signal if the transaction at the second store is of a value at least equal to the value related to the biometric input. The controller may be configured to debit a value related to the biometric input if the transaction at the second store is of a value less than the value related to the biometric input.

EXAMPLE L

A currency processing data management system may comprise a currency processing machine (e.g., a bill and/or coin processing machine) comprising a currency discrimination device, a user input device, a currency storage device, a controller, and a first computer-readable storage medium, the controller being configured to store processing information in the first computer-readable storage medium, and the first computer-readable storage medium bearing an instruction set configured to transfer the processing information from the first computer-readable storage medium a communication port, the communication port being configured to receive a second portable computer-readable storage medium. The processing information may comprise a sub-batch total, batch total, day total, transaction total, denomination totals, beginning day balance, end of day balance, beginning shift balance, end of shift balance, number of receptacles full, and/or a number of receptacles changed.

The user input device may comprise a display or a portable electronic device connected to or in communication with the communication port, which may comprise a wireless communication device. The processing data may be output from the communication port only in response to a supervisor command input using the user input device. The communication port may be internal to the currency processing machine and the second portable computer-readable storage medium may be removably connected to such internal communication port.

The second portable computer-readable storage medium may comprise a flash memory device, a memory of a PDA, a memory of a laptop computer, a magnetic memory card, a magnetic disk, an optical disk, memory chip, memory card, USB flash drive, and/or a flash memory card.

EXAMPLE M

A method of managing data from a currency processing system may include the acts of processing currency in a currency processing machine, storing currency processing information, such as that noted above, in a first computer-readable storage medium, transferring the processing information from the first computer-readable storage medium to a second portable computer-readable storage medium using a communication port, transferring the processing information from the secondary computer-readable storage medium to a computer, and tracking the processing information using the computer. The method of managing data from a currency processing system may further comprise an act of transferring at least some of the processing information to a remote computer from the computer. The secondary computer-readable storage medium may comprise a device such as noted above.

EXAMPLE N

A redemption system may comprise a coin processing machine configured to receive a plurality of coins in an input region and process the plurality of coins to determine a value thereof, a user input device configured to receive an input of a code selected by a user, a controller configured to associate the code to the value, and a communication device configured to output the code and the value to a coin processing machine computer-readable storage medium, a local computer and/or a remote computer.

The redemption system may further comprise a receipt printer configured to print a receipt bearing information relating to the processing of the plurality of coins. The redemption system may comprise another user input device disposed at a redemption location disposed remotely from the coin processing machine, the another user input device being configured to receive an input of a code. The redemption system may also comprise a redemption controller, which may be the controller, configured to compare the code input by the user into the user input device and the code input by the user into the another input device, and to output a redemption signal when the code input into the user input device and the code input user into the another input device match.

The user input device and/or the another user input device may be configured to receive a code comprising a plurality of numbers and/or a plurality of letters. The user input device and the another user input device may be configured to prompt a user to input a code comprising the at least one of a plurality of numbers and a plurality of letters. Optionally, the code may be the only user identification data associated with the value.

EXAMPLE O

A currency redemption method comprises the acts of processing a plurality of coins to determine a value thereof, receiving, through a user input device, a code selected by a user, associating the code to the value, and outputting the code and the value to at least one of coin processing machine computer-readable storage medium, a local computer and a remote computer.

The method may further comprise the acts of printing a receipt bearing information relating to the processing of the plurality of coins.

The method may comprise the acts of receiving, through another user input device disposed at a redemption location disposed remotely from the coin processing machine, an input of a code, and/or comparing the code input into the user input device and the code input into the another input device.

The method may further comprise the act of outputting a redemption signal when the act of comparing indicates a match between the code input into the user input device and the code input into the another input device.

The act of receiving may comprise receiving a code including at least one of a number, a letter, a word, a color, a pattern, a shape, an expression, a relation, and a symbol. The code may optionally be the only user identification data associated with the value.

The method may comprise the acts of associating the code with an expiration date and/or an expiration time and/or deleting the code from the at least one of coin processing machine computer-readable storage medium, a local computer and a remote computer following redemption of the value.

EXAMPLE P

A redemption system may comprise a coin processing machine configured to receive a plurality of coins in an input region and process the plurality of coins to determine a value thereof, the coin processing machine comprising a receipt printer and a controller, the controller being configured to cause the receipt printer to output a receipt bearing a code randomly generated by the controller and to associate the code to the value and a communication device configured to output the code and the value to at least one of coin processing machine computer-readable storage medium, a local computer and a remote computer. The controller may be configured to compare the code with the code input into the redemption interface to determine if the codes are identical.

The communication device may be configured to output the code and the value to a local computer and/or a remote computer, such local and/or remote computer being configured as a redemption interface. The redemption interface comprises an input device configured to receive input of the code, which input device may be a keypad, a keyboard, touch screen, microphone, sensor, button panel, scanning device, and/or bar code scanner.

The code may comprise a letter, a number, a word, a color, a pattern, a shape, an expression, a relation, and/or a symbol.

EXAMPLE Q

A currency redemption method may comprise the acts of processing a plurality of coins in a coin processing machine to determine a value thereof, randomly determining, using a random code generator, a code to be associated with the value, associating the code to the value, and outputting the code and the value to at least one of coin processing machine computer-readable storage medium, a local computer and a remote computer.

The method may comprise the acts of printing a receipt bearing the code and receiving, at a redemption interface, an input of a code borne by a receipt. The method may further comprise the act of comparing the code input into the redemption interface and the code associated with the value to determine if they match. The method may also include the act of providing a currency to a bearer of the receipt, providing at least one of a product and a service to a bearer of the receipt, and/or crediting a bearer of the receipt an amount up to the value.

EXAMPLE R

A redemption system, comprises a coin processing machine configured to receive a plurality of coins in an input region and process the plurality of coins to determine a value thereof, the coin processing machine comprising a card dispenser and a controller, the controller being configured to cause the card dispenser to output one of a first card bearing a first code randomly generated by the controller and written to the card by a writing device and a second card bearing a second predetermined code embedded in the card, the controller also being configured to activate a respective one of the first code and the second predetermined code and associate the activated code to the value. The redemption system also includes a communication device configured to output the value and the activated code to at least one of coin processing machine computer-readable storage medium, a local computer and a remote computer.

The communication device may comprise, as noted above, a serial port, parallel port, USB port, ECP port, IEEE 1394 port, broadband device, Ethernet port, modem, wireless device, RF device, and/or IR device. The communication device may be configured to output the value and the activated code to at least one of a local computer and a remote computer, and wherein the at least one of a local computer and a remote computer is configured as a redemption interface.

The redemption interface may comprises an input device configured to receive input of the activated code from a respective one of the first card and the second card. The input device may comprise a device to read at least one of a magnetic, electrical, and optical characteristic of a card bearing a respective one of the magnetic, electrical, and optical property characteristic. The input device may be configured, for example, to read at least one of a magnetic strip, a bar code, an IR ink, and/or a UV ink, or to read a smart chip, transmit a radio frequency signal, and/or receive a radio frequency signal.

As noted above, the activated code may comprise an encoded letter, a number, a word, a color, a pattern, a shape, an expression, a relation, and/or a symbol.

The controller is configured to compare the activated code with the code input into the redemption interface to determine if the codes are identical. The activated code may optionally be the only data associating a user with the value.

EXAMPLE S

A currency redemption method may include the acts of processing a plurality of coins in a coin processing machine to determine a value thereof, dispensing one of a first card bearing a first code randomly generated by the controller and written to the first card by a writing device and a second card bearing a second predetermined code embedded in the card, activating a respective one of the first code and the second predetermined code at least one of contemporaneously and subsequent to the act of processing and prior to the act of dispensing, associating the activated code to the value, and outputting the activated code and the value to a coin processing machine computer-readable storage medium, a local computer and/or a remote computer.

The act of outputting may comprise outputting the activated code and the value through at least one of a serial port, parallel port, USB port, ECP port, IEEE 1394 port, broadband device, Ethernet port, modem, wireless device, RF device, and/or IR device.

The method may further comprise the acts of receiving, at a redemption interface, an input of a code borne by a card and comparing the code input into the redemption interface and the activated code associated with the value to determine if they match. The method may further comprise the act of providing a currency and/or providing a product and/or a service to a bearer of the card in an amount up to the value if the code input into the redemption interface and the activated code match. The method may also include the act of crediting a bearer of the receipt an amount up to the value in exchange for at least one of a product and a service if the code input into the redemption interface and the activated code match.

The method may further comprise the act of deactivating the activated code from the coin processing machine computer-readable storage medium, local computer and/or remote computer following redemption of the value. The method may also comprise the act of storing the deactivated code in at least one of the local computer and the remote computer following redemption of the value to prevent subsequent use of the card bearing the deactivated code.

EXAMPLE T

A redemption system may comprise a coin processing machine configured to receive a plurality of coins in an input region and process the plurality of coins to determine a value thereof, the coin processing machine comprising a reading device configured to read a code comprising at least one of an identification code, an account code, and a transaction code from a code bearing medium and a communication device configured to output data relating to the value and data relating to the code to a computer-readable storage medium, a local computer, a remote computer, a server, and/or a computer network. The coin processing machine may comprise a controller configured to prevent processing of the plurality of coins or to render the input region inaccessible to a user until the reading device outputs a signal relating to a successful read of the code.

The code may comprises a letter, a number, a word, a color, a pattern, a shape, an expression, a relation, and/or a symbol. The code may comprise an account code and/or a transaction code which is not associated with an identity of a user.

The communication device may be configured to output the data relating to the value and data relating to the code to a local computer and/or a remote computer. The local and/or remote computer would be configured as a redemption interface and would comprise a reading device configured to read a code comprising an identification code, an account code, and/or a transaction code from a code bearing medium. The reading device may be configured to read data from at least one of a magnetic, electrical, electromagnetic, and optical medium, such as a magnetic strip, a bar code, an IR ink, and/or an UV ink, and/or an RF signal and/or a smart chip.

The controller may be configured to compare the code with a code input into the redemption interface to determine if the codes are identical.

EXAMPLE U

A method for redeeming currency comprises the acts of providing a coin processing machine configured to receive a plurality of coins in an input region and process the plurality of coins to determine a value thereof, the coin processing machine comprising a first reading device configured to read a code comprising at least one of an identification code, an account code, and a transaction code from a code bearing medium, reading a code from a code bearing medium using the first reading device, processing a plurality of coins to determine a value thereof following the reading of the code, and outputting data relating to the value and data relating to the code to a redemption interface associated with at least a second reading device configured to read a code of the same type as the first reading device. The method also includes reading a code from a code bearing medium using the second reading device, outputting data relating to the code read by the second reading interface to a controller, comparing the data relating to the code from the first reading device to the data relating to the code from the second reading device to determine if the codes match, and providing at least one of currency, product, and service in an amount up to the value responsive to a match of the codes in the act of comparing.

The redemption interface may comprise a coin processing machine computer-readable storage medium, a local computer, a remote computer, a server, a kiosk, an ATM, a vending machine, and/or a computer network. The method may further comprise acts of preventing processing of the plurality of coins until completion of the act of reading a code from a code bearing medium using the first reading device and/or rendering the input region inaccessible to a user until completion of the act of reading a code from a code bearing medium using the first reading device. The acts of reading may comprise reading data from at least one of a magnetic, electrical, electromagnetic, and optical medium, such as noted above.

The method may further comprise the act of assigning at least one of an expiration date and an expiration time, at which time the code will be disassociated from the value and rendered invalid for redemption of the value, to the code obtained in the act of reading a code from a code bearing medium using the first reading device. The method may comprise the act of disassociating the value from the code obtained in the act of reading a code from a code bearing medium using the first reading device following the act of providing at least one of currency, product, and service in an amount up to the value responsive to a match in the codes in the act of comparing.

The act of reading a code from a code bearing medium using the first reading device may comprise reading data from a magnetic strip of at least one of a store loyalty card and a store preferred card, and wherein the act of reading a code from a code bearing medium using the second reading device comprises reading data from a magnetic strip of the at least one of a store loyalty card and a store preferred card. The act of reading a code from a code bearing medium using the first reading device may also or alternatively comprise reading data from an RFID associated at least with a store in which the coin processing machine is disposed, and wherein the act of reading a code from a code bearing medium using the second reading device comprises reading data from an RFID associated at least with a store in which the redemption interface is disposed.

The act of providing a currency, product, and/or service in an amount up to the value responsive to a match in the codes in the act of comparing may comprise providing a benefit to a bearer of the code read from a code bearing medium using the second reading device, the benefit being related to at least one of the match in the comparing step and the value. The act of providing a currency, product, and/or service in an amount up to the value responsive to a match in the codes in the act of comparing may be used to increment a counter.

The data relating to the value may be assigned to an account associated with the identification code, account code, and/or a transaction code. The value assigned to the account may be debited in an amount corresponding to that provided in the act of providing or may be supplemented by subsequent acts of processing a plurality of coins to determine a value thereof following the reading of the code and of outputting data relating to the value and data relating to the code.

EXAMPLE V

A method for redeeming currency, comprises the acts of providing a coin processing machine configured to receive a plurality of coins in an input region and process the plurality of coins to determine a value thereof, the coin processing machine comprising a first reading device configured to read information from an information bearing medium, reading information the information bearing medium using the first reading device, processing a plurality of coins to determine a value thereof, and outputting data relating to the value and data relating to the information to a redemption interface associated with at least a second reading device configured to read information of the same type as the first reading device. The method also includes reading information from an information bearing medium using the second reading device, outputting data relating to the information read by the second reading interface to a controller, comparing the data relating to the information from the first reading device to the data relating to the information from the second reading device to determine if the information matches, and providing at least one of currency, product, and service in an amount up to the value responsive to a match of the information in the act of comparing.

The redemption interface may comprise a coin processing machine computer-readable storage medium, a local computer, a remote computer, a server, a kiosk, an ATM, a vending machine, and/or a computer network.

The method may comprise acts of preventing processing of the plurality of coins until completion of the act of reading a code from a code bearing medium using the first reading device and/or rendering the input region inaccessible to a user until completion of the act of reading a code from a code bearing medium using the first reading device.

The acts of reading may comprise reading data from at least one of a magnetic, electrical, electromagnetic, and optical medium, such as noted above.

EXAMPLE W

In at least one aspect of the present concepts, a coin processing and redemption system is provided including a coin processing machine configured to receive a batch of coins in an input region and process the batch of coins to determine a value thereof. In this example, a first biometric device configured to receive a user's biometric input and a first communication device is provided and configured to output a signal bearing first data relating to the biometric input and second data relating to the value to a local computer, remote computer, computer network, and/or computer-readable storage medium. A second biometric device is also provided and is configured to receive another biometric input of the user and to output a signal bearing third data related to the another biometric input to a controller configured to access the first data from the local computer, remote computer, computer network, and/or computer-readable storage medium. The controller is further configured to compare the first data with the third data to determine a degree of correspondence therebetween. The controller is also configured to output a signal associating the third data to the first data and/or the second data when the degree of correspondence satisfies at least one predetermined criterion.

The first biometric device may comprise, for example, a device configured to measure at least one physical characteristic of a user such as, but not limited to a fingerprint, facial dimension(s), teeth, retinal structure, iris structure, body part dimension(s), vein pattern, vein dimension(s), thermographic pattern, nailbed dimension(s), and/or skin spectral response. The first biometric device may also or alternatively comprise a device configured to measure at least one characteristic of a user's vocalization.

The first biometric device may be disposed remotely from the second biometric device. For example, the coin processing machine may be disposed in one location of the store and the second biometric device is located in another location of the store (e.g., a teller, kiosk, or service desk) or outside of the store.

The first biometric device may be configured to read the user's biometric input a plurality of times and output a signal bearing first data relating to each of the readings of the biometric input. The second biometric may also be configured to read the user's another biometric input a plurality of times and output a signal bearing third data relating to each of the readings of the another biometric input.

In one aspect of this example, the controller is configured to compare at least some of the first data to the third data. The controller may further be configured to determine a degree of correspondence between the first data and the third data. In such configuration, the controller may still further be configured to output a signal associating the second data with the third data when the degree of correspondence between any comparison between the first data and the third data satisfies at least one predetermined criterion or, alternatively, the controller may be configured to output a signal associating the first data and the third data when the degree of correspondence between any comparison between the first data and the third data satisfies at least one predetermined criterion. The controller may still further be configured to output a signal associating the first data and the third data when the degree of correspondence between any comparison between the first data and the third data satisfies at least one predetermined criterion.

As with previous examples, the communication device may comprise any communication device including, but not limited to, a serial port, parallel port, USB port, ECP port, IEEE 1394 port, broadband device, Ethernet port, wireless device, modem, RF device, and IR device.

If the signal related to the biometric input and the signal related to the another biometric input are encrypted, the controller may be configured to decrypt the signal related to the biometric input and the signal related to the another biometric input to determine a degree of correspondence therebetween. In such aspect, the controller may be configured to output a signal indicating a correspondence between the decrypted signal related to the biometric input and the decrypted signal related to the another biometric input when a degree of correspondence therebetween satisfies at least one predetermined criterion.

In accord with any of the above-noted aspects, the signal associating the third data to the first data and/or the second data, when the degree of correspondence satisfies at least one predetermined criterion, is output to a redemption interface. The redemption interface, in at least some aspects, comprises a controller, a display, a printer, and/or a speaker. In some aspects, the controller, responsive to the signal associating the third data to the first data and/or the second data, outputs an instruction to the display, printer, and/or speaker for corresponding output to an employee at the redemption interface to pay the user presenting the another biometric input the amount represented by the third data. In other aspects, such as a kiosk (e.g., ATM), the controller may, responsive to the signal associating the third data to the first data and/or the second data, simply pay the user presenting the another biometric input the amount represented by the third data.

In accord with any of the above-noted aspects, the controller may be configured to output a signal to a printer to output a substrate bearing an indicia relating to the value.

In at least some aspects, the redemption interface may comprise a controller which, responsive to the signal associating the third data to the first data and/or the second data, is configured to output a signal to a writing device to output a substrate bearing an amount relating to the value. In at least some other aspects, or in combination with the prior aspects, the redemption interface comprises a controller which, responsive to the signal associating the third data to at least one of the first data and the second data, is configured to output a signal to a writing device to output a stored value card and/or smart card bearing an amount relating to the value.

The redemption interface controller may advantageously be configured to delete any record of the first data and the second data following the output of the instruction to pay the user presenting the another biometric input the amount represented by the third data and/or following the output of the to the writing device to output a substrate bearing an amount relating to the value and/or following the output of the to the writing device to output a stored value card and/or smart card bearing an amount relating to the value.

In various aspects, the first biometric device and the second biometric device may each comprise a CMOS image sensor and a signal processor. The signal processor may comprise, for example, a microprocessor and/or digital signal processor.

EXAMPLE X

In one aspect of the present concepts, a method for utilizing a coin processing machine includes the acts of receiving a user's biometric input, storing data relating to the biometric input on a computer-readable storage medium, and associating a use of the coin processing machine, access to the coin processing machine, and/or access to information relating to transactions performed by the coin processing machine with the biometric input received in the act of receiving.

EXAMPLE Y

In one aspect of the present concepts, a method for redeeming coins includes the acts of receiving a plurality of coins in a coin processing machine, processing the plurality of coins to determine a value thereof, associating the value with a code, and redeeming the value to a person presenting the code.

EXAMPLE Z

In one aspect of the present concepts, a method for redeeming coins includes the acts of receiving a plurality of coins in a coin processing machine, processing the plurality of coins to determine a value thereof, associating the value with a code, and redeeming at a kiosk, an ATM, and/or a vending machine at least a portion of the value to a person presenting the code.

The present concepts are disclosed in relation to various aspects, examples, and embodiments, but are not limited to such aspects, examples, and embodiments, and include components, methods, processes, systems and/or apparatuses including all possible sub-combinations and subsets thereof.

As noted, while the invention is susceptible to various modifications and alternative forms, of which specific embodiments have been shown above (and below) by way of various examples, such examples are not intended to limit the invention to the particular forms and/or applications disclosed. On the contrary, the intention is to cover all applications, modifications, equivalents, combinations, and sub-combinations and alternatives falling within the spirit and scope of the invention as defined by the appended claims. Redemption locations in accord with the present concepts include, but are not limited to, a financial institution (e.g., a bank, credit union, S&L, etc.), casino, grocery store, department store, shopping mall, fast food restaurant, movie theatre, airport, coffee shop, mass-transit station, sports stadium, bowling alley, car wash, laundry mats, arcade, convenience store, gas station, amusement park, or any other public area or type of business or location open to the public. The term employee, as used herein, generally connotes an employee of any of such aforementioned redemption locations (e.g., a teller or manager in a bank or credit union, a salesperson or manager in a store, a cashier or server or manager in a fast food restaurant, etc.). For the example of a bank, such redemption location could include, but is not limited to, a teller line, a bank service desk, a bank reception desk, and a bank officers desk and could include, in various embodiments, a kiosk (e.g., 230) disposed in any public area (e.g., lobby, bank branches, bank after hour centers, bank automated night deposit locations, etc.), limited access area, or even non-public area, of the bank. As noted above, additional redemption locations could include, where not otherwise prohibited, portable electronic devices (e.g., cell phone, handheld game device, memory device, PDA, etc.) having at least one of a memory device and an electronic communication device or capability. The disclosed aspects of the present concepts may also be utilized, in various combinations and sub-combinations, for non-redemption transactions. For example, many of the aspects of the disclosed concepts may be utilized in non-public areas (e.g., employee-only areas of financial institutions or casinos, etc.) for tellers or employees to perform job-related functions. The aforementioned code could thus comprise an employee code or employee ID.

In accord at least with aspects of the present concepts utilizing a code associated to a transaction to close out the transaction, security is robust, as it would be exceedingly difficult and risky for a person to fraudulently obtain payment of a customer's funds because they would have to guess a random number, guess a random character string, obtain the exact card, key, fob, or device from the customer. Once the customer's code is matched to a transaction, the transaction is completed, and a cash out ticket issued, the code and transaction may are closed out in the system so that another person cannot re-present the code and get paid again.

EXAMPLE AA

Figure 20:
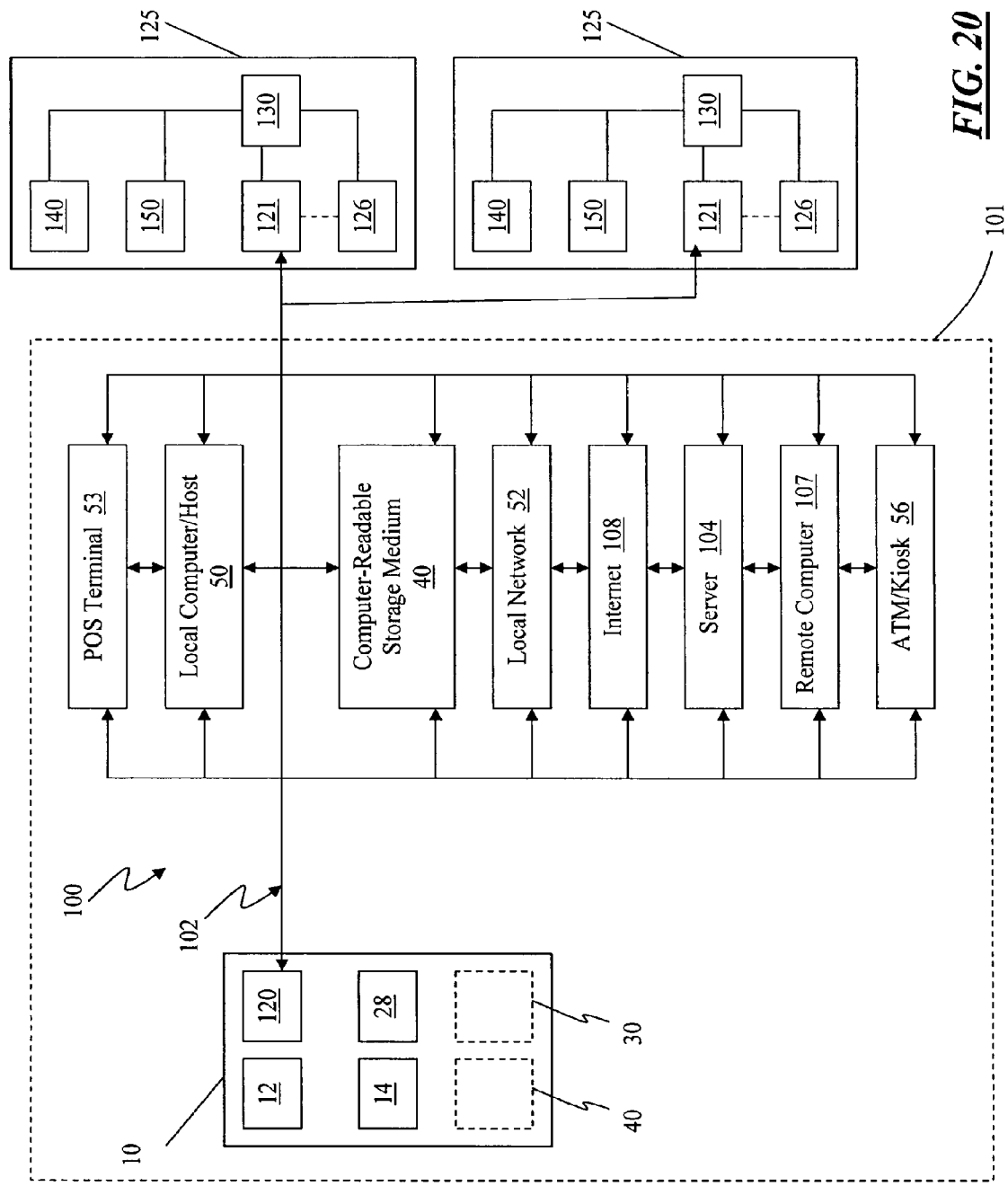
FIG. 20 shows aspects of a redemption system in accord with at least some aspects of the present concepts.

In accord with still further aspects of the present concepts, FIG. 20 shows, a coin processing and redemption system 100 including a coin processing machine 10 configured to receive a batch of coins in an input region 14 and process the batch of coins to determine a value thereof. Responsive to the processing of the batch of coins, a communication device 120 outputs a signal bearing data relating to the value of the processed coins to a POS terminal 53, a local computer or host 50, remote computer 107, server 104, network 52, Internet 108, computer-readable storage medium 40, database 106, and/or redemption interface 125. The communication device 120 may comprise, for example, a serial port, parallel port, USB port, ECP port, IEEE 1394 port, broadband device, Ethernet port, wireless device, modem, RF device, and/or IR device. Likewise, each recipient device comprises a communication device to enable communication between the coin processing machine 10 and destination device. In the illustrated example, a redemption interface 125 (e.g., a product dispenser) is operatively associated with the coin processing machine 10 and is configured to receive, via a communication interface 121, the signal output by the controller 120 or intermediary device. The redemption interface 125 comprises one or more actuatable switch(es) responsive to the signal output by the coin processing machine 10 or intermediary device.

The redemption interface 125 is a self-service terminal or transaction interface, such as a kiosk or other product dispensing device, comprising a communication device 121, one or more switches 126, a controller 130, a display 140, a printer 150, and a speaker 155. The switch 126 may by controlled by a local controller 130 and/or by a controller associated with, for example, the coin processing machine 10, local computer or host 50, POS terminal 53, remote computer 107, server 104, network 52, Internet 108, or the like. Responsive at least in part to a signal received by communication device 121 from one of the aforementioned devices, the redemption interface 125 controls the switch 126 or switches to dispense a selected product in a quantity relating to the determined value of the processed batch of coins (and/or any additional input value). In various aspects, the product may be stored within and/or assembled or created within the redemption interface 125 (e.g., a vending machine configured to vend a food item, beverage item, or merchandise) or, alternatively, may be stored outside of or remote from the redemption interface 125 (e.g., a gas pump configured to convey gasoline from an underground storage tank through the pump and out of a nozzle). The redemption interface 125 need not be disposed remotely from the coin processing machine, as depicted in FIG. 20, and may be disposed adjacent to or even integral with the coin processing machine 10. In such aspects, the actuatable switch is actuated directly or indirectly, without intervention by an employee, by the signal output by the coin processing machine 10.

As noted above, in some aspects, the coin processing machine outputs, via communication device 120, a signal bearing data relating to the value of the processed coins to a POS terminal 53. In such aspects of the present concepts, the POS terminal 53 optionally comprises a display, set apart from the coin processing machine, in an employee monitored area. Responsive to the signal output from communication device 120 and corresponding display of the total redemption amount on the POS terminal 53 display, the employee, having verified the transaction at least in part upon the displayed information and possibly upon verification of corresponding information on a receipt or ticket presented by the customer, is able to manually enable the actuatable switch associated with the redemption interface 125 to be operated by the customer.

To elaborate upon one implementation of the embodiment of FIG. 20, the coin redemption machine 10, which may be disposed for self-service operation by a customer or may be disposed in an employee area for use by an employee, is advantageously disposed inside a gas station covered area 101 where various other incidentals, food items, and beverage items may optionally be sold. The self-service coin redemption machine 10 is hardwired or is wirelessly linked to the operating system controlling one or more gas pumps (e.g., redemption interface 125 in the present example). For example, the self-service coin redemption machine 10 may be associated with a pre-pay pump that requires the customer to pay in advance, for which payment the attendant or clerk registers the amount paid into the fuel management system and enables the pump specified by the customer (e.g., Pump No. 1 at which the customer's vehicle is parked) to output fuel in an amount related to that amount paid by the customer. The customer inserts the fuel nozzle into his or her gas tank inlet and depresses a trigger of the fuel nozzle handle to initiate flow of the fuel. As the amount of fuel output by the pump approaches the value that had been previously paid, the rate of output of the fuel is typically slowed and then stops (i.e., ceases output of fuel) at the specific amount of money paid by the customer, or input amount relating thereto. The input amount may comprise, for example, a lesser amount than the determined value of the processed batch of coins (and/or any additional input value) following imposition of a transaction fee or a greater amount that such determined value in accord with an incentive or rewards program (e.g., based on a customer's historical usage. In such example, the redemption interface 125 is a product dispenser configured to dispense a gasoline-based fuel, diesel-based fuel, alcohol-based fuel, bio-fuel, hydrogen-based fuel, or electrical current.

Thus, in at least some aspects, a customer would drive up to a pump (e.g., pump #1) and park their vehicle, as is normally done. The customer would then proceed to a self-service coin redemption machine 10 inside the gas station and, where a particular pump is not pre-designed, select a pump from a plurality of pumps displayed on a touch screen. The customer then pours his or her coins into the self-service coin redemption machine 10 and waits until the processing of the coins is completed. The self-service coin redemption machine 10 preferably, but not necessarily, displays a running tally of the amount of coins and/or composition of the batch processed to the customer. The self-service coin redemption machine 10 displays the totaled amount of the batch of coins to the customer and/or a redemption amount relating thereto. The redemption amount may be less than the totaled amount (e.g., based on a transaction fee), equal to the totaled amount, or higher than the totaled amount (e.g., based on an incentive or earned benefit). The self-service coin redemption machine 10 then permits the customer to apply the redemption amount, or an amount relating thereto (e.g., the redemption amount is increased by input of additional bills, credit, or value), in whole or in part, to a pump selected by the customer. Optionally, the self-service coin redemption machine 10 outputs a ticket, issues currency, outputs a value to a customer's portable electronic device or otherwise outputs a value to a customer in another form, or permits a customer to apply a portion of the redemption amount to the purchase of items in the gas station retail area.

Once the customer selects a pump to which a redemption amount, or an amount relating thereto, is to be applied, a controller for the fuel pumping system registers such redemption amount, or amount relating thereto, and enables the selected pump to output gas, diesel, alternative fuel (e.g., electricity, hydrogen, etc.), or the like, in the specified amount. As noted above, the customer may supplement the redemption amount by the input of additional value. Thus, if a customer only inputs $20.47 in change, but wants to add value to ensure that he or she is able to at least substantially fill up his or her gas tank, the customer may register additional funds with the fuel management system by inputting additional bills, credit, or the like in the self-service coin redemption machine 10. Thus, a customer, in association with the self-service coin redemption machine 10, is permitted to insert one or more bills into a bill processing module, insert a credit card or other magnetic strip card (e.g., stored value card) into a card slot, swipe a credit card or other magnetic strip card through a card slot, input a value through a customer account (local or remote) using a biometric device or input code, input a value using an electronic wallet (e.g., borne by a cell phone or personal electronic device), or the like.

Alternatively, the customer is permitted to supplement the redemption amount at another location other than the self-service coin redemption machine 10. For example, the customer may be permitted to go to a service desk or cash register and give additional currency to a clerk, who then enters the additional amount or total redemption amount into the fuel management system in association with the pump identified by the customer. Value input devices are, in some aspects, advantageously disposed at or adjacent a service desk or cash register, or elsewhere, so that a customer may utilize a bill processing device, magnetic card processing device, biometric device, magnetic signal processing device, or the like, independently or in combination with another transaction. For example, a customer is optionally permitted to utilize a value input device disposed at the redemption interface 125, such as the conventional magnetic card reader or magnetic device reader, or a biometric characteristic reader, disposed at a gas pump. In such example, a customer could input funds into the self-service coin redemption machine 10 and supplement the redemption amount by inputting a credit card in a magnetic card reader at a selected gas pump. Once fueling is complete, the fuel management system would then extract value from the account associated with the input magnetic card to cover the difference between the value of the dispensed product (e.g., gas) and the redemption amount.

In still additional aspects, the self-service coin redemption machine 10 is configured to receive a customer's value input device (e.g., magnetic card, magnetic storage device, RF device, etc.) and either encrypt their total redemption amount directly on such value input device. The customer then takes his or her value input device to the redemption interface 125 (e.g., gas pump) and inputs the encrypted total redemption amount into the redemption interface (e.g., such as by inserting a card into a card reader at a gas pump). In other aspects, the total redemption amount is linked to a database that is associated with a customer, such as by a biometric characteristic, customer code, password, or other customer identification information. The customer would then, at the redemption interface 125, input the appropriate biometric characteristic, customer code, password, or the like into the redemption interface to enable the redemption interface to output product in an amount corresponding to, or less than, the total redemption amount associated with such customer identifying information.

In still another aspect, the self-service coin redemption machine 10 is configured to dispense a unique stored value card, or other portable magnetic or electronic stored value device, bearing an encrypted or otherwise actively or passively protected redemption amount. The customer is then able to use this stored value card or device at a selected or designated redemption interface 125 (e.g., gas pump, vending device, etc.) and input value from the stored value card or device into the redemption interface, such as by inserting a card into a card reader at a gas pump, for example. At the time of issuance, the information on the stored value card or stored value device is optionally stored on a database against which future activity on and information regarding the stored value card or device may be compared and updated.

The total redemption amount is, in other aspects, linked to a database that is associated with a customer, such as by a biometric characteristic, customer code, password, or other customer identification information. The customer would then, at the redemption interface 125, input the appropriate biometric characteristic, customer code, password, or the like into the redemption interface to enable the redemption interface to output product in an amount corresponding to, or less than, the total redemption amount associated with such customer identifying information.

Still further, the self-service coin redemption machine 10 is configured in at least some embodiments to dispense a receipt or ticket that the customer brings to the clerk or employee at the location 101 in which the self-service coin redemption machine is disposed. The clerk or employee then inputs the total redemption amount indicated on the receipt or ticket into a control system controlling dispensing of product from a product dispensing device such as, but not limited to, a control system configured to dispense gas from a gas pump. The customer is then able to use the product dispensing device to dispense product therefrom in an amount corresponding to the input total redemption amount.

In still another configuration, the redemption interface 125 comprises a kiosk configured to dispense one or more physical products. For example, in one such embodiment, the redemption interface 125 kiosk comprises a plurality of switches and is configured to selectively dispense one or more products (e.g., food item, beverage item, merchandise, stored value card, etc.) by activating a selected actuatable switch or selected actuatable switches. In at least one embodiment, the dispensed product comprising a signal emitting device, such as a transponder, transmitter, transceiver, or the like. The signal emitting device may comprise, but is not limited to, a toll way payment device or a parking payment and/or authorization device, or, other type of secure (e.g., encrypted) or unsecured identification device. A deposit for the signal emitting device may optionally be charged to the user in connection with the transaction to motivate the user to return the signal emitting device, such deposit being credited back to the user upon the user's return of the signal emitting device.

Prior to or concurrent with the dispensing of the signal emitting device, the redemption interface 125 kiosk reads an account number or other identifying information borne by the signal emitting device and either establishes a new account in connection with a local processor and/or a remote processor (e.g., a remote computer) or activates a pre-existing account associated with the signal emitting device, such as may be established in advance by a manufacturer of the signal emitting device. Once the signal emitting device is associated with such local and/or remote account, the redemption interface 125 or intermediary device associates the redemption amount to the account associated with the signal emitting device. In this manner, the signal emitting device is available for immediate use. The redemption interface 125 is optionally configurable to provide a signal emitting device reader configured to read signal emitting devices of the type output thereby to enable a user to determine an account value associated with such signal emitting device. Alternatively, or in combination, the redemption interface 125 is adapted to permit the user to enter the user's name or other identifying information, signal emitting device identification number or code, account number, or the like to obtain account information corresponding to the user's signal emitting device. Thus, a driver at a rest area may input his or her identification information, such as by inserting a credit card or smart card in card reader, to access an account associated with the driver's open toll way transponder to enable the driver to add value thereto via a provided coin processing device, bill processing device, or card reading module, receiver, or the like. The redemption interface 125 communicates such added value and identification information to a local and/or remote computer managing the account.

EXAMPLE BB

In accord with still further aspects of the present concepts, a coin processing and redemption system is integrated with retail self-checkout lanes, such as those that are typically encountered in grocery stores, home improvement stores, and other retail stores, through an associated proprietary or off-the-shelf retail management system software, firmware, and/or hardware. A coin processing machine 10, such as is described above by way of example, is provided at or adjacent one or more of the checkout lanes and/or self-checkout lanes. A customer may then, concurrent with the purchase of goods in the store or independent of any purchase of goods, pour bulk coins into the coin processing machine 10.

In some aspects, the coin processing machine 10 provides a display viewable by the clerk or employee at the POS, which displays information relating to the coin processing transaction, including a total for the processed coins, redemption total, and/or denomination coin totals. The clerk or employee then directly provides the customer with cash or credit in the appropriate amount (e.g., the total for the processed coins if no fee is charged for the processing, a lesser redemption total if a fee is imposed, or a greater redemption total if an incentive is involved).

In other aspects, however, the coin processing machine 10 is electrically connected to the POS system so that the total for the processed coins or redemption total may be directly integrated into the customer's transaction, thereby eliminating the need for the clerk or employee to manually enter the coin processing information. Moreover, in accord with this embodiment, the coin processing machine 10 is advantageously tied into the POS administration system, which enables monitoring of the coin processing machine status. The POS system would therefore provide monitoring of the coin processing machine 10 state, maintenance status, and bag totals, for example.

In accord with the above aspects, there is no need whatsoever for an intermediary bearer paper that might be susceptible to counterfeiting and fraud.

Additionally, a customer may be provided the option of depositing the total for the processed coins or redemption total, or portion thereof, to an account associated with the customer. In this regard, the customer may input an appropriate customer card, biometric input, electronic wallet, code, account number, or other suitable account identifying information into the coin processing machine 10 or input device located at or adjacent the POS or coin processing machine.

In another aspect, the coin processing machine 10 is disposed at the store-employee attended "help stand," which is typically provided to oversee the operation of multiple self-checkout lanes. The coin processing machine 10 is then operatively tied into the POS system associated with one or more of the self-checkout lanes. To redeem coins, a customer gives his or her coins to the clerk or attendant at the store-employee attended help stand and the clerk or employee (or customer, under the supervision of the clerk or employee), inputs the coins into the coin processing machine 10. The clerk or employee then gives the customer cash and change corresponding to the total of the processed coins or redemption amount, as appropriate, or, alternatively, associates such amount to customer's transaction if the customer is redeeming the coins in connection with a transaction. The association of a totaled amount or redemption amount to customer's transaction may occur, for example, prior to the initiation of the customer's transaction or during such transaction.

Various additional non-limiting aspects of the aforementioned concepts are additionally presented below.

For example, in another aspect related to the above example, a self-service coin machine 10 could be disposed adjacent a service desk 210 or other staffed redemption location (e.g., a bank teller or store clerk). In this example, such as is shown in FIG. 20, the self-service coin machine 10 would output to a printer 205 and/or interface (e.g., keyboard, display, etc.) 200 instead of to the customer. The customer would not obtain any printed document from the self-service coin machine 10. To begin the transaction, the customer would, in one aspect, insert a batch of coins into the self-service coin machine 10 under the supervision and/or cognizance of a customer service employee or other designated employee.

When all the coins have been processed, the self-service coin machine 10 would instruct the customer to walk over to the service desk (or other redemption location) employee to receive payment. Because the self-service coin machine 10 is, in this aspect, disposed directly adjacent the service desk or other redemption location, the service desk employee or other employee can directly observe the customer sorting the coins. Interface 200 could further comprise a display facing the service desk so as to be easily readable by the employee at the service desk and a printer 205 could also advantageously be provided at the service desk. Thus, when the customer completes the coin counting, the printer 205 would immediately print out a cash out ticket at the service desk. Alternately, if the interface 200 comprises a keyboard and display at the service desk, then the service desk employee would key in the amount displayed on the display and issue a print command to print out the cash out ticket for insertion into the cash drawer upon disbursement of the net amount due from the cash drawer and close out of the transaction The service employee could then issue a receipt to the customer if requested by the customer.

Following close out of the transaction, the service desk employee would then reset the self-service coin machine 10, if not automatically reset, to accept the next customer's deposits of coin. In other words, in at least some aspects, the self-service coin machine 10 would be locked out once one customer has utilized the machine. The self-service coin machine 10 would not be placed back on-line again until the first customer had received payment for their transaction. Then the next customer could begin use of the machine. This is relatively practical because there is not typically a line of customer waiting to use a self-service coin machine 10.

Furthermore, when there is not an attendant at the service desk, then the service desk employee would have to have the ability to temporarily lock down the machine and take it out of service until a service desk employee returned to their post.

In another aspect, as mentioned above, a customer may be required to input a code via a code input device, as described above. This may be used in combination with the above other aspects. For example, when a service desk employee is at their post, they may redeem coins such as noted above. However, when the service desk employee needs to leave his or her post temporarily, the employee may leave the self-service coin device 10 selectively enabled. Thus, in the absence of the employee, the coin processing machine 10 would inform the customer that, to used the machine, the customer may (1) wait until the employee returns to perform the transaction or (2) enter a code to associate the customer's code with the transaction (e.g., input of a number or character string, swipe a store card, provide a biometric input, etc.), process the coins, and then return later when the employee is again at his or her post to redeem the funds due. Later, when a service desk employee is at the service desk, the customer may re-enter the code, with the attendant confirmation steps and transaction close out steps noted above.

In accord with any of the present concepts and embodiments disclosed herein where an input of a code by a customer is not expressly required, the customer optionally may be required to input a code (e.g., a customer ID), such as is disclosed above, to associate to the transaction (e.g., input of a number or character string, swipe a store card, provide a biometric input, etc.).

The coin redemption machine 10 disclosed herein can be provided with other features, without limitation, to dispense coupons, issue stored value cards usable at a third-party store, issue stored value cards usable at the store location, issue a value card that could be used at participating retailers, and/or dispense an electronic device bearing value.

Still further, any of the above disclosed combinations may be used specifically as described in the examples, or may be combined with other disclosed aspects. Any combination and sub-combination of the concepts disclosed herein are considered to be expressly included herein (e.g., incorporation of biometric input to embodiments not specifically directed to biometric inputs). As but one example, the "deli number" concept described above did not specifically call for a variant comprising a biometric input in combination with such deli number. The present concepts include, for example, combination of the deli number concept with a biometric input or inputs, as elsewhere described in the disclosure. Further, although many examples have been made wherein the user's identity is not known or is irrelevant to the processes and devices in place for redemption, the user's identity may optionally be known and/or required for any of the disclosed embodiments and the present concepts are not limited to, for example, an anonymous security feature linked to specific transactions.

In another example, despite the disclosure and the potential for off-site networking, some users may prefer closed systems wherein the data, whether anonymous or associated with their identity, is retained locally on the host system and is not distributed to, shared with, or accessible to, outside parties. Thus, computer security (e.g., network security) is an important factor and is advantageously employed in combination with the present concepts that to protect the physical and/or data integrity of the coin processing machine 10, personal data, business data, transmissions, memory devices, computers, communications, and networks.

Still further, other types of conventional biometric devices not expressly discussed herein may also be applied in combination with the present concepts. In one non-limiting example, the integrity of the system may be enhanced by incorporating "liveness" features in combination with the biometric devices to ensure that the biometric inputs are valid ones. Any biometric device may be utilized in combination with the present concepts. Although various examples have been presented in relation to various noted physical features (e.g., fingerprint) and non-physical features (e.g., voice), such physical and non-physical features are not intended to be limiting and may include any characteristic by which an individual and/or identity may be ascertained and may include, for example, biological and/or chemical characteristic (e.g., a scent, a chemical trace, a DNA sequence, etc.) determined to be sufficiently statistically unique to an individual, repeatable, and timely for a particular application.

Further yet, the present concepts include additional methods based on or building on the principles disclosed herein. For example, a method of redemption comprising coin redemption machines may comprise waiving a transaction fee (e.g., an 8% or 9% fee) when the redemption occurs at a POS since the retailer is receiving revenue on the transaction for merchandise, whereas the transaction fee may be imposed when the redemption occurs elsewhere or in some other capacity. The fee arrangement of this method and integration with the POS terminals 53 will permit the retailer to waive fees for those people that use the coin processing machine and then stay in the store to purchase goods, while imposing the transaction fees on people who come into the store, use the currency processing machines, and leave. In a similar method, the transaction fee could be uniformly charged up front to all persons processing currency using the machines. However, any person purchasing merchandise in the store, perhaps even subject to a floor or minimum purchase level, can have the transaction fee credited back to them as part of the transaction for the merchandise.

In another aspect, the currency processing machine 10 (e.g., coin processing machine) may be configured to output a stored value card, such as a Starbucks card, or the like, and open an account associated to the card and/or activate a pre-existing account number already associated with the card. Further, a currency processing machine 10 having a biometric device in accord with the present concepts can associate the user's biometric input with such account. In this way, the account could be later debited or credited at the third-party (e.g., Starbucks) location(s) by either using the magnetic strip card (or RFID, smart card, or the like) or by using a POS biometric device. That way, a customer is provided two options for redeeming the value stored on the account (i.e., both a stored value card and the user's biometric input).

Under still another embodiment, the coin processing machine 10 may be equipped with an interactive terminal configured to independently interact with the customer. In other words, the interactive terminal could be used for functions other than merely coin processing and could be used independently of any coin processing transaction. The interactive terminal capabilities might also be used in combination with one or more of the devices described above to help enhance security. For example, the interactive terminal might be used in combination with the biometric ID, or the store card ID, or unique pin number.

In various embodiments, the above-described interactive terminal could use conventional icons or browsers to facilitate navigation. In one example, an existing store having a unique ID number associated with their store card could walk up to the coin processing machine 10 interactive terminal and press an icon marked "Existing Store Customers" to begin a non-coin processing or a coin processing transaction or interaction. The customer could input via an input device, the unique ID to enter, via icons or other navigational aids, a database for existing store customers wherein the customer is "cleared" by the system to begin a coin processing transaction. If the customer was not yet a customer of the store, the customer could set up an account, such as by pressing a "Set Up Customer Account" icon, and then proceed. The customer may also be given a plurality of options from which to select the desired configuration of the machine from a plurality of available configurations. For example, as to the above-noted biometric devices, the customer may prefer a image-based biometric (e.g., a face scan) over a fingerprint-based biometric device and may be given the option of selecting a preferred biometric input from a plurality of available options. The customer may also be permitted to customize which of the desired security features are utilized. For example, a customer may intend to redeem the funds quickly, within one hour, and is not concerned about losing the receipt, but does not want to provide a biometric input. This customer could, from the interactive terminal, select the "deli receipt" option. Each of the above aspects, concepts, and examples could be provided as a separate option for the customer.

Multiple interactive terminals could also be provided at other locations in the store, independent of the coin processing machine. Therefore, a customer could go to any interactive terminal to check the status of the customer's account at any time. For example, an interactive terminal could be provided at the self service desk or other location. The customer could approach the interactive terminal and enter their unique ID, number, or store card number, and optional password. The customer could then access their unique account. This information can then be used to match the transactions and the customer can instruct the system relative to the amount the customer would like to withdraw from the account (e.g., the full amount or a partial amount). The amount requested would then be displayed or otherwise communicated to the employee behind the service desk or to some other device and some other location. The employee would then make the payment, deduct the amount from the customer's unique account number and close the transaction and update accounting records. Use of such an interactive terminal in combination with an ATM or kiosk would permit the customer to receive payment on an automated basis without assistance from a store employee. Basically, the interactive terminal would provide an on-line system for use only within the store and/or in the store and over the network where browsers and windows are used and accessed by customers by which the customer can securely access their store accounts and make deposits or withdrawals at will.

In accord with at least some of the above concepts, once a connected network is provided (e.g., a store-only network or a broader network), there can be many points where the customer can redeem the coin deposit into cash or other items of value including, but not limited to, a store service desk, a check out counter or POS, or an ATM. At the ATM, for example, the customer may be permitted to withdraw down against the coin transaction deposit to the nearest dollar, or alternately to the exact amount in change if a coin dispensing module is included on the ATM. Access may be only to the ATM in the store, or to ATMs at multiple locations. In accord with at least one aspect, the fee for the transaction with an ATM may be, for example, a variable amount comprising a truncated amount when the amount is rounded to the nearest lowest dollar amount and optionally additional dollars in increments closest to a predetermined percentage of a transaction fee. For example, in one aspect, the fee could be $0.92 for a $56.92 batch of coins. Alternatively, if the fee was to have been an 8% fee, which would have corresponded to a fee of $4.55, the assessed fee could be $3.92, which would provide the user with an ATM output of $53.00. The coin processing machine 10 could be configured to permit this option only when the assessed transaction fee falls within appropriate limits (e.g., the assessed fee would have to be greater than 6% of the transaction value and less than 8%).

Other points where the customer can redeem the coin deposit into cash or other items of value include for typical retail stores, such as the Jewel, Albertson's, or others, the multiple locations of such stores. Networks incorporating all of the coin processing machines 10 at the many (e.g., 100+) locations of the store, the customer is not restricted to a specific store. For example, the customer could make a deposit at the self service coin machine at a first store. Later in the week, the customer may be at a second store. At that time, the customer could request the cash, coupons or goods at the second store. Since it is an interconnected network, the data of the customer's unique identification and the amount of the transaction could be stored centrally and accessed from any of the store locations throughout the network. Further, participating retailers, such as McDonalds, Burger King, or Starbucks, could also provide redemption in cash or goods. Therefore, the customer may have deposited coins over a period of time at Jewel to accumulate a balance of $100 dollars. The customer may, if there is a participating McDonalds in the area, present their ID card (biometric input, store card, and/or random number, etc.) at the McDonalds. A transaction device (e.g., a biometric input device) would be present at McDonalds to match the customer's ID (or biometric input) to an appropriate transaction number and/or amount available. The customer could then utilize this available balance towards a purchase at McDonalds.

Alternately, once a network is available, and the customer has a unique customer and/or transaction ID, the grocery stores may be motivated to install kiosk's 230 offering various services. The kiosk 230 is fully automated to perform various functions thus freeing store employees from performing such tasks. At these kiosks 230, a customer may be able to obtain coupons, cash, value cards, money orders, and cards to use at Starbucks, McDonalds, or others, stamps, theatre tickets. Therefore, the credit the customer accumulated at the coin processing machine 10 could be redeemed at any of the kiosks 230 within a specific store, or at all store locations depending upon the sophistication of the network. Depending upon the rules set by the store, a customer may be required to redeem the full amount the coin deposit immediately at the kiosk 230, or may be permitted to redeem just a portion thereof.

In accord with any of the aforementioned aspects of the present concepts, the redemption operation may be semi-automated or fully-automated, reflecting varying degrees of involvement by a third party (e.g., a store employee). In semi-automated implementations, for example, the customer would be required to enter a deli number, such as by using a keypad, enter a PIN code or selected code, swipe a card bearing information, or the like, with the employee simply verifying the acceptability of the customer entered data and paying out the funds associated with the transaction associated with such entry. In fully-automated implementations, the customer may complete the redemption transaction at a location other than a staffed service desk or POS such as, but not limited to, a kiosk, ATM, redemption machine, terminal, computer, or vending machine. In at least one aspect of this latter concept, the deposited funds could be associated in an account with a customer's biometric data (or other identifying input, such as a selected PIN code or other identifying code). The customer could then draw from such account in one or more separate subsequent transactions. For example, a user may input their biometric input (or other identifying input) at a vending device in a first transaction to receive a first item of value (e.g., a food or beverage item), at an ATM in a second transaction to receive a second item of value (i.e., currency bills), at a kiosk in a third transaction to receive a third item of value (e.g., a ticket or a roll of stamps), and at a POS in a fourth transaction to receive a fourth item of value (e.g., merchandise or a food item). The number of transactions which may be associated with the customer's processed funds is not predetermined and may vary in accord with the value(s) of currency, merchandise, items, and/or services obtained in redemption by the customer. Moreover, a customer may add value at any time in association with such biometric data or other identifying data and a customer may obtain multiple accounts, if desired.

In any of the above described aspects of the present concepts, an interface 200, such as a keyboard and display, provided at a service desk 210 or other local or remote location enables the service desk employee, or other authorized individual appropriate for the location (e.g., a bank teller in a bank, a maintenance tech or engineer remotely accessing the machine to perform trouble-shooting and/or diagnostics, etc.) to periodically make inquiries on the status of the coin processing machine 10 without actually having to walk over to the coin processing machine. The employee or other authorized individual could periodically or continuously track bag totals, day totals, fill percentages, coin counts, etc. The employee could also be rapidly apprised of a problem condition with the coin processing machine 10 (e.g., automatic notification of a fault condition) or be enabled to monitor the performance of one or more systems, subsystems, or components of the coin processing machine. Further, at the end of the day, the coin processing machine 10 software could be configured to permit the employee to remotely perform a preliminary balancing of the machine or at least generation of various reports using the interface 200 and/or printer 205 disposed at the service desk (or other location).

As noted above, the redemption location may include, for example, a POS integrated with the coin processing machine 10 through an appropriate communication link (e.g., 202, 204) and/or host system 50, network 52, server 104, internet 108, firewall 110 or the like. When a coin deposit is complete, the customer is instructed by the coin processing machine 10 to go to a POS checkout counter, employee-attended POS terminal, or unattended POS terminal. At such location, the customer would input a code to identify the transaction (e.g., by entering a selected number or character string or by inputting or swiping a unique magnetic strip bearing card). The transaction could then be closed and payment rendered.

In a like manner, the coin processing machine 10 may be linked, via an appropriate communication link (e.g., 202, 204) and/or host system 50, network 52, server 104, internet 108, firewall 110, or the like, to an ATM network, a bank network, a teller system network at a bank, or another bank's internal network. Particularly at banks on an ATM network or a teller system network, etc., it is desirable to configure the coin processing machine 10 to update the customer's accounts. For example, a customer may deposit $200.17 and instruct the coin processing machine to put $100 in the customer's checking account, $50 in the customer's savings account, and output back to the customer $50.17 in cash. In one aspect, the coin processing machine 10 could be configured to conduct the transfer transactions and output a receipt or deposit slip to the customer, while instructing the customer to proceed to the teller to obtain the balance due of $50.17 (minus any optional transaction fees). On the receipt would typically be provided confirmation of any deposits to a specified checking account and/or a specified savings account and/or any amount of cash dispensed. In another aspect, the coin processing machine 10 could be associated with or comprise a currency dispenser configured to dispense cash and coin and the entire transaction could be consummated at and/or adjacent the coin processing machine 10.

In any of the above described aspects of the present concepts, the coin processing machine 10 is optionally configurable to issue a receipt, either automatically or upon the request of a customer. Further, in lieu of a printed receipt, the coin processing machine 10 in any of the above described aspects may be configured to provide an electronic receipt and email the receipt to the customer or electronically transfer the receipt or like information relating to the transaction to a portable electronic device. The coin processing machine may further code such electronic receipt in a specified manner (e.g., a customer may request that the receipt be provided in a Quicken format or other accounting software format).

In any of the above described aspects of the present concepts, the commission for the redemption service optionally is tiered. In one example, the service desk 210 or other redemption location imposes a higher commission or fees on a form of reimbursement that may be used outside of the store. Thus, if the customer requests cash or credit to a non-store account, a first commission may be imposed on the transaction (e.g., 8%). However, if the customer accepts from the service desk 210, POS 220, or kiosk 230 a store coupon or voucher (i.e., a cash equivalent for application to merchandise purchased in the store), or credit to an in-store account, a second commission less than the first commission is imposed (e.g., no commission, 1%, 2%, 3%, 4%, etc.).

The foregoing disclosure has been presented for purposes of illustration and description. The foregoing is not intended to limit the present concepts to the form, forms, or applications disclosed herein by way of example.

What is claimed is:

1. A method for associating a coin processing event on a coin processing machine with a user, comprising the acts of:
   receiving a user's first biometric input in a biometric input device operatively associated with the coin processing machine;
   storing the user's first biometric input in a computer-readable memory device;
   processing a batch of coins using the coin processing machine, the coin processing machine comprising a coin processing device configured to sort the batch of coins and determine a total value of the batch of coins;
   storing data relating to the batch of coins processed on the coin processing machine on the computer-readable memory device in association with the user's first biometric input;
   associating, in the computer-readable memory device, data relating to the batch of coins processed on the coin processing machine with the user's first biometric input;
   receiving a user's second biometric input in another biometric input device;
   storing the user's second biometric input in the computer-readable memory device:
   retrieving from the computer-readable memory device, using a processing device, the user's first biometric input in association with a redemption operation;

comparing the retrieved biometric input, using the processing device, at a redemption location; and redeeming the value associated with the processed batch of coins responsive to a favorable comparison of the user's first biometric input and the user's second biometric input by the processing device.

2. A method for associating a coin processing event on a coin processing machine with a user according to claim 1,:

wherein the coin processing machine is a coin-redemption machine, and wherein the biometric input device is disposed at the coin-redemption machine.

3. A method for associating a coin processing event on a coin processing machine with a user according to claim 2, further comprising:

updating, in the computer-readable memory device, the data relating to the batch of coins processed on the coin processing machine, in response to the act of redeeming.

4. A method for associating a coin processing event on a coin processing machine with a user according to claim 1, wherein the biometric input device is disposed at an ATM.

5. A method for associating a coin processing event on a coin processing machine with a user according to claim 1, wherein the another biometric input device is disposed at a POS terminal.

6. A method for associating a coin processing event on a coin processing machine with a user according to claim 1, wherein the another biometric input device is disposed at a vending machine.

7. A method for associating a coin processing event on a coin processing machine with a user according to claim 1, further comprising:

deleting the user's first biometric input and the user's second biometric input responsive to the redemption of the value associated with the processed batch of coins.

* * * * *